United States Patent [19]

Kaneko

[11] Patent Number: 6,009,073
[45] Date of Patent: Dec. 28, 1999

[54] METHOD FOR TRANSMITTING AN ORTHOGONAL FREQUENCY DIVISION MULTIPLEX SIGNAL, APPARATUS FOR TRANSMITTING THE SIGNAL AND APPARATUS FOR RECEIVING THE SIGNAL

[75] Inventor: Keiichi Kaneko, Yokohama, Japan

[73] Assignee: Victor Company of Japan, Ltd., Yokohama, Japan

[21] Appl. No.: 08/719,010

[22] Filed: Sep. 24, 1996

[30] Foreign Application Priority Data

Sep. 25, 1995 [JP] Japan .................................... 7-246431
Feb. 29, 1996 [JP] Japan .................................... 8-043854

[51] Int. Cl.$^6$ .................................................. H04J 11/00
[52] U.S. Cl. ......................... 370/203; 370/281; 370/343; 370/480; 375/261; 358/432
[58] Field of Search ..................................... 370/203, 204, 370/205, 206, 207, 208, 210, 343, 480, 281, 335; 375/261, 326, 219, 295, 316; 358/425, 432, 433

[56] References Cited

U.S. PATENT DOCUMENTS

| 4,882,614 | 11/1989 | Kageyama et al. ...................... 358/433 |
| 5,646,935 | 7/1997 | Ishikawa et al. ........................ 370/207 |
| 5,790,514 | 8/1998 | Marchok et al. ........................ 370/208 |
| 5,822,323 | 10/1998 | Kaneko et al. .......................... 370/480 |

FOREIGN PATENT DOCUMENTS

| 3053735 | 3/1991 | Japan .............................. H04L 27/38 |
| 3076623 | 12/1991 | Japan .............................. H04L 27/36 |
| 4290337 | 10/1992 | Japan .............................. H04L 27/20 |
| 5110369 | 4/1993 | Japan .............................. H03H 7/18 |
| 5219021 | 8/1993 | Japan .............................. H04J 15/00 |
| 5227239 | 9/1993 | Japan .............................. H04L 27/36 |
| 6188932 | 7/1994 | Japan .............................. H04L 27/38 |
| 6311134 | 11/1994 | Japan .............................. H04J 11/00 |
| 6350658 | 12/1994 | Japan .............................. H04L 27/20 |
| 7336322 | 12/1995 | Japan .............................. H04J 11/00 |

*Primary Examiner*—Dang Ton
*Assistant Examiner*—Shick Hom
*Attorney, Agent, or Firm*—Pollock, Vande Sande & Amernick

[57] ABSTRACT

Each of a plurality of carrier waves is modulated with one of information signals for each symbol, one of two types of reference signals known on a receiving side is alternately inserted into a pair of particular carrier waves of which frequencies are symmetric to each other with respect to a frequency of a central carrier wave for each symbol while changing the frequencies of the pair of particular carrier waves at two symbol intervals to insert the reference signal into all carrier waves every prescribed symbols, a symbol number is inserted into one carrier wave to specify the pair of particular carrier waves, and an orthogonal frequency division multiplex (OFDM) signal composed of the modulated carrier waves are transmitted from transmitting apparatus to a receiving apparatus through a spatial transmission path. In the receiving apparatus, the OFDM signal is demodulated, two types of reproduced reference signals are obtained, a characteristic of a transmission path including the spatial transmission path and transmission characteristics of the transmitting and receiving apparatuses is detected by comparing the reproduced reference signals and the reference signals, a correcting equation is calculated, and each modulated information signal is reproduced according to the correcting equation. Accordingly, the reproduced information signals can be obtained with a high accuracy without complicating the configuration of the transmitting and receiving apparatuses.

33 Claims, 14 Drawing Sheets

METHOD FOR TRANSMITTING AN ORTHOGONAL FREQUENCY DIVISION MULTIPLEX SIGNAL, APPARATUS FOR TRANSMITTING THE SIGNAL AND APPARATUS FOR RECEIVING THE SIGNAL

BACKGROUND OF THE INVENTION

1. Field of the Invention

The present invention relates to an orthogonal frequency division multiplex signal transmitting method in which a coded digital picture signal transformed into an orthogonal frequency division multiplex (OFDM) signal of a limited frequency band is transmitted and the digital picture signal is reproduced, an orthogonal frequency division multiplex signal transmitting apparatus in which the picture signal is transformed to the OFDM signal and is transmitted, and an orthogonal frequency division multiplex signal receiving apparatus in which the OFDM signal is demodulated and the picture signal is reproduced.

2. Description of the Related Art

As one method for transmitting a coded digital picture signal in a limited frequency band, an orthogonal frequency division multiplex (OFDM) method in which digital information processed in a multivalued modulation according to a 256 quadrature amplitude modulation (QAM) method is transmitted as an orthogonal frequency division multiplex signal by using a large number of carrier waves is well-known because an adverse influence of a multi-path transmission or a transmission disturbance is not comparatively exerted on the OFDM signal and a frequency utilization factor in the OFDM method is comparatively superior. In this OFDM method, a large number of carrier waves orthogonal to each other are prepared, and a large number of pieces of digital information are separately transmitted by using the carrier waves. In this case, a sentence "a first carrier wave is orthogonal to a second carrier wave" denotes that a spectrum of the second (or first) carrier wave is zero at a carrier frequency of the first (or second) carrier wave.

In a transmitting apparatus for transmitting the OFDM signal, a plurality of pairs of in-phase (I) signals and quadrature (Q) signals in a digital base band are obtained by performing an inverse discrete Fourier transformation (IDFT) for a piece of transmission data, the I signals and Q signals pass through a digital-to-analog (D/A) converter and a low pass filter (LPF) and are transformed and combined to an OFDM signal of an intermediate frequency (IF) in an orthogonal modulating unit, the OFDM signal of the intermediate frequency is frequency-changed to a radio frequency band in a frequency changing circuit, an unnecessary frequency component is removed from the OFDM signal of the radio frequency band in a band pass filter (BPF), an electric power of the OFDM signal of the radio frequency band is amplified in a transmission unit, and the OFDM signal of the radio frequency band is radiated from a transmission antenna.

In a receiving apparatus for receiving the OFDM signal, the OFDM signal of the radio frequency band is frequency-changed to an intermediate frequency in a frequency changing circuit and is amplified in an amplifier. Thereafter, an unnecessary frequency component is removed from the OFDM signal of the intermediate frequency in a band pass filter, and the OFDM signal of the intermediate frequency is demodulated to the I signals and the Q signals in an orthogonal demodulating unit. Thereafter, the I signals and Q signals pass through a low pass filter, an analog-to digital (A/D) converter, a discrete Fourier transforming circuit and a quadrature amplitude modulation decoding circuit, and the transmission data is reproduced.

In the above transmission of the OFDM signal in the transmitting and receiving apparatuses, in cases where a relative amplitude characteristic difference or a relative phase characteristic difference between a group of the I signals and a group of the Q signals exists or in cases where a pair of modulating waves or a pair of demodulating waves exactly having a 90 degrees phase difference are not fed to the orthogonal modulating unit or the orthogonal demodulating unit, a code error occurs in an I or Q signal in the transmitting or receiving apparatus. That is, amplitude and phase changes of a frequency of the I or Q signal and a crosstalk (or an image component) from the frequency of the I or Q signal to an symmetric opposite frequency occurs.

To prevent the occurrence of the code error, various methods for preventing the occurrence of a characteristic difference such as an amplitude characteristic difference or a phase characteristic difference between a group of the I signals and a group of the Q signals are proposed in Published Unexamined Japanese Patent Applications H6-350658 (1994), H3-76623 (1991), H5-227239 (1993), H5-110369 (1993), H3-53735 (1991), H6-188932 (1994) and H4-290337 (1992).

Also, a correction for setting the frequency amplitude characteristics and the frequency phase characteristics of the I signals and the Q signals to prescribed characteristics has been proposed. For example, a correction of the frequency amplitude characteristics and the frequency phase characteristics in the I signals and the Q signals, a correction of phases of the orthogonal modulating waves, a correction of the frequency amplitude characteristics and the frequency phase characteristics in the processing of the signal of the intermediate frequency band and/or a correction of the frequency amplitude characteristics and the frequency phase characteristics in the processing of the signal of the radio frequency band are proposed for the transmitting apparatus, and a correction of the frequency amplitude characteristics and the frequency phase characteristics in the I signals and the Q signals, a correction of phases of the orthogonal modulating waves, a correction of the frequency amplitude characteristics and the frequency phase characteristics in the processing of the signal of the intermediate frequency band, a correction of the frequency amplitude characteristics and the frequency phase characteristics in the processing of the signal of the radio frequency band and/or a correction of the frequency amplitude characteristics and the frequency phase characteristics in a multi-path circumstance for an electric wave transmission are proposed for the receiving apparatus (Published Unexamined Japanese Patent Applications H6-311134 (1994) and H5-219021 (1993)).

3. Problems to be Solved by the Invention

However, configurations of the above conventional transmitting and receiving apparatuses in which one of the above correcting methods is performed are complicated, so that a manufacturing cost of each apparatus is increased. Also, in cases where a plurality of code errors occur, the configurations of the above conventional transmitting and receiving apparatuses are moreover complicated to correct the all code errors. Also, the code errors cannot be corrected with a high precision even though one of the above correcting methods is performed. Also, all of the above correcting methods are not appropriate for the OFDM signal.

In addition, a difference in amplitude between a group of I signals and a group of Q signals is not compensated in a conventional correcting method disclosed in a Published Unexamined Japanese Patent Application H6-188932 (1994) in which a difference in an orthogonal characteristic between transmitting and receiving apparatuses is compensated. Also, in a conventional correcting method disclosed in a Published Unexamined Japanese Patent Application H4-290337 (1992), though a digital orthogonal modulating unit is arranged at a front stage of a D/A converter in a transmitting unit and an error occurring in the transmitting apparatus is prevented in principle, because an operational speed of the D/A converter and a bit width are limited, there is a drawback that a useful transmitting apparatus is limited.

Therefore, because each of the amplitude characteristic difference between a group of I signals and a group of Q signals, the phase characteristic difference between a group of I signals and a group of Q signals, a difference in the orthogonal characteristic between a group of I signals and a group of Q signals is a direct cause of a code error in a transmitted signal and a received signal, the code error is removed or compensated in conventional transmitting/receiving method and apparatus. However, the improvement of the correction of the code error is limited. In addition, because frequency characteristic difference between a group of I signals and a group of Q signals is not compensated in any conventional transmitting/receiving method and apparatus, any transmitting/receiving method and apparatus appropriate for the OFDM signal is not proposed.

SUMMARY OF THE INVENTION

An object of the present invention is to provide, with due consideration to the drawbacks of such a conventional orthogonal frequency division multiplex signal transmitting/receiving method and apparatus, an orthogonal frequency division multiplex signal transmitting method and apparatus and an orthogonal frequency division multiplex signal receiving appartus in which a circuit configuration is simplified by correcting an occurred error to prevent the occurrence of a code error.

Also, another object of the present invention is to provide an orthogonal frequency division multiplex signal transmitting method and apparatus and an orthogonal frequency division multiplex signal receiving apparatus appropriate for an OFDM signal in which frequency characteristics are corrected.

The objects are achieved by the provision of an orthogonal frequency division multiplex signal transmitting method, comprising the steps of:

preparing a plurality of carrier waves having difference frequencies;

classifying the plurality of carrier waves into a central carrier wave, a plurality of positive carrier waves having frequencies higher than that of the central carrier wave and a plurality of negative carrier waves having frequencies lower than that of the central carrier wave;

calculating a set of an in-phase signal and a quadrature signal from each of a plurality of information signals on a transmitting side for each of symbols;

modulating each of the plurality of positive carrier waves and each of the plurality of negative carrier waves with one of a plurality of sets of in-phase and quadrature signals calculated from the plurality of information signals for each of the symbols;

inserting a reference signal known on the receiving side into a set of a particular positive carrier wave and a particular negative carrier wave, of which frequencies are symmetric to each other with respect to a central frequency of the central carrier wave, selected from the plurality of positive and negative carrier waves for each of the symbols on the transmitting side while changing the selection of the set of particular positive and negative carrier waves every prescribed time on condition that the reference signal is inserted into all positive and negative carrier waves every prescribed symbols;

producing an orthogonal frequency division multiplex signal composed of the central carrier wave and a plurality of modulated carrier waves, by which the plurality of information signals and the reference signal are carried, for each of the symbols;

transmitting each of the orthogonal frequency division multiplex signals from the transmitting side to a transmission path;

receiving each of the orthogonal frequency division multiplex signals transmitted from the transmission path on a receiving side;

demodulating the plurality of modulated carrier waves of the orthogonal frequency division multiplex signal received on the receiving side to obtain a plurality of demodulated information signals on the receiving side for each of the symbols;

obtaining a plurality of sets of reproduced in-phase and reproduced quadrature signals of a plurality of reproduced information signals from the plurality of demodulated information signals for each of the symbols;

obtaining a demodulated reference signal on the receiving side for each of the symbols;

obtaining a reproduced reference signal from the demodulated reference signal for each of the symbols;

comparing the reproduced reference signal with the reference signal known on the receiving side for each of the symbols on the receiving side to obtain a transmitting or leaking degree from each of a real part of the reference signal carried by the particular positive carrier wave, an imaginary part of the reference signal carried by the particular positive carrier wave, a real part of the reference signal carried by the particular negative carrier wave and an imaginary part of the reference signal carried by the particular negative carrier wave to each of a real part of the reproduced reference signal carried by the particular positive carrier wave, an imaginary part of the reproduced reference signal carried by the particular positive carrier wave, a real part of the reproduced reference signal carried by the particular negative carrier wave demodulated and an imaginary part of the reproduced reference signal carried by the particular negative carrier wave;

detecting a characteristic of the transmission path for the set of particular positive and negative carrier waves according to the transmitting and leaking degrees for each of the symbols;

obtain a plurality of characteristics of the transmission path for all sets of positive and negative carrier waves by repeating the detection of the characteristic of the transmission path by prescribed symbols;

calculating a plurality of correcting equations for all sets of positive and negative carrier waves from the characteristics of the transmission path; and correcting the plurality of sets of reproduced in-phase and reproduced quadrature signals to a plurality of sets of corrected in-phase and corrected quadrature signals according to the plurality of correcting equations for each of the symbols to obtain a plurality of corrected information signals from the plurality of sets of corrected in-phase and corrected quadrature signals for each of the symbols.

In the above steps, a reference signal is inserted into a set of positive and negative carrier waves of which frequencies +Wn and −Wn are symmetric to each other with respect to a central frequency F0 of the central carrier wave for each of symbols because there is a probability that the information signal carried by the carrier wave of the frequency +Wn (or −Wn) leaks to the digital information carried by the carrier wave of the frequency −Wn (or +Wn) as an image component or crosstalk. Therefore, a characteristic of the transmission path for the positive and negative carrier waves of which frequencies +Wn and −Wn can be rapidly detected.

Also, because the frequencies +Wn and −Wn of the set of positive and negative carrier waves of which frequencies +Wn and −Wn are changed every prescribed time, the reference signal is inserted into all sets of positive and negative carrier waves every prescribed symbols. Therefore, the characteristics of the transmission path for all positive and negative carrier waves can be detected.

Accordingly, the information signal transmitted to the receiving side can be correctly reproduced according to the characteristics of the transmission path.

It is preferred that the step of calculating a set of an in-phase signal and a quadrature signal comprises the steps of:

expressing a real part of each of the plurality of information signals carried by the positive carrier waves by A;

expressing an imaginary part of each of the plurality of information signals carried by the positive carrier waves by B;

expressing a real part of each of the plurality of information signals carried by the negative carrier waves by C; and expressing an imaginary part of each of the plurality of information signals carried-by the negative carrier waves by D, the step of inserting a reference signal comprises the steps of:

preparing a first type of reference signal and a second type of reference signal as the reference signal;

inserting symbol number into one of the plurality of carrier waves for each of the symbols on the transmitting side while circularly changing a value of the symbol number for each of the symbol;

inserting the first type of reference signal into one set of particular positive and negative carrier waves, of which first frequencies are symmetric to each other with respect to the central frequency of the central carrier wave, for each odd symbol in which an odd symbol number is inserted into one carrier wave as one symbol number to specify the one set of particular positive and negative carrier waves; and inserting the second type of reference signal into one set of particular positive and negative carrier waves, of which second frequencies are symmetric to each other with respect to the central frequency of the central carrier wave, for each even symbol in which an even symbol number is inserted into one carrier wave as one symbol number to specify the one set of particular positive and negative carrier waves on condition that the second frequencies of the set of particular positive and negative carrier waves corresponding to one even symbol number Ns are the same as the first frequencies of the set of particular positive and negative carrier waves corresponding to one odd symbol number Ns−1 just preceding to the even symbol number Ns, the step of obtaining a plurality of reproduced information signals comprises the steps of:

expressing a real part of each of the plurality of reproduced information signals, which are carried by the demodulated carrier waves obtained from the positive carrier waves, by A';

expressing an imaginary part of each of the plurality of reproduced information signals, which are carried by the demodulated carrier waves obtained from the positive carrier waves, by B';

expressing a real part of each of the plurality of reproduced information signals, which are carried by the demodulated carrier waves obtained from the negative carrier waves, by C'; and expressing an imaginary part of each of the plurality of reproduced information signals, which are carried by the demodulated carrier waves obtained from the negative carrier waves, by D', the step of obtaining a reproduced reference signal comprises the steps of:

demodulating the first type of reference signal inserted into the set of particular positive and negative carrier waves to obtain a first type of reproduced reference signal for each odd symbol; and demodulating the second type of reference signal inserted into the set of particular positive and negative carrier waves to obtain a second type of reproduced reference signal for each even symbol, the step of comparing the reproduced reference signal includes the step of:

calculating eight coefficients S0 to S7 which denote the transmitting and leaking degrees and satisfy relationship $$\begin{pmatrix} A' \\ B' \\ C' \\ D' \end{pmatrix} = \begin{pmatrix} S0, & -S1, & S2, & S3 \\ S1, & S0, & S3, & -S2 \\ S4, & S5, & S6, & -S7 \\ S5, & -S4, & S7, & S6 \end{pmatrix} \begin{pmatrix} A \\ B \\ C \\ D \end{pmatrix}$$

according to the first type of reference signal, the second type of reference signal, the first type of reproduced reference signal and the second type of reproduced reference signal for each of the symbols, the step of calculating a plurality of correcting equations includes the step of:

calculating a value $$\frac{1}{\det A} \begin{pmatrix} H0, & H1, & H2, & H3 \\ -H1, & H0, & H3, & -H2 \\ H4, & H5, & H6, & H7 \\ H5, & -H4, & -H7, & H6 \end{pmatrix},$$

in which H0=+S0(S6S6+S7S7)−S2(S4S6+S5S7)+S3(S4S7−S5S6),

H1=+S1(S6S6+S7S7)−S3(S4S6+S5S7)−S2(S4S7−S5S6),

H2=+S4(S2S2+S3S3)−S6(S0S2+S1S3)+S7(S0S3−S1S2),

H3=+S5(S2S2+S3S3)−S7(S0S2+S1S3)−S6(S0S3−S1S2),

H4=+S2(S4S4+S5S5)−S0(S4S6+S5S7)−S1(S4S7−S5S6),

H5=+S3(S4S4+S5S5)−S1(S4S6+S5S7)+S0(S4S7−S5S6),

H6=+S6(S0S0+S1S1)−S4(S0S2+S1S3)−S5(S0S3−S1S2),

H7=+S7(S0S0+S1S1)−S5(S0S2+S1S3)+S4(S0S3−S1S2), and detA=S0*H0+S1*H1+S4*H2+S5*H3 are satisfied, as one correcting equation for each of the symbols, and the step of correcting the plurality of sets of reproduced in-phase and reproduced quadrature signals includes the step of: calculating the real part A' of each of the plurality of reproduced information signals corresponding to the positive carrier waves, the imaginary part B' of each of the plurality of reproduced information signals corresponding to the positive carrier waves, the real part C' of each of the plurality of reproduced information signals corresponding to the negative carrier waves and the imaginary part D' of each of the plurality of reproduced information signals corresponding to the negative carrier waves according to a relationship $$\begin{pmatrix} \langle A \rangle \\ \langle B \rangle \\ \langle C \rangle \\ \langle D \rangle \end{pmatrix} = \frac{1}{\det A} \begin{pmatrix} H0, & H1, & H2, & H3 \\ -H1, & H0, & H3, & -H2 \\ H4, & H5, & H6, & H7 \\ H5, & -H4, & -H7, & H6 \end{pmatrix} \begin{pmatrix} A' \\ B' \\ C' \\ D' \end{pmatrix}$$

in which a real part of each of the plurality of corrected information signals corresponding to the positive carrier waves is expressed by <A>, an imaginary part of each of the plurality of corrected information signals corresponding to the positive carrier waves is expressed by <B>, a real part of each of the plurality of corrected information signals corresponding to the negative carrier waves is expressed by <C>, an imaginary part of each of the plurality of corrected information signals corresponding to the negative carrier waves is expressed by <D>.

In the above steps, the first type of reference signal is inserted into one set of positive and negative carrier waves of the frequencies +Wi and −Wi (i=1,2, - - - ) in the 2(i−1)-th symbol specified by one even symbol number 2(i−1), and the second type of reference signal is inserted into one set of positive and negative carrier waves of the frequencies +Wi and −Wi in the (2i−1)-th symbol specified by one odd symbol number (2i−1). The first type of reference signal and the second type of reference signal inserted into each set of positive and negative carrier waves are transmitted to the transmission path and are received on the receiving side as the first type of reproduced reference signal and the second type of reproduced reference signal. Therefore, even though the information signal carried by the carrier wave of the frequency +Wi (or −Wi) leaks to the digital information carried by the carrier wave of the frequency −Wi (or +Wi) in the transmission path according to the characteristic of the transmission path, the characteristic of the transmission path for each set of positive and negative carrier waves is detected by obtaining eight coefficients S0 to S7 from the first type of reference signal, the second type of reference signal, the first type of reproduced reference signal and the second type of reproduced reference signal.

Accordingly, in cases where the reproduced information signal is corrected according to the correcting equation obtained from the coefficients S0 to S7, the corrected information signal agreeing with the information signal transmitted from the transmitting side can be obtained on the receiving side with a high accuracy.

It is preferred that the step of inserting a reference signal comprises the steps of:

preparing a first type of reference signal and a second type of reference signal as the reference signal;

inserting an symbol number into one of the plurality of carrier waves for each of the symbols on the transmitting side while circularly changing a value of the symbol number for each of the symbol;

inserting the first type of reference signal into one set of particular positive and negative carrier waves, of which first frequencies are symmetric to each other with respect to the central frequency of the central carrier wave, for each odd symbol in which an odd symbol number is inserted into one carrier wave as one symbol number to specify the one set of particular positive and negative carrier waves;

inserting the second type of reference signal into one set of particular positive and negative carrier waves, of which second frequencies are symmetric to each other with respect to the central frequency of the central carrier wave, for each even symbol in which an even symbol number is inserted into one carrier wave as one symbol number to specify the one set of particular positive and negative carrier waves on condition that the second frequencies of the set of particular positive and negative carrier waves corresponding to one even symbol number Ns are the same as the first frequencies of the set of particular positive and negative carrier waves corresponding to one odd symbol number Ns−1 just preceding to the even symbol number Ns;

expressing imaginary parts of the first type of reference signal and the second type of reference signal inserted into the particular positive carrier wave by Qs;

expressing real parts of the first type of reference signal and the second type of reference signal inserted into the particular negative carrier wave by Rs;

expressing imaginary parts of the first type of reference signal and the second type of reference signal inserted into the particular negative carrier wave by Us;

setting one of the real part Ps of the first type of reference signal and the imaginary part Qs of the first type of reference signal to a first prescribed value not equal to zero;

setting the other one of the real part Ps of the first type of reference signal and the imaginary part Qs of the first type of reference signal, the real part Rs of the first type of reference signal and the imaginary part Us of the first type of reference signal to zero;

setting one of the real part Rs of the second type of reference signal and the imaginary part Us of the second type of reference signal to a second prescribed value not equal to zero; and setting the other one of the real part Rs of the second type of reference signal and the imaginary part Us of the second type of reference signal, the real part Ps of the second type of reference signal and the imaginary part Qs of the second type of reference signal to zero.

In the above steps, because three of four parts of each of the first type of reference signal and the second type of reference signal are set to zero, the calculation of the characteristic of the transmission path can be easily performed.

Also, the objects are achieved by the provision of an orthogonal frequency division multiplex signal transmitting apparatus, comprising:

arithmetical calculation performing means for performing an inverse discrete Fourier transformation for real and imaginary parts of a plurality of digital information signals for each symbol to produce a plurality of sets of in-phase digital signals and quadrature digital signals;

digital-to-analog converting means for converting the sets of in-phase digital signals and quadrature digital signals produced by the arithmetical calculation performing means to a plurality of sets of in-phase analog signals and quadrature analog signals;

quadrature amplitude modulation performing means for performing a quadrature amplitude modulation for the plurality of sets of in-phase analog signals and quadrature analog signals obtained in the digital-to-analog converting means to modulate a plurality of carrier waves having different frequencies with the plurality of sets of in-phase analog signals and quadrature analog signals and produce an orthogonal frequency division multiplex signal composed of a plurality of modulated carrier waves having different frequencies for each of the symbols, the plurality of modulated carrier waves being classified into a central carrier wave, a plurality of positive carrier waves of which frequencies are higher than a central frequency of the central carrier wave and a plurality of negative carrier waves of which frequencies are lower than the central frequency of the central carrier wave;

symbol number generating and inserting means for generating a symbol number for each of the symbols while circularly changing a value of the symbol number and inserting each of the symbol numbers into one of the plurality of modulated carrier waves obtained in the quadrature amplitude modulation performing means for each of the symbols;

reference signal generating and inserting means for generating a reference signal known on a receiving side and inserting the reference signal into a set of a particular positive carrier wave and a particular negative carrier wave, of which frequencies are symmetric to each other with respect to the central frequency of the central carrier wave, selected from the plurality of positive and negative carrier waves for each of the symbols while changing the selection of the set of particular positive and negative carrier waves every prescribed time on condition that the reference signal is inserted into all positive and negative carrier waves every prescribed symbols and the set of particular positive and negative carrier waves in each symbol are specified by the symbol number; and transmitting means for transmitting the orthogonal frequency division multiplex signal, in which the symbol number generated by the symbol number generating and inserting means is inserted into one of the plurality of modulated carrier waves and the reference signal generated by the reference signal generating and inserting means is inserted into one set of particular positive and negative carrier waves, to a transmission path for each of the symbols, and an orthogonal frequency division multiplex signal receiving apparatus, comprising:

receiving means for receiving an orthogonal frequency division multiplex signal composed of a plurality of modulated carrier waves having different frequencies from a transmission path for each of symbols, the plurality of modulated carrier waves being modulated by a plurality of sets of in-phase and quadrature signals indicating a plurality of digital information signals, the plurality of modulated carrier waves being classified into a central carrier wave, a plurality of positive carrier waves of which frequencies are higher than a central frequency of the central carrier wave and a plurality of negative carrier waves of which frequencies are lower than the central frequency of the central carrier wave, a reference signal being inserted into a set of a particular positive carrier wave and a particular negative carrier wave, of which frequencies are symmetric to each other with respect to the central frequency of the central carrier wave, selected from the plurality of positive and negative carrier waves for each of the symbols while changing the selection of the set of particular positive and negative carrier waves every prescribed time, and the set of particular positive and negative carrier waves in each symbol being specified by a symbol number of which a value is circularly changed for each of the symbols and is inserted into one of the plurality of modulated carrier waves for each of the symbols;

quadrature demodulating means for performing a quadrature demodulation for the orthogonal frequency division multiplex signal received by the receiving means for each of the symbols to obtain a plurality of sets of demodulated in-phase and quadrature signals, a demodulated reference signal and a demodulated symbol number;

reproducing means for performing a discrete Fourier transformation for the plurality of sets of demodulated in-phase and quadrature signals, the demodulated reference signal and the demodulated symbol number for each of the symbols and obtaining real parts and imaginary parts of a plurality of reproduced digital information signals deformed in the transmission path, a reproduced reference signal deformed in the transmission path and the symbol number for each of the symbols;

detecting means for detecting a characteristic of the transmission path corresponding to one set of particular positive and negative carrier waves from the reproduced reference signal and the symbol number obtained in the reproducing means for each of the symbols;

correcting equation deriving means for deriving a correcting equation corresponding to one set of particular positive and negative carrier waves from the characteristic of the transmission path detected by the detecting means for each of the symbols; and correcting means for correcting the real and imaginary parts of the reproduced digital information signals obtained in the reproducing means according to the correcting equation for each of the symbols and obtaining real and imaginary parts of a plurality of corrected digital information signals in which the deformation of the plurality of reproduced digital information signals received in the transmission path is corrected.

In the above configuration, errors in the in-phase and quadrature signals of the digital information signals are caused by a difference in an amplitude characteristic between each pair of in-phase and quadrature signals, a difference in a phase characteristic between each pair of in-phase and quadrature signals and an error in orthogonality between each pair of in-phase and quadrature signals. In the signal transmitting apparatus, any error does not occur before each digital information signal is separated into one pair of in-phase and quadrature signals. Also, in the signal receiving apparatus, any error does not occur after each pair of in-phase and quadrature signals are combined to one digital information signal. In the prior art, a correcting operation is tried to diminish a characteristic difference between each pair of in-phase and quadrature signals and to adjust characteristics of the in-phase and quadrature signals to prescribed values. Therefore, there are some constraints on the correcting operation, so that the characteristic difference cannot be sufficiently corrected. That is, the correction for preventing the occurrence of the errors cannot be sufficiently performed.

In the present invention, the occurrence of errors is allowed, and the occurred errors are corrected. That is, the reference signal known by the signal receiving apparatus is inserted into each orthogonal frequency division multiplex signal in the signal transmitting apparatus, a characteristic of a transmission path indicating an error between each pair of in-phase and quadrature signals is detected according to the reproduced reference signal received by the signal receiving apparatus and the reference signal known by the signal receiving apparatus, a correcting equation is derived from each characteristic of the transmission path, and each pair of reproduced in-phase and quadrature signals are corrected according to the correcting equation.

In this case, assuming that 16 coefficients are used to indicate one characteristic of the transmission path for each pair of in-phase and quadrature signals and the characteristic of the transmission path is detected by transmitting 4 types of reference signals inserted into four orthogonal frequency division multiplex signals in the signal transmitting apparatus to the signal receiving apparatus every four symbols, a follow-up speed for the characteristic of the transmission path changing with time is lowered.

Therefore, in the present invention, each of two types of reference signals is inserted into a set of particular positive and negative carrier waves which are symmetric with each other with respect to the central carrier wave and leak to each other as crosstalk because of the orthogonality error. In addition, each set of a particular positive and negative carrier waves into which one reference signal is inserted is specified by a symbol number, and the set of particular positive and negative carrier waves are changed every prescribed time (or every two symbols). Therefore, each set of positive and negative carrier waves is selected as one set of particular positive and negative carrier waves, and the characteristics of the transmission path for all sets of positive and negative carrier waves can be detected.

Accordingly, frequency characteristics of the in-phase and quadrature signals of the digital information signals can be corrected in the same manner as in the prior art. In addition, characteristic errors such as a difference in an amplitude characteristic between each pair of in-phase and quadrature signals carried by one carrier wave, a difference in a phase characteristic between each pair of in-phase and quadrature signals carried by one carrier wave, an orthogonality error occurring in the quadrature amplitude modulation performing means and an orthogonality error occurring in the quadrature demodulating means can be corrected. Therefore, it is not required to diminish the characteristic errors, it is not required to consider the characteristic errors changing with temperature, it is not required to consider the characteristic errors changing with time, and the transmission of the orthogonal frequency division multiplex signals can be performed with a high accuracy.

The objects are also achieved by the provision of an orthogonal frequency division multiplex signal transmitting method, comprising the steps of:
  preparing a plurality of carrier waves having difference frequencies;
  classifying the plurality of carrier waves into a central carrier wave, a plurality of positive carrier waves having frequencies higher than that of the central carrier wave and a plurality of negative carrier waves having frequencies lower than that of the central carrier wave;
  calculating a set of an in-phase signal and a quadrature signal from each of a plurality of information signals on a transmitting side for each of symbols;
  modulating each of the plurality of positive carrier waves and each of the plurality of negative carrier waves with one of the plurality of information signals on a transmitting side for each of symbols;
  inserting a reference signal known on the receiving side into a set of a particular positive carrier wave and a particular negative carrier wave, of which frequencies are symmetric to each other with respect to a central frequency of the central carrier wave, selected from the plurality of positive and negative carrier waves for each of the symbols on the transmitting side while changing the selection of the set of particular positive and negative carrier waves every prescribed time on condition that the reference signal is inserted into all positive and negative carrier waves every prescribed symbols and the set of particular positive;
  producing an orthogonal frequency division multiplex signal composed of the central carrier wave and a plurality of modulated positive and negative carrier waves, by which the plurality of information signals and the reference signal are carried, for each of the symbols;
  transmitting each of the orthogonal frequency division multiplex signals from the transmitting side to a transmission path;
  receiving each of the orthogonal frequency division multiplex signals transmitted from the transmission path on a receiving side;
  demodulating the plurality of modulated positive and negative carrier waves of the orthogonal frequency division multiplex signal received on the receiving side to obtain a plurality of demodulated information signals and a demodulated reference signal on the receiving side for each of the symbols;
  obtaining a plurality of reproduced information signals and a reproduced reference signal from the plurality of demodulated information signals and the demodulated reference signal for each of the symbols;
  detecting a characteristic of the transmission path for a set of particular reproduced information signals carried by the set of particular positive and negative carrier waves on the receiving side for each of the symbols by comparing the reproduced reference signal with the reference signal known on the receiving side;
  calculating a first correcting equation for the set of particular reproduced information signals from the characteristic of the transmission path for each of the symbols;
  correcting the set of particular reproduced information signals according to the first correcting equation to obtain a set of first corrected information signals for each of the symbols;

preparing a signal arrangement in which a plurality of signal positions allowed for the plurality of information signals are arranged;

preparing an initial second correcting equation;

correcting the set of first corrected information signals according to the initial second correcting equation or a second correcting equation previously calculated to obtain a set of second corrected information signals for each of the symbols;

detecting a high speed changing characteristic of the transmission path for the set of second corrected information signals for each of the symbols according to a difference between a particular signal position selected from the signal arrangement for the set of second corrected information signals and a signal position of the set of second corrected information signals;

calculating an updated second correcting equation for a next symbol from the high speed changing characteristic of the transmission path and the second corrected information signal for a present symbol preceding to the next symbol to correct one set of first corrected information signals corresponding to the next symbol to one set of second corrected information signals according to the updated second correcting equation;

repeating the correction of the set of first correcting information signals according to the updated second correcting equation to obtain a plurality of second corrected information signals corresponding to all of the information signals; and outputting the second corrected information signals for each of the symbols.

Also, the objects are also achieved by the provision of an orthogonal frequency division multiplex signal transmitting method, comprising the steps of:

preparing a plurality of carrier waves having difference frequencies;

calculating a set of an in-phase signal and a quadrature signal from each of a plurality of information signals on a transmitting side for each of symbols;

inserting a reference signal known on the receiving side into a particular carrier wave selected from the plurality of carrier waves for each of the symbols on the transmitting side while changing the selection of the particular carrier wave every prescribed time on condition that the reference signal is inserted into all carrier waves every prescribed symbols;

modulating each of the plurality of carrier waves with one of the plurality of sets of in-phase and quadrature signals calculated from the plurality of information signals for each of the symbols to produce a plurality of modulated carrier waves;

producing an orthogonal frequency division multiplex signal composed of the plurality of modulated carrier waves, by which the plurality of sets of in-phase and quadrature signals of the plurality of information signals and the reference signal are carried, for each of the symbols;

transmitting each of the orthogonal frequency division multiplex signals from the transmitting side to a transmission path;

receiving each of the orthogonal frequency division multiplex signals transmitted from the transmission path on a receiving side;

demodulating the plurality of modulated carrier waves of the orthogonal frequency division multiplex signal received on the receiving side to obtain a plurality of sets of demodulated in-phase and quadrature signals of a plurality of demodulated information signals and a demodulated reference signal on the receiving side for each of the symbols;

obtaining a plurality of reproduced information signals from the plurality of demodulated information signals for each of the symbols;

obtaining a reproduced reference signal from the demodulated reference signal for each of the symbols;

comparing the reproduced reference signal with the reference signal known on the receiving side for each of the symbols on the receiving side to obtain a plurality of changing degrees from each of a real part of the reference signal and an imaginary part of the reference signal to each of a real part of the reproduced reference signal and an imaginary part of the reproduced reference signal;

detecting a characteristic of the transmission path for a particular reproduced information signal carried by the particular modulated carrier wave according to the changing degrees for each of the symbols;

calculating a first correcting equation for the particular reproduced information signal from the characteristic of the transmission path for each of the symbols;

correcting the particular reproduced information signal according to the first correcting equation to obtain a first corrected information signal for each of the symbols;

preparing a signal arrangement in which a plurality of signal positions allowed for the plurality of information signals are arranged;

preparing an initial second correcting equation;

correcting the first corrected information signal according to the initial second correcting equation or a second correcting equation previously calculated to obtain a second corrected information signal for each of the symbols;

detecting a high speed changing characteristic of the transmission path for the second corrected information signal for each of the symbols according to a difference between a particular signal position selected from the signal arrangement for the second corrected information signal and a signal position of the second corrected information signal;

calculating an updated second correcting equation for a next symbol from the high speed changing characteristic of the transmission path and the second corrected information signal for a present symbol preceding to the next symbol to correct one first corrected information signal corresponding to the next symbol to one second corrected information signal according to the updated second correcting equation;

repeating the correction of the first correcting information signal according to the updated second correcting equation to obtain a plurality of second corrected information signals corresponding to all of the information signals; and outputting the second corrected information signals for each of the symbols.

In the above steps, after each of the reproduced information signals is corrected to one first corrected information signal according to one first correcting equation, each of the first corrected information signals is corrected to one second corrected information signal according to one second correcting equation to remove an inverse influence of a high speed changing characteristic of the transmission path from each of the first corrected information signals. Therefore, a plurality of second corrected information signals almost agreeing with the plurality of information signals can be obtained with a high reliability even though the high speed changing characteristic such as a multi-path circumstance in a mobile communication occurs in the transmission path.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of orthogonal frequency division multiplex signal transmitting method and apparatus and an orthogonal frequency division multiplex signal according to the present invention are described with reference to drawings.

Figure 1:
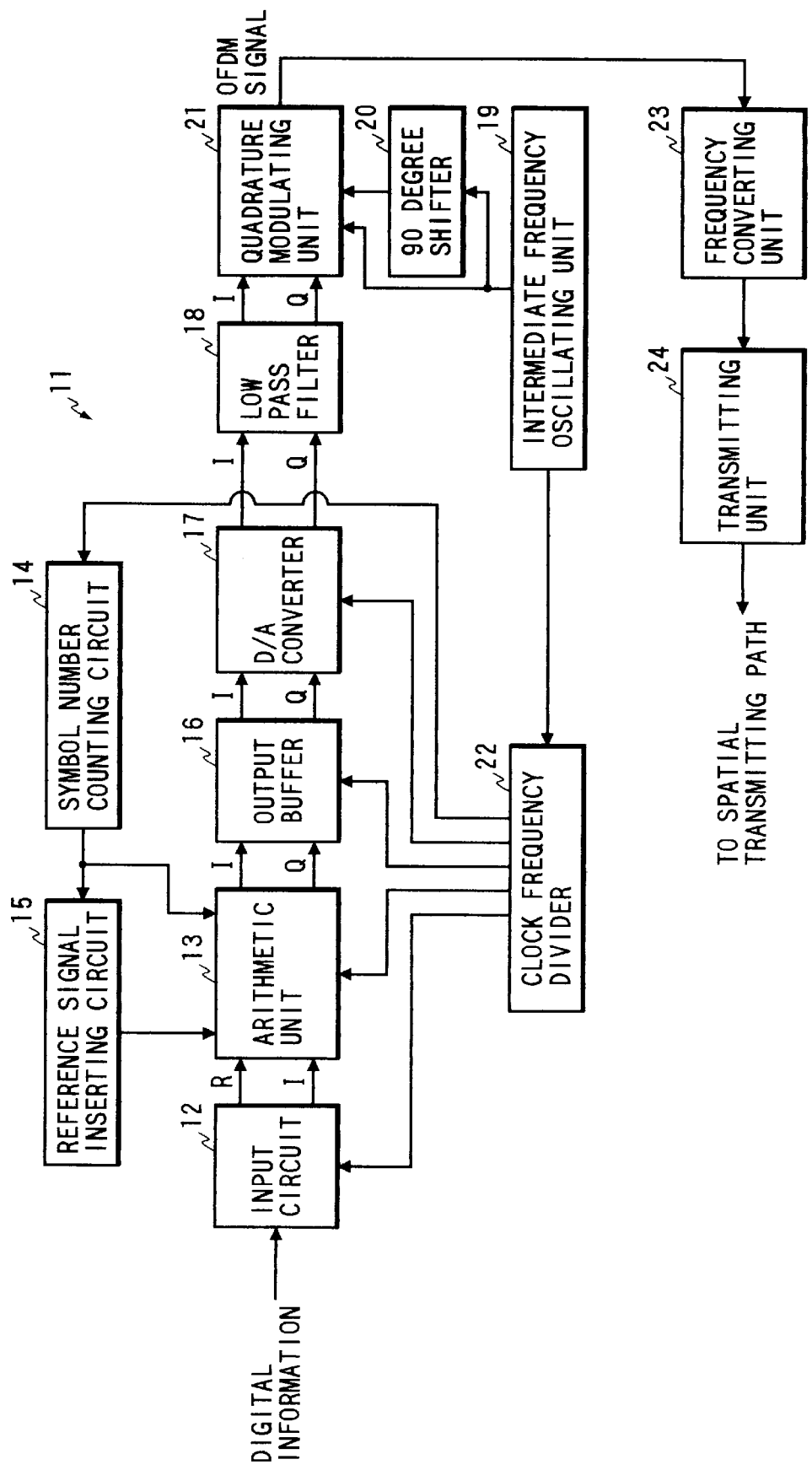
FIG. 1 is a block diagram of an orthogonal frequency division multiplex signal transmitting apparatus according to a first embodiment of the present invention.

FIG. 1 is a block diagram of an orthogonal frequency division multiplex signal transmitting apparatus according to a first embodiment of the present invention.

As shown in FIG. 1, an orthogonal frequency division multiplex signal transmitting apparatus 11 comprises an input circuit 12 for receiving a plurality of digital information signals indicating pieces of digital information in series, an arithmetic unit 13 for performing an inverse discrete Fourier transformation for a group of the digital information signals for each of symbols and producing a digital set of an in-phase signal and a quadrature signal from each of the digital information signals, a symbol number counting circuit 14 for generating a symbol number for each of the symbols on condition that the symbol numbers ranging from a minimum number to a maximum number are generated in the increasing order and the generation of the symbol numbers is circulated and inserting each of the symbol numbers into a group of the digital sets of the in-phase and quadrature signals corresponding to one symbol to indicate the number of the symbol, a reference signal inserting circuit for generating and inserting a type of reference signal into a particular digital set of the in-phase and quadrature signals which is selected from a group of the digital sets of the in-phase and quadrature signals corresponding to one symbol and is expected to be transmitted by a pair of particular carrier waves of frequencies symmetric to each other with respect to a central frequency F0 while changing the pair of particular carrier waves for each of the symbol on condition that the pair of particular carrier waves of each symbol is specified by one symbol number, an output buffer 16 for temporarily storing a plurality of digital sets of the in-phase and quadrature signals produced in the arithmetic unit 13, a digital-to-analog (D/A) converter 17 for performing a D/A conversion for the digital sets of the in-phase and quadrature signals to a plurality of analog sets of the in-phase and quadrature signals, a low pass filter 18 for passing the analog sets of the in-phase and quadrature signals of a low frequency band, an intermediate frequency oscillating unit 19 for oscillating an intermediate frequency wave, a 90 degree shifter 20 for shifting a phase of the intermediate frequency wave by 90 degrees, a quadrature modulating unit 21 for modulating a central carrier wave of the frequency F0, a plurality of positive carrier waves having difference frequencies higher than the frequency F0 and a plurality of negative carrier waves having difference frequencies lower than the frequency F0 with the symbol number, the reference signal and one analog set of the in-phase and quadrature signals for each of the symbols by using the intermediate frequency wave and the shifted intermediate frequency wave and producing an orthogonal frequency division multiplex (OFDM) signal composed of a demodulated central carrier wave and a plurality of sets of demodulated positive and negative carrier waves, by which the digital information signals, the symbol member and the reference signal are carried, for each of the symbols;

a clock frequency divider 22 for periodically generating a clock signal by dividing the intermediate frequency wave oscillated in the intermediate frequency oscillating unit 19 and transmitting each of the clock signals to the input circuit 12, the arithmetic unit 13, the output buffer 16 and the D/A converter 17, a frequency converting unit 23 for converting the modulated carrier waves of an intermediate frequency band used in the OFDM signal to modulated carrier waves of a radio frequency band, and a transmitting unit 24 for amplifying the OFDM signal carried by the carrier waves of the radio frequency band and radiating the OFDM signal to a spatial transmission path.

In the above configuration, a plurality of digital information signals respectively expressed by a complex number are input to the input circuit 12 in a stream. For example, a digital picture signal or a digital audio signal compressed according to a coding method such as a Moving Picture Experts Group (MPEG) for coding a color moving image is input as a piece of digital information. In the input circuit 12, an error correcting code is added to each of the digital information signals, if necessary, in synchronization with a clock signal transmitted from the clock frequency divider 22. In the clock frequency divider 22, an intermediate frequency of 10.7 MHz transmitted from the intermediate frequency oscillating unit 19 is divided, and a clock signal is repeatedly generated in synchronization with the divided intermediate frequency.

Thereafter, the digital information signals to which the error correcting code is added are fed to the arithmetic unit 13 in parallel. In the arithmetic unit 13, an inverse discrete Fourier transformation (IDFT) is performed for each of the digital information signals, and an analog set of an in-phase (I) signal and a quadrature (Q) signal is produced from each of the digital information signals. Also, a symbol number transmitted from the symbol number counting circuit 14 is input to a prescribed input terminal of the arithmetic unit 13 for each of the digital information signals, a reference signal transmitted from the reference signal inserting circuit 15 is input to another prescribed input terminal of the arithmetic unit 13 for each of the digital information signals, and the inverse discrete Fourier transformation is performed for the symbol number and the reference signal.

Figure 2A:
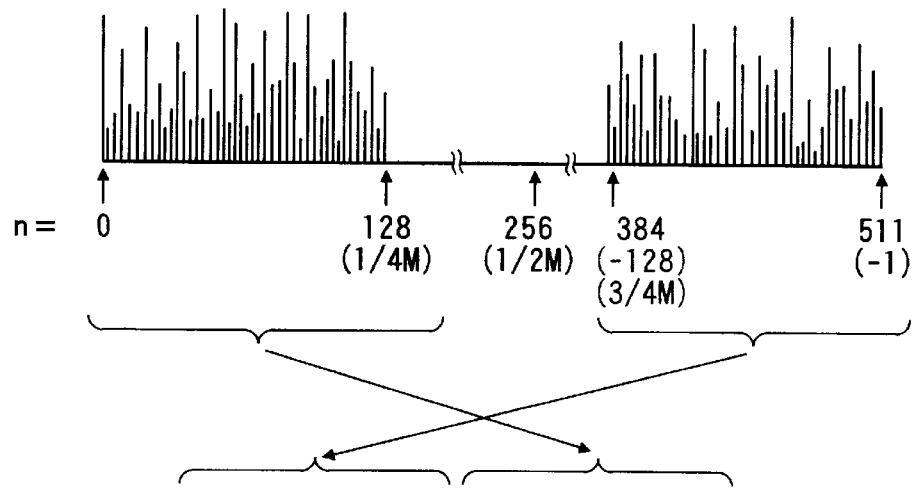
FIG. 2A shows a frequency spectrum of 256 digital information signals input to an arithmetic unit shown in FIG. 1.

For example, in cases where 254 digital information signals expected to be carried by 256 carrier waves having different frequencies are input to the arithmetic unit 13 as 254 digital information signals, the inverse discrete Fourier transformation of a twice over sampling (that is, M points IDFT, M=512) is performed for the 254 digital information signals and two pilot signals, and 256 sets of I and Q digital signals are produced. As shown in FIG. 2A, an input allocation of the carrier waves to the arithmetic unit 13 is determined as follows in the frequency order of the carrier waves. Information signals for modulating carrier waves are given to 129 carrier waves from n=0 to n=128, a level of each of carrier waves from n=129 to n=383 is set to 0 not to generate any information signal, and information signals for modulating carrier waves are given to 128 carrier waves from n=384 to n=511. That is, 512 input terminals are prepared for an imaginary part of the digital information stream in the arithmetic unit 13, and other 512 input terminals are prepared for a real part of the digital information stream in the arithmetic unit 13. The 127 information signals corresponding to the carrier waves from n=1 to n=127 are input to 127 input terminals from the first (n=1) to 127-th (n=127) input terminal, the other 127 information signals corresponding to the carrier waves from n=385 to n=511 are input to 127 input terminals from the 385-th (n=385) to 511-th (n=511) input terminal, a constant direct current voltage is input to the 0-th input terminal (n=0), a fixed voltage functioning as a pilot signal is, for example, input to the 128-th input terminal (n=M/4, M=512) and the 384-th input terminal (n=3M/4).

Therefore, in the arithmetic unit 13, 254 real signals respectively composed of 4 bits and 254 imaginary signals respectively composed of 4 bits are input as input information to the 127 input terminals from the first to 127-th input terminal and the 127 input terminals from the 385-th to 511-th input terminal, a constant voltage is input as input information to the 0-th, 128-th and 384-th input terminals, and a 0 value is input as input information to the other input terminals from the 129-th to the 383-th input terminal. Thereafter, one inverse discrete Fourier transformation of the twice over sampling is performed for each group of 256 pieces of input information to obtain a plurality of I signals and a plurality of Q signals for each symbol, a guard interval is inserted into each symbol composed of the I signals and the Q signals, and the group of I signals and the Q signals is output to the output buffer 17 every sample period. As shown in FIG. 2C, Each sample period is composed of an effective symbol period in which 256 I signals and 256 Q signals exist and a period for the guard interval.

In this case, the input information input to the 0-th input terminal is transmitted by a central carrier wave having a frequency F0, the input information input to the 128 input terminals from the first to the 128-th input terminal are transmitted by high-frequency information transmission carrier waves (hereinafter, called positive carrier waves) of which frequencies are higher than the frequency F0 of the central carrier wave, and the input information input to the 128 input terminals from the 384-th to the 511-th input terminal are transmitted by low-frequency information transmission carrier waves (hereinafter, called negative carrier waves) of which frequencies are lower than the frequency F0 of the central carrier wave. In particular, after the inverse discrete Fourier transformation is performed, the pilot signals input to the 128-th and the 384-th input terminals are transmitted by a pair of carrier waves of which frequencies are equal to both end frequencies equivalent to ½ of a Nyquist frequency. Also, a 0 value input to the 255 input terminals from the 129-th to the 383-th input terminal is treated as a ground potential not to generate any carrier wave. That is, the input information input to the 255 input terminals from the 129-th to the 383-th input terminal are not used for information transmission.

In the arithmetic unit 13, 256 I signals and 256 Q signals are produced at a burst as 512 time-axis signals from 256 pieces of input information input to the input terminals for the real part of the digital information stream and 256 pieces of input information input to the input terminals for the imaginary part of the digital information stream every inverse discrete Fourier transformation. In contrast, the I and Q signals are successively processed in the following units 17, 21, 23 and 24 at a constant data reading-out speed. Therefore, the I and Q signals are temporarily stored in the output buffer 16 to compensate for a difference in an operation speed between the arithmetic unit 13 and a group of the following units 17, 21, 23 and 24.

The I and Q signals stored in the output buffer 16 are successively read out in synchronization with the clock signal of the clock frequency divider 22 and are processed in the D/A converter 17 and the low pass filter 18. That is, the I and Q signals are converted to a plurality of I and Q analog signals in synchronization with the clock signal used as a sampling clock, and the I and Q analog signals of a required frequency band pass through the low pass filter 18 and is transmitted to the quadrature modulating unit 21.

Also, a signal having an intermediate frequency of 10.7 MHz is generated in the intermediate frequency oscillating unit 19, and a phase of the signal having the intermediate frequency is shifted by 90 degrees in the 90 degree shifter to produce a shifted signal. Thereafter, the signal having the intermediate frequency of 10.7 MHz and the shifted signal are transmitted to the quadrature modulating unit 21.

In the quadrature modulating unit 21, the signal having the intermediate frequency of 10.7 MHz is used as a first carrier wave, the shifted signal is used as a second carrier wave, and the quadrature amplitude modulation is performed for the 256 I analog signals and the 256 Q analog signals to produce an OFDM signal composed of 256 modulated carrier waves and a central carrier wave. That is, 257 carrier waves classified into the central carrier wave having the intermediate frequency of 10.7 MHz, 128 positive carrier waves of which frequencies are higher than the central frequency 10.7 MHz of the central carrier and 128 negative carrier waves of which frequencies are lower than the central frequency 10.7 MHz of the central carrier are prepared, the 128 positive carrier waves and the 128 negative carrier waves are modulated by the 256 I analog signals and the 256 Q analog signals to produce the 256 modulated carrier waves.

Thereafter, the OFDM signal output from the quadrature modulating unit 21 is frequency-converted to a radio frequency of a prescribed transmission frequency band in the frequency converting unit 23, an electric power of the OFDM signal is amplified in the transmitting unit 24, and the OFDM signal is radiated from an antenna to a spatial transmission path.

Figure 2B:
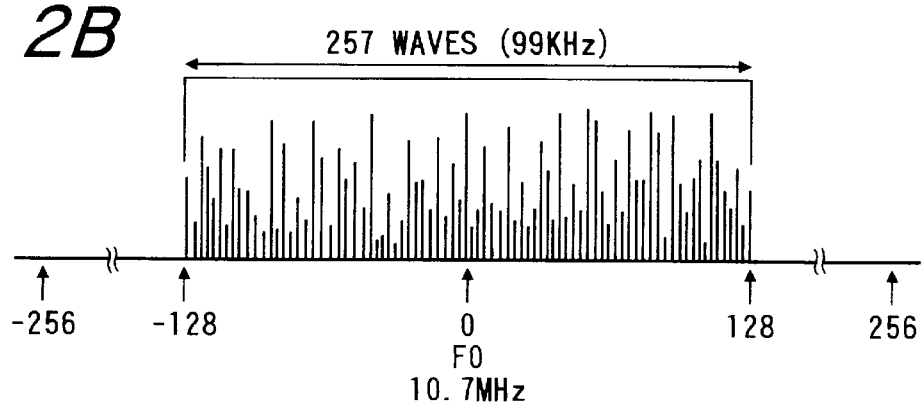
FIG. 2B shows a frequency spectrum of an OFDM signal obtained by orthogonality modulating the 256 digital information signals shown in FIG. 2A.
Figure 2C:
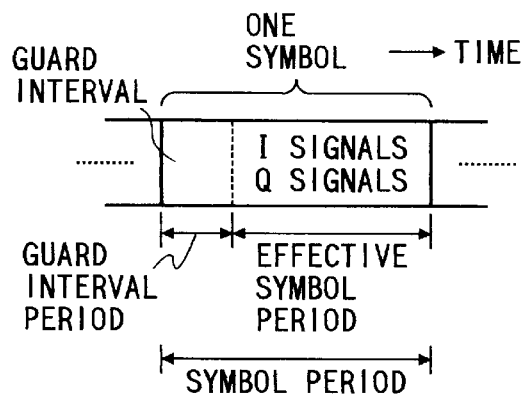
FIG. 2C shows a plurality of symbols arranged in series along a time-axis.

FIG. 2B shows an example of a frequency spectrum of the OFDM signal. In FIG. 2B, "−256" and "+256" indicate a set of a positive carrier wave and a negative carrier wave for transmitting a signal input to the 256-th (n=M/2) input terminal of the arithmetic unit 13. In this embodiment, the signal is not used. Also, "−128" indicates a negative carrier wave for transmitting a signal input to the 384-th (n=3M/4) input terminal of the arithmetic unit 13, and "+128" indicates a positive carrier wave for transmitting a signal input to the 128-th (n=M/4) input terminal of the arithmetic unit 13. The negative and positive carrier waves "−128" and "+128" are used in a set.

Figure 3:
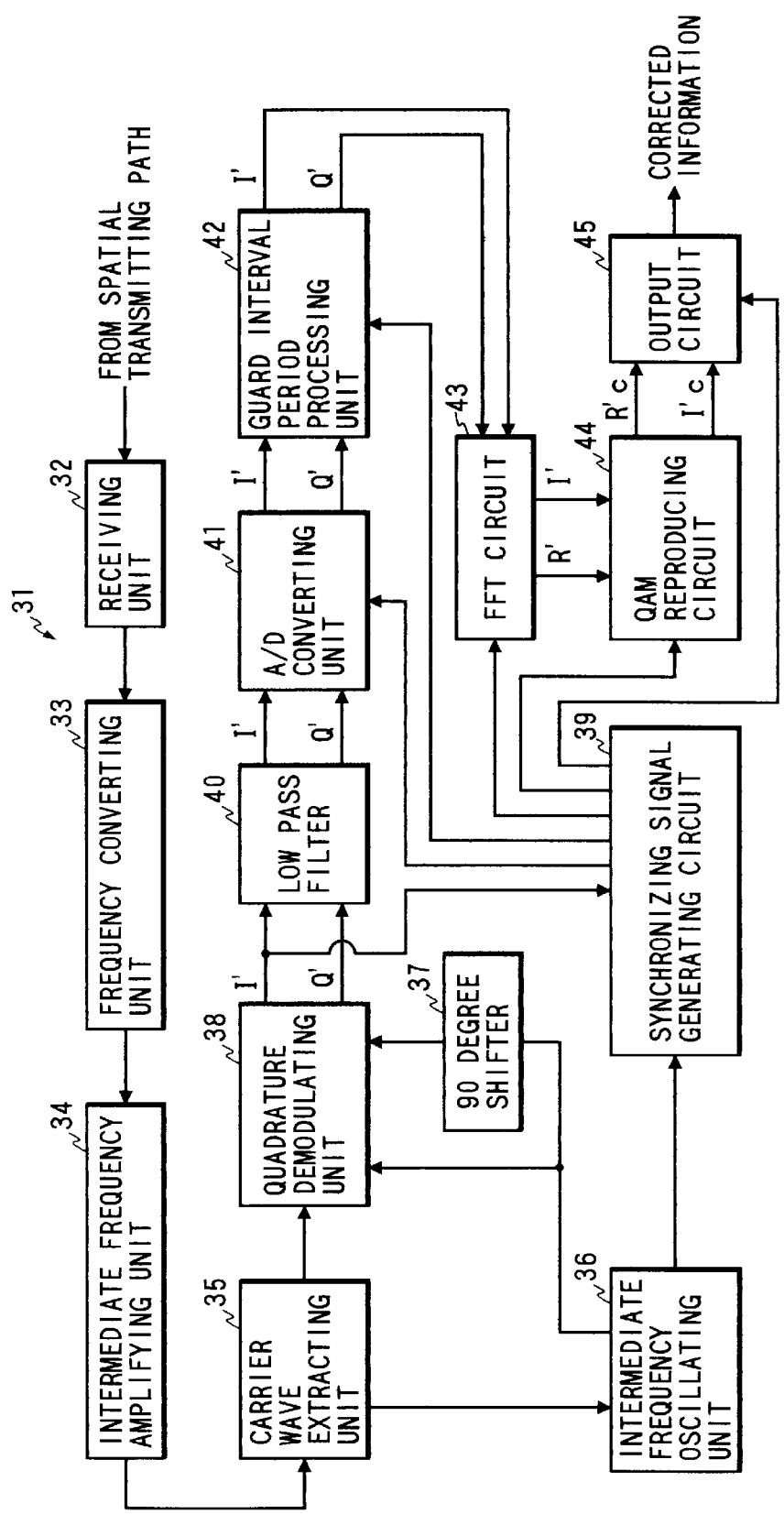
FIG. 3 is a block diagram of an orthogonal frequency division multiplex signal receiving apparatus according to the first embodiment of the present invention.

The OFDM signal transmitted from the orthogonal frequency division multiplex signal transmitting apparatus 11 is received by an orthogonal frequency division multiplex signal receiving apparatus 31 shown in FIG. 3.

FIG. 3 is a block diagram of the orthogonal frequency division multiplex signal receiving apparatus 31 according to the first embodiment of the present invention.

As shown in FIG. 3, the orthogonal frequency division multiplex signal receiving apparatus 31 comprises a receiving unit 32 for receiving and amplifying the OFDM signal for each symbol, a frequency converting unit 33 for converting the radio frequency of the OFDM signal to an intermediate frequency, an intermediate frequency amplifying unit 34 for amplifying the carrier waves used to carry the OFDM signal, a carrier wave extracting unit 35 for extracting the central carrier wave from the OFDM signal, an intermediate frequency oscillating unit 36 for generating a wave of an intermediate frequency having 10.7 MHz of which a phase is synchronized with the central carrier wave, a 90 degree shifter 37 for shifting the phase of the intermediate frequency wave by 90 degrees, a quadrature demodulating unit 38 for performing a quadrature demodulation for the OFDM signal and obtaining an analog demodulated analog OFDM signal (or a plurality of sets of demodulated analog in-phase and quadrature signals indicating a plurality of demodulated information signals, a demodulated reference signal and a demodulated symbol number) by using the intermediate frequency wave as a first demodulated carrier wave and the shifted intermediate frequency wave as a second demodulated carrier wave, a synchronizing signal generating circuit 39 for generating a system clock signal from a sample synchronizing signal and a symbol synchronizing signal produced from the analog demodulation signal, a low pass filter 40 for passing the plurality of sets of demodulated in-phase and quadrature signals of a required frequency band, an analog-to-digital (A/D) converting unit 41 for converting the plurality of sets of demodulated analog in-phase and quadrature signals to a plurality of sets of demodulated digital in-phase and quadrature signals indicating a plurality of demodulated digital information signals, the demodulated reference signal and the demodulated symbol number in synchronization with the system clock signal, a guard interval period processing circuit 42 for removing the guard interval from each symbol period according to the system clock signal to obtain a plurality of sets of demodulated in-phase and quadrature signals, a fast Fourier transformation (FFT) circuit 43 for performing a complex Fourier transformation for the plurality of sets of demodulated in-phase and quadrature signals output from the guard interval period processing circuit 42 in synchronization with the system clock signal to obtain real and imaginary parts of a plurality of reproduced digital information signals and calculating levels of the real and imaginary parts of the plurality of reproduced digital information signals, a quadrature amplitude modulation (QAM) reproducing circuit 44 for obtaining the symbol number and a reproduced reference signal from the demodulated symbol number and the demodulated reference signal, deriving a correcting equation from the reference signal known by the receiving apparatus 31 and the reproduced reference signal, and correcting the levels of the real and imaginary parts of the reproduced digital information signals to obtain a plurality of corrected information signals, and an output circuit 45 for outputting the plurality of corrected information signals to an output terminal 46.

In the above configuration, the OFDM signal transmitted through the spatial transmission path is received by the receiving unit 32 through a receiving antenna and is amplified in high frequency. Thereafter, the radio frequencies of the carrier waves of the OFDM signal are converted to intermediate frequencies in the frequency converting unit 33, the OFDM signal is amplified by the intermediate frequency amplifying unit 34.

Thereafter, a central carrier wave of the OFDM signal is extracted by the carrier extracting unit 35 with a high accuracy on condition that a phase error is lessened. In this case, the carrier waves for carrying pieces of information of the OFDM signal are spaced at every effective symbol frequency of 387 Hz. That is, frequencies of a pair of carrier waves adjacent to each other differ from each other by an effective symbol frequency of 387 Hz. Therefore, each of frequencies of two information transmitting carrier waves adjacent to the central carrier wave differ from a frequency of the central carrier wave by 387 Hz. To avoid an adverse influence of the information transmitting carrier waves adjacent to the central carrier wave when the central carrier wave is received, a circuit having a superior selectivity is required.

In this embodiment, a phase lock loop (PLL) circuit is arranged in the carrier extracting unit 35 to accurately extract the central carrier wave. In this case, a voltage control type crystal oscillating circuit (VCXO) in which a quartz oscillator oscillating at a oscillating frequency changing range of ±200 Hz equal to about ½ of the effective symbol frequency (387 Hz) is used as a voltage controlled oscillator (VCO) composing the PLL circuit, and a low pass filter in which a cut-off frequency is sufficiently low as compared with the effective symbol frequency of 387 Hz is arranged in the PLL circuit.

The central carrier wave extracted by the carrier extracting unit 35 is transmitted to the intermediate frequency oscillating unit 36, and a wave of an intermediate frequency of 10.7 MHz of which a phase is synchronized with that of the central carrier wave is oscillated. The intermediate frequency wave is fed as a first carrier wave for the demodulation of the modulated carrier waves to the quadrature demodulating unit 38. Also, the intermediate frequency wave is transmitted to the 90 degree shifter 37, a phase of the intermediate frequency wave is shifted by 90 degrees, and the shifted intermediate frequency wave is fed as a second carrier wave for the demodulation of the modulated carrier waves to the quadrature demodulating unit 38.

Therefore, the OFDM signal carried by the central carrier wave F0 is demodulated to an analog demodulated OFDM signal (or a plurality of sets of demodulated analog in-phase and quadrature signals indicating a plurality of demodulated information signals, a demodulated reference signal and a demodulated symbol number) equivalent to the analog signal input to the quadrature modulating unit 21, and the analog demodulation signal is transmitted to the low pass filter 40. The analog demodulated OFDM signal of a required frequency band passes through the low pass filter 40 and is fed to the A/D converting unit 41, and the analog demodulated OFDM signal is converted to a plurality of sets of demodulated digital in-phase and quadrature signals indicating a plurality of demodulated digital information signals, the demodulated reference signal and the demodulated symbol number.

In this case, a sampling operation in the A/D converting unit 41 for the analog demodulated OFDM signal transmitted from the LPF 40 is performed in synchronization with a sample synchronizing signal generated in the synchronizing signal generating circuit 39. The sample synchronizing signal is produced from a pilot signal, and a sample clock frequency of the sample synchronizing signal is twice as high as a Nyquist frequency. That is, because a frequency of the pilot signal is half of the Nyquist frequency, a frequency of the pilot signal is multiplied by 4, so that the sample synchronizing signal having the sample clock frequency is obtained.

Figure 2D:
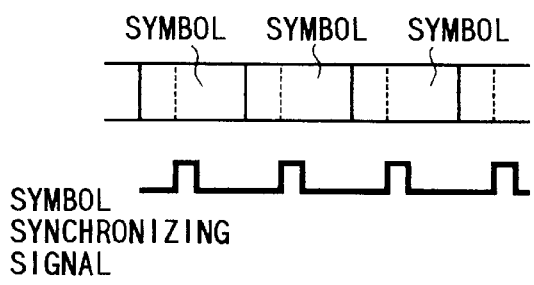
FIG. 2D is a timing chart of a symbol synchronizing signal and a series of symbols.

The synchronizing signal generating circuit 39 comprises a sample synchronizing signal generating unit having a PLL circuit for receiving the central carrier from the carrier wave extracting unit 35 and generating a sample synchronizing signal of which a phase is synchronized with that of a pilot signal transmitted as a successive signal at each symbol period including the guard interval period, a symbol synchronizing signal generating unit for examining a phase condition of the pilot signal by using a signal taken out from a part of the sample synchronizing signal generating unit, detecting the symbol period and generating a symbol synchronizing signal, and a system clock generating unit for generating a system clock signal such as an interval signal used for the removal of the guard interval period from the sample synchronizing signal and the symbol synchronizing signal. The symbol synchronizing signal having a pulse for each symbol is shown in FIG. 2D.

The plurality of sets of demodulated digital in-phase and quadrature signals fed from the A/D converting unit 41 are transmitted to the guard interval period processing circuit 42 for each symbol, a plurality of sets of demodulated in-phase and quadrature signals in each effective symbol period in which an inverse influence of a multi-path distortion is reduced because of the addition of the guard interval period to the symbol period are obtained by removing the guard interval period from the symbol period in the processing circuit 42 in synchronization with the system clock signal, and the plurality of sets of digital in-phase and quadrature signals are fed to the FFT circuit 43. In the FFT circuit 43, a complex Fourier transformation is performed for the plurality of sets of digital in-phase and quadrature signals in synchronization with the system clock signal, a plurality of sets of reproduced in-phase and quadrature signals indicating a plurality of reproduced digital information signals, a reproduced reference signal and the symbol number in synchronization with the system clock signal and levels of real and imaginary parts of the plurality of reproduced information signals carried by the modulated carrier waves through the spatial transmission path are calculated.

The levels of the real and imaginary parts of the plurality of reproduced information signals are compared in the QAM reproducing circuit 44 with an output of a reproduced signal corresponding to a pair of particular positive and negative carrier waves which transmit one reference signal known by the receiving apparatus 31. That is, each of the levels of the real and imaginary parts of the plurality of reproduced digital information signals carried by the modulated carrier waves is corrected in the QAM reproducing circuit 44 to obtain a plurality of corrected information signals from the reproduced digital information signals. The corrected information signals are processed in the output circuit 45. That is, the corrected information signals transmitted to the output circuit 45 in parallel are changed to the corrected information signals arranged in series. Thereafter, the corrected digital information signals are output to the output terminal 46.

Figure 4:
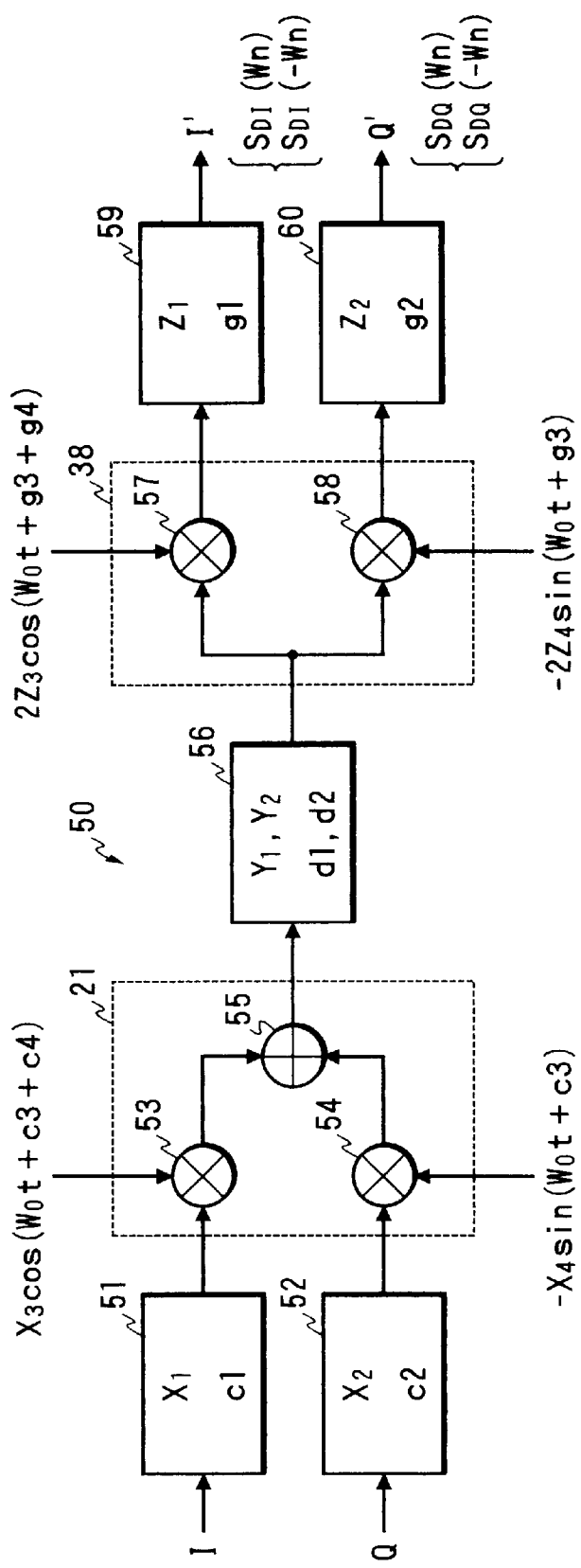
FIG. 4 is a block diagram of an orthogonal frequency division multiplex signal transmitting and receiving apparatus in which a group of I and Q signals are processed according to the first embodiment of the present invention.

In cases where only the transmission of the I and Q signals is considered, a set of the orthogonal frequency division multiplex signal transmitting apparatus 11 and the orthogonal frequency division multiplex signal receiving apparatus 31 used to perform a frequency division multiplex signal transmitting method according to the first embodiment is simply expressed by an orthogonal frequency division multiplex signal transmitting and receiving apparatus shown in FIG. 4.

FIG. 4 is a block diagram of an orthogonal frequency division multiplex signal transmitting and receiving apparatus in which the I and Q signals are processed.

As shown in FIG. 4, an orthogonal frequency division multiplex signal transmitting and receiving apparatus 50 comprises a set of an in-phase signal processing unit 51 and a quadrature signal processing unit 52 corresponding to a group of the D/A converting unit 17, the LPF 18 and a multiplier (not shown), a set of a first multiplier 53, a second multiplier 54 and an adder 55 corresponding to the quadrature modulating unit 21, a transmission system circuit 56 corresponding to a group of the frequency converting unit 23, the transmitting unit 24, characteristics of the spatial transmission path, the receiving unit 32, a band pass filter (not shown), the frequency converting unit 33 and the intermediate frequency amplifying unit 34, a set of a first multiplier 57 and a second multiplier 58 corresponding to a group of the carrier extracting unit 35 and the quadrature demodulating unit 38, and a set of an in-phase signal processing unit 59 and a quadrature signal processing unit 60 corresponding to a group of the LPF 40 and the A/D converting unit 41.

When a digital information signal allocated to a positive carrier wave of a frequency +Wn is expressed by a complex number (p+jq), the complex number (p+jq) is transformed to a set of in-phase (I) signals $S_I(Wn)$ and quadrature (Q) signals $S_Q(Wn)$ having a time-axis waveform in the arithmetic unit 13 according to the inverse discrete Fourier transformation. Also, when another digital information signal allocated to a negative carrier wave of a frequency −Wn symmetric to the positive carrier wave with respect to the central carrier wave of the frequency F0 is expressed by another complex number (r+ju), the complex number (r+ju) is transformed to a set of in-phase (I) signals $S_I(-Wn)$ and quadrature (Q) signals $S_Q(-Wn)$ having a time-axis waveform in the arithmetic unit 13 according to the inverse discrete Fourier transformation. The I and Q signals are formulated as follows.

$$S_I(Wn)=A*\cos(+Wn*t+a) \quad (1)$$

$$S_Q(Wn)=A*\sin(+Wn*t+a) \quad (2)$$

$$S_I(-Wn)=B*\cos(-Wn*t+b) \quad (3)$$

$$S_Q(-Wn)=B*\sin(-Wn*t+b) \quad (4)$$

Here, $A=\sqrt{(p^2+q^2)}$, $a=\tan^{-1}(q/p)$, $B=\sqrt{(r^2+u^2)}$ and $b=\tan^{-1}(u/r)$ are satisfied. $S_I(Wn)$ denotes an I signal for the complex number (p+jq), $S_Q(Wn)$ denotes a Q signal for the complex number (p+jq), $S_I(-Wn)$ denotes an I signal for the complex number (r+ju), and $S_Q(-Wn)$ denotes a Q signal for the complex number (r+ju). When the I signals $S_I(Wn)$ and $S_I(-Wn)$ are input to the in-phase signal processing unit 51, an amplitude of each of the I signals is changed by a factor X1, and a phase of each of the I signals is changed by a factor c1. Also, when the Q signals $S_Q(Wn)$ and $S_Q(-Wn)$ are input to the quadrature signal processing unit 52, an amplitude of each of the Q signals is changed by a factor X2, and a phase of each of the Q signals is changed by a factor c2. The I signals $S_I(Wn)$ and $S_I(-Wn)$ output from the processing unit 51 are expressed according to equations (5) and (7), and the Q signals $S_Q(Wn)$ and $S_Q(-Wn)$ output from the processing unit 52 are expressed according to equations (6) and (8).

$$S_I(Wn)=X1*A*\cos(+Wn*t+a+c1) \quad (5)$$

$$S_Q(Wn)=X2*A*\sin(+Wn*t+a+c2) \quad (6)$$

$$S_I(-Wn)=X1*B*\cos(-Wn*t+b+c1) \quad (7)$$

$$S_Q(-Wn)=X2*B*\sin(-Wn*t+b+c2) \quad (8)$$

Thereafter, the I signals $S_I(Wn)$ and $S_I(-Wn)$ are multiplied by a first modulating wave $X3*\cos(W0*t+c3+c4)$ in the first multiplier 53 to modulate the I signals, so that the I signals $S_I(WN)$ and $S_I(-Wn)$ are expressed according to equations (9) and (10). Also, the Q signals $S_Q(Wn)$ and $S_Q(-Wn)$ are multiplied by a second modulating wave $X4*\sin(W0*t+c3)$ in the second multiplier 54 to modulate the Q signals, so that the Q signals $S_Q(Wn)$ and $S_Q(-Wn)$ are expressed according to equations (11) and (12).

$$S_I(Wn)=X1*A*\cos(Wn*t+a+c1)*X3*\cos(W0*t+c3+c4)=$$
$$(\tfrac{1}{2})*X1*X3*A\{\cos((W0+Wn)t+a+c1+c3+c4)+\cos((W0-Wn)t-a-c1+c3+c4)\} \quad (9)$$

$$S_I(-Wn)=X1*B*\cos(-Wn*t+b+c1)*X3*\cos(W0*t+c3+c4)=$$
$$(\tfrac{1}{2})*X1*X3*B\{\cos((W0-Wn)t+b+c1+c3+c4)+\cos((W0+Wn)t-b-c1+c3+c4)\} \quad (10)$$

$$S_Q(Wn)=X2*A*\sin(Wn*t+a+c2)*(-X4)*\sin(W0*t+c3)=$$
$$(\tfrac{1}{2})*X2*X4*A\{\cos((W0+Wn)t+a+c2+c3)-\cos((W0-Wn)t-a-c2+c3)\} \quad (11)$$

$$S_Q(-Wn)=X2*B*\sin(-Wn*t+b+c2)*(-X4)*\sin(W0*t+c3)=$$
$$(\tfrac{1}{2})*X2*X4*B\{\cos((W0-Wn)t+b+c2+c3)-\cos((W0+Wn)t-b-c2+c3)\} \quad (12)$$

Here, the factor c4 denotes an error in orthogonality. The I and Q signals $S_I(Wn)$, $S_I(-Wn)$, $S_Q(Wn)$ and $S_Q(-Wn)$ are added to each other in the adder 55 to obtain a combined signal Sc(Wn,−Wn). In cases where an amplitude change or a phase change occurs in the adder 55, the amplitude change is absorbed by the factor X1 or X3 for the I signals and the factor X2 or X4 for the Q signals, and the phase change is absorbed by the factor C3+c4 for the I signals and the factor c3 for the Q signals. A (W0+Wn) component of the combined signal Sc(Wn,−Wn) is expressed according to an equation (13), and a (W0−Wn) component of the combined signal Sc(Wn,−Wn) is expressed according to an equation (14).

(W0+Wn) component:

$$(\tfrac{1}{2})[X1*X3\{A\cos((W0+Wn)t+a+c1+c3+c4)+B\cos((W0+Wn)t-b-c1+c3+c4)\}+X2*X4\{A\cos((W0+Wn)t+a+c2+c3)-B\cos((W0+Wn)t-b-c2+c3)\}] \quad (13)$$

(W0−Wn) component:

$$(\tfrac{1}{2})[X1*X3\{B\cos((W0-Wn)t+b+c1+c3+c4)+A\cos((W0-Wn)t-a-c1+c3+c4)\}+X2*X4\{B\cos((W0-Wn)t+b+c2+c3)-A\cos((W0-Wn)t-a-c2+c3)\}] \quad (14)$$

The combined signal Sc(Wn,−Wn) transmits through the transmission system circuit 56. In this case, an influence of a transmission system including an influence of a multi-path circumstance is exerted on the I and Q signals of the combined signal Sc(Wn,−Wn), so that characteristic changes such as an amplitude change and a phase change occur in each of the I and Q signals. An amplitude change in each of the signals $S_I(Wn)$ and $S_Q(Wn)$ is expressed by a factor Y1, and an amplitude change in each of the signals $S_I(-Wn)$ and $S_Q(-Wn)$ is expressed by a factor Y2, a phase change in each of the signals $S_I(Wn)$ and $S_Q(Wn)$ is expressed by a factor d1, and a phase change in each of the signals $S_I(-Wn)$ and $S_Q(-Wn)$ is expressed by a factor d2. A (W0+Wn) component of the combined signal Sc(Wn,−Wn) influenced by the transmission system is expressed according to an equation (15), and a (W0−Wn) component of the combined signal Sc(Wn,−Wn) influenced by the transmission system is expressed according to an equation (16).

(W0+Wn) component:

$$(1/2)[X1X3Y1\{A\cos((W0+Wn)t+a+c1+c3+c4+d1)+B\cos((W0+Wn)t-b-c1+c3+c4+d1)\}$$

$$+X2X4Y1\{A\cos((W0+Wn)t+a+c2+c3+d1)-B\cos((W0+Wn)t-b-c2+c3+d1)\}] \tag{15}$$

(W0−Wn) component:

$$(1/2)[X1X3Y2\{B\cos((W0-Wn)t+b+c1+c3+c4+d2)+A\cos((W0-Wn)t-a-$$

$$c1+c3+c4+d2)\}+X2X4Y2\{B\cos((W0-Wn)t+b+c2+c3+d2)-A\cos((W0-Wn)t-a-c2+c3+d2)\}] \tag{16}$$

Thereafter, the I and Q signals of the combined signal Sc(Wn,−Wn) are quadrature-demodulated by the multipliers 57 and 58. In this case, an error in orthogonality is indicated by a factor g4, a demodulation carrier wave for the I signals is expressed by $2*Z3*\cos(W0*t+g3+g4)$, and a demodulation carrier wave for the Q signals is expressed by $-2*Z4*\sin(W0*t+g3)$. Therefore, the demodulated I signal having a +Wn component generated from the (W0+Wn) component is expressed according to an equation (17), and the demodulated Q signal having a +Wn component generated from the (W0+Wn) component is expressed according to an equation (18). In this case, higher harmonic waves are omitted.

$$S_I(Wn) = (1/2)[X1X3Y1\{A\cos((W0+Wn)t+a+c1+ \tag{17}$$
$$c3+c4+d1)+B\cos((W0+Wn)t-b-c1+c3+$$
$$c4+d1)\}+X2X4Y1\{A\cos((W0+Wn)t+a+c2+$$
$$c3+d1)-B\cos((W0+Wn)t-b-c2+c3+d1)\}]*$$
$$2*Z3*\cos(W0*t+g3+g4)$$
$$= (1/2)[X1X3Y1Z3\{A\cos(Wn*t+a+c1+c3+c4+$$
$$d1-g3-g4)+B\cos(Wn*t-b-c1+c3+c4+$$
$$d1-g3-g4)\}+X2X4Y1Z3\{A\cos(Wn*t+a+c2+$$
$$c3+d1-g3-g4)-B\cos(Wn*t-b-c2+c3+$$
$$d1-g3-g4)\}]$$

$$S_Q(Wn) = (1/2)[X1X3Y1\{A\cos((W0+Wn)t+a+c1+ \tag{18}$$
$$c3+c4+d1)+B\cos((W0+Wn)t-b-c1+c3+$$
$$c4+d1)\}+X2X4Y1\{A\cos((W0+Wn)t+a+c2+$$
$$c3+d1)-B\cos((W0+Wn)t-b-c2+c3+d1)\}]*$$
$$(-2)*Z4*\sin(W0*t+g3)$$
$$= (1/2)[X1X3Y1Z4\{A\sin(Wn*t+a+c1+c3+c4+$$
$$d1-g3)+B\sin(Wn*t-b-c1+c3+c4+$$
$$d1-g3)\}+X2X4Y1Z4\{A\sin(Wn*t+a+c2+$$
$$c3+d1-g3)-B\sin(Wn*t-b-c2+c3+d1-$$
$$g3)\}]$$

Also, the demodulated I signal having a −Wn component generated from the (W0−Wn) component is expressed according to an equation (19), and the demodulated Q signal having a −Wn component generated from the (W0−Wn) component is expressed according to an equation (20). In this case, higher harmonic waves are omitted.

$$S_I(-Wn) = (1/2)[X1X3Y2\{B\cos((W0-Wn)t+b+c1+ \tag{19}$$
$$c3+c4+d2)+A\cos((W0+Wn)t-a-c1+c3+$$
$$c4+d2)\}+X2X4Y2\{B\cos((W0-Wn)t+b+c2+$$
$$c3+d2)-A\cos((W0-Wn)t-a-c2+c3+$$
$$d2)\}]*2*Z3*\cos(W0*t+g3+g4)$$
$$= (1/2)[X1X3Y2Z3\{B\cos(-Wn*t+b+c1+c3+$$
$$c4+d2-g3-g4)+A\cos(-Wn*t-a-c1+$$
$$c3+c4+d2-g3-g4)\}+X2X4Y2Z3\{B\cos(-Wn*$$
$$t+b+c2+c3+d2-g3-g4)-A\cos(-Wn*$$
$$t-a-c2+c3+d2-g3-g4)\}]$$

$$S_Q(-Wn) = (1/2)[X1X3Y2\{B\cos((W0+Wn)t+b+c1+ \tag{20}$$
$$c3+c4+d2)+A\cos((W0-Wn)t-a-c1+c3+$$
$$c4+d2)\}+X2X4Y2\{B\cos((W0-Wn)t+b+c2+$$
$$c3+d2)-A\cos((W0-Wn)t-a-c2+c3+$$
$$d2)\}]*(-2)*Z4*\sin(W0*t+g3)$$
$$= (1/2)[X1X3Y2Z4\{B\sin(-Wn*t+b+c1+c3+$$
$$c4+d2-g3)+A\sin(-Wn*t-a-c1+c3+$$
$$c4+d2-g3)\}+X2X4Y2Z4\{B\sin(-Wn*t+b+$$
$$c2+c3+d2-g3)-A\sin(-Wn*t-a-c2+$$
$$c3+d2-g3)\}]$$

The I signals $S_I(Wn)$ and $S_I(-Wn)$ output from the multiplier 57 are processed in the in-phase signal processing unit 59. That is, an amplitude of each of the I signals $S_I(Wn)$ and $S_I(-Wn)$ is changed by a factor Z1, a phase of each of the I signals $S_I(Wn)$ and $S_I(-Wn)$ is changed by a factor g1, and demodulated in-phase (I) signals $S_{DI}(Wn)$ and $S_{DI}(-Wn)$ are output from the processing unit 59. Also, the Q signals $S_Q(Wn)$ and $S_Q(-Wn)$ output from the multiplier 58 are processed in the quadrature signal processing unit 60. That is, an amplitude of each of the Q signals $S_Q(Wn)$ and $S_Q(-Wn)$ is changed by a factor Z2, a phase of each of the Q signals $S_Q(Wn)$ and $S_Q(-Wn)$ is changed by a factor g2, and demodulated quadrature (Q) signals $S_{DQ}(Wn)$ and $S_{DQ}(-Wn)$ are output from the processing unit 60. The demodulated I signal $S_{DI}(Wn)$ carried by the positive carrier wave of the frequency +Wn is expressed according to an equation (21), the demodulated Q signal $S_{DQ}(Wn)$ carried by the positive carrier wave of the frequency +Wn is expressed according to an equation (22), the demodulated I signal $S_{DI}(-Wn)$ carried by the negative carrier wave of the frequency −Wn is expressed according to an equation (23), and the demodulated Q signal $S_{DQ}(-Wn)$ carried by the negative carrier wave of the frequency −Wn is expressed according to an equation (24).

$$S_{DI}(Wn) = (1/2)*\{+X1X3Y1Z1Z3A\cos(Wn*t+a+c1+ \tag{21}$$
$$c3+c4+d1-g3-g4+g1)+X2X4Y1Z1Z3$$
$$A\cos(Wn*t+a+c2+c3+d1-g3-g4+g1)+$$
$$X1X3Y1Z1Z3B\cos(Wn*t-b-c1+c3+c4+$$
$$d1-g3-g4+g1)-X2X4Y1Z1Z3B\cos(Wn*t-$$
$$b-c2+c3+d1-g3-g4+g1)\}$$

$$S_{DQ}(Wn) = (1/2)*\{+X1X3Y1Z2Z4A\sin(Wn*t+a+c1+ \tag{22}$$
$$c3+c4+d1-g3+g2)+X2X4Y1Z2Z4$$
$$A\sin(Wn*t+a+c2+c3+d1-g3+g2)+$$
$$X1X3Y1Z2Z4B\sin(Wn*t-b-c1+c3+c4+$$
$$d1-g3+g2)-X2X4Y1Z2Z4B\sin(Wn*t-$$
$$b-c2+c3+d1-g3+g2)\}$$

-continued $$S_{DI}(-Wn) = (1/2) * \{+X1X3Y2Z1Z3B\cos(-Wn*t+b+c1+ \quad (23)$$
$$c3+c4+d2-g3-g4+g1)+X2X4Y2Z1Z3$$
$$B\cos(-Wn*t+b+c2+c3+d2-g3-g4+$$
$$g1)+X1X3Y2Z1Z3A\cos(-Wn*t-a-c1+$$
$$c3+c4+d2-g3-g4+g1)-X2X4Y2Z1Z3$$
$$A\cos(-Wn*t-a-c2+c3+d2-g3-$$
$$g4+g1)\}$$

$$S_{DQ}(-Wn) = (1/2) * \{+X1X3Y2Z2Z4B\sin(-Wn*t+b+c1+ \quad (24)$$
$$c3+c4+d2-g3+g2)+X2X4Y2Z2Z4$$
$$B\sin(-Wn*t+b+c2+c3+d2-g3+g2)+$$
$$X1X3Y2Z2Z4A\sin(-Wn*t-a-c1+c3+c4+$$
$$d2-g3+g2)-X2X4Y2Z2Z4A\sin(-Wn*t-$$
$$a-c2+c3+d2-g3+g2)\}$$

Thereafter, a discrete Fourier transformation is performed for the demodulated I and Q signals $S_{DI}(Wn), S_{DQ}(Wn), S_{DI}(-Wn)$ and $S_{DQ}(-Wn)$, and a Wn component and a $-Wn$ component are respectively obtained in a form of a complex number. That is, in cases where the demodulated I and Q signals $S_{DI}(Wn)$ and $S_{DQ}(Wn)$ are indicated by an exponential function and the demodulated I and Q signals $S_{DI}(-Wn)$ and $S_{DQ}(-Wn)$ are indicated by another exponential function, the above operation denotes that a combination of a length and a phase in each of rotational vectors $\exp\{j(+Wn*t)\}$ and $\exp\{-j(+Wn*t)\}$ is calculated. In detail, in cases where the demodulated I and Q signals $S_{DI}(Wn)$ and $S_{DQ}(Wn)$ are expressed by an exponential function by setting the demodulated I signal $S_{DI}(Wn)$ as a real number part and setting the demodulated Q signal $S_{DQ}(Wn)$ as an imaginary number part, an equation (25) is obtained. +Wn component:

$$(1/4)\exp j(+Wn*t+c3-g3)* \quad (25)$$
$$[A\exp ja\{+X'Y'Z'\exp j(+c1+c4+d1-g4+g1)+$$
$$XY'Z'\exp j(+c2+d1-g4+g1)+$$
$$X'YZ'\exp j(+c1-c4-d2+g4-g1)-$$
$$XYZ'\exp j(+c2-d2+g4-g1)+$$
$$X'Y'Z\exp j(+c1+c4+d1+g2)+$$
$$XY'Z\exp j(+c2+d1+g2)-X'YZ\exp j$$
$$(+c1-c4-d2-g2)+XYZ\exp j(+c2-d2-g2)\}+$$
$$B\exp-jb\{+X'YZ'\exp j(-c1-c4-d2+g4-g1)+$$
$$XYZ'\exp j(-c2-d2+g4-g1)+$$
$$X'Y'Z'\exp j(-c1+c4+d1-g4+g1)-$$
$$XY'Z'\exp j(-c2+d1-g4+g1)-X'YZ\exp j$$
$$(-c1-c4-d2-g2)-XYZ\exp j(-c2-d2-g2)+$$
$$X'Y'Z\exp j(-c1+c4+d1+g2)-$$
$$XY'Z\exp j(-c2+d1+g2)\}]$$

Here, $X'=X1X3$, $X=X2X4$, $Z'=Z1Z3$, $Z=Z2Z4$, $Y'=Y1$ and $Y=Y2$ are satisfied. Also, in cases where the demodulated I and Q signals $S_{DI}(-Wn)$ and $S_{DQ}(-Wn)$ are expressed by an exponential function by setting the demodulated I signal $S_{DI}(-Wn)$ as a real number part and setting the demodulated Q signal $S_{DQ}(-Wn)$ as an imaginary number part, an equation (26) is obtained. $-Wn$ component:

$$(1/4)\exp j(-Wn*t+c3-g3)* \quad (26)$$
$$[B\exp jb\{+X'YZ'\exp j(+c1+c4+d2-g4+g1)+$$
$$XYZ'\exp j(+c2+d2-g4+g1)+$$
$$X'Y'Z'\exp j(+c1-c4-d1+g4-g1)-$$
$$XY'Z'\exp j(+c2-d1+g4-g1)+$$
$$X'YZ\exp j(+c1+c4+d2+g2)+$$
$$XYZ\exp j(+c2+d2+g2)-X'Y'Z\exp j$$
$$(+c1-c4-d1-g2)+XY'Z\exp j(+c2-d1-g2)\}+$$
$$A\exp-ja\{+X'Y'Z'\exp j(-c1-c4-d1+g4-g1)+$$
$$XY'Z'\exp j(-c2-d1+g4-g1)+$$
$$X'YZ'\exp j(-c1+c4+d2-g4+g1)-$$
$$XYZ'\exp j(-c2+d2-g4+g1)-X'Y'Z\exp j$$
$$(-c1-c4-d1-g2)-XY'Z\exp j(-c2-d1-g2)+$$
$$X'YZ\exp j(-c1+c4+d2+g2)-$$
$$XYZ\exp j(-c2+d2+g2)\}]$$

That is, a length and a phase in each of the rotational vectors of the Wn and $-Wn$ components are obtained by combining 16 vectors. Because the Wn component is expressed by $A'\exp j(+Wn*t+a')$ and the $-Wn$ component is expressed by $B'\exp j(-Wn*t+b')$, the Wn component apparently denotes a complex number $p'+jq'$, and the $-Wn$ component apparently denotes a complex number $r'+ju'$.

In cases where the Wn and $-Wn$ components of the equations (25) and (26) are again expressed by complex numbers by using coefficients S0 to S7, $$(p'+jq')=(p+jq)(S0+jS1)+(r-ju)(S2+jS3) \quad (27)$$

$$(r'+ju')=(r+ju)(S6+jS7)+(p-jq)(S4+jS5) \quad (28)$$

are obtained as a result of the discrete Fourier transformation. That is, $$\begin{pmatrix} p' \\ q' \\ r' \\ u' \end{pmatrix} = \begin{pmatrix} S0, & -S1, & S2, & S3 \\ S1, & S0, & S3, & -S2 \\ S4, & S5, & S6, & -S7 \\ S5, & -S4, & S7, & S6 \end{pmatrix} \begin{pmatrix} p \\ q \\ r \\ u \end{pmatrix} \quad (29)$$

is satisfied. Therefore, the coefficient S0 denotes a transfer coefficient for transferring a real number part of the positive modulation carrier wave to a real number part of the positive demodulation carrier wave and transferring an imaginary number part of the positive modulation carrier wave to an imaginary number part of the positive demodulation carrier wave. The coefficient S1 denotes a leaking coefficient for leaking a real number part of the positive modulation carrier wave to an imaginary number part of the positive demodulation carrier wave and leaking an imaginary number part of the positive modulation carrier wave to a real number part of the positive demodulation carrier wave. The coefficient S2 denotes a leaking coefficient for leaking a real number part of the negative modulation carrier wave to a real number part of the positive demodulation carrier wave and leaking an imaginary number part of the negative modulation carrier wave to an imaginary number part of the positive demodulation carrier wave. The coefficient S3 denotes a leaking coefficient for leaking a real number part of the negative modulation carrier wave to an imaginary number part of the positive demodulation carrier wave and leaking an imaginary number part of the negative modulation carrier wave to a real number part of the positive demodulation carrier wave. The coefficient S4 denotes a leaking coefficient for leaking a real number part of the positive modulation carrier wave to a real number part of the negative demodulation carrier wave and leaking an imaginary number part of the positive modulation carrier wave to an imaginary number part of the negative demodulation carrier wave. The coefficient S5 denotes a leaking coefficient for leaking a real number part of the positive modulation carrier wave to an imaginary number part of the negative demodulation carrier wave and leaking an imaginary number part of the positive modulation carrier wave to a real number part of the negative demodulation carrier wave. The coefficient S6 denotes a transfer coefficient for transferring a real number part of the negative modulation carrier wave to a real number part of the negative demodulation carrier wave and transferring an imaginary number part of the negative modulation carrier wave to an imaginary number part of the negative demodulation carrier wave. The coefficient S7 denotes a leaking coefficient for leaking a real number part of the negative modulation carrier wave to an imaginary number part of the negative demodulation carrier wave and leaking an imaginary number part of the negative modulation carrier wave to a real number part of the negative demodulation carrier wave. The description that each of the coefficients is positive or negative is omitted.

That is, the coefficients S0 to S7 indicate transmission characteristics of a transmission path for the I and Q signals. Therefore, the transmission characteristics can be detected by calculating the coefficients S0 to S7. Also, in cases where an inverse matrix of a matrix in the equation (29) is calculated, received data can be corrected, and transmission data can be estimated.

Therefore, a symbol number is generated in the symbol number counting circuit 14 of the transmitting apparatus 11 for each of symbols on condition that the symbol numbers are generated in the increasing order and the generation of the symbol numbers is circulated when the symbol number reaches a maximum number. That is, the symbol numbers 0,1,2, - - - ,254,255,0 ,1,2, - - - are generated in that order at symbols. The symbol numbers are fed one by one to the arithmetic unit 13 and the reference signal inserting circuit 15. In the arithmetic unit 13, each of the symbol numbers is inserted into a corresponding particular carrier wave (for example, the central carrier wave).

Also, in the reference signal inserting circuit 15, a reference signal indicated by two values which each are a complex number, a real number or an imaginary number is generated, and one value (one complex number, one real number or one imaginary number) of the reference signal is inserted into a digital information signal carried by a carrier wave of the frequency +Wn for each symbol as a piece of reference data known in the orthogonal frequency division multiplex signal receiving apparatus 31. Also, the other value (one complex number, one real number or one imaginary number) of the reference signal is inserted into another digital information signal carried by a carrier wave of the frequency −Wn, which is symmetric to the frequency +Wn with respect to the frequency F0 of the central carrier wave in the same symbol, as the piece of reference data because there is a probability that the digital information signal carried by the carrier wave of the frequency +Wn leaks to the digital information signal carried by the carrier wave of the frequency −Wn as an image component or crosstalk. The reference signal inserted into a pair of digital information signals carried by the pair of carrier waves of the frequencies +Wn and −Wn in one symbol is specified by one symbol number inserted into the same symbol. The frequency of the carrier wave in which the reference signal is inserted is predetermined in correspondence to one symbol number and is changed to another frequency every prescribed time because transmission characteristics for one frequency often differ from those for another frequency.

As an example, one of two types of reference signals is inserted into a carrier wave specified by one symbol number. That is, in cases where the carrier wave is specified by an even symbol number, a first type of reference signal expressed by a matrix according to an equation (30) is inserted into a pair of carrier waves of an even symbol as a known value. Also, in cases where the carrier wave is specified by an odd symbol number, a second type of reference signal expressed by a matrix according to an equation (31) is inserted into a pair of carrier waves of an odd symbol as another known value.

$$\begin{pmatrix} p \\ q \\ r \\ u \end{pmatrix} = \begin{pmatrix} p_s \\ 0 \\ 0 \\ 0 \end{pmatrix} \tag{30}$$

$$\begin{pmatrix} p \\ q \\ r \\ u \end{pmatrix} = \begin{pmatrix} 0 \\ 0 \\ r_s \\ 0 \end{pmatrix} \tag{31}$$

That is, a prescribed value $p_s$ is set in a real number part of a digital information signal (indicated by a complex number) transmitted by the positive carrier wave of the frequency +Wn which is specified by the even symbol number, and another prescribed value $r_s$ is set in a real number part of a digital information signal transmitted by the negative carrier wave of the frequency −Wn which is specified by the odd symbol number. The prescribed values $p_s$ and $r_s$ are known in the receiving apparatus 31. In this embodiment, the first type of reference signal is inserted into one pair of positive and negative carrier waves of the frequencies +Wi and −Wi (i=1 to 128) in the 2(i−1)-th symbol specified by one even symbol number 2(i−1), and the second type of reference signal is inserted into one pair of positive and negative carrier waves of the frequencies +Wi and −Wi in the (2i−1)-th symbol specified by one odd symbol number (2i−1).

Because a set of the frequencies of the pair of positive and negative carrier waves into which one type of reference signal is inserted is changed every two symbols, the reference signals inserted into the all 128 sets of positive and negative carrier waves are transmitted every 256 symbols. That is, one type of reference signal is inserted into one pair of positive and negative carrier waves of the frequencies +Wn and −Wn every 256 symbol periods.

Figure 5:
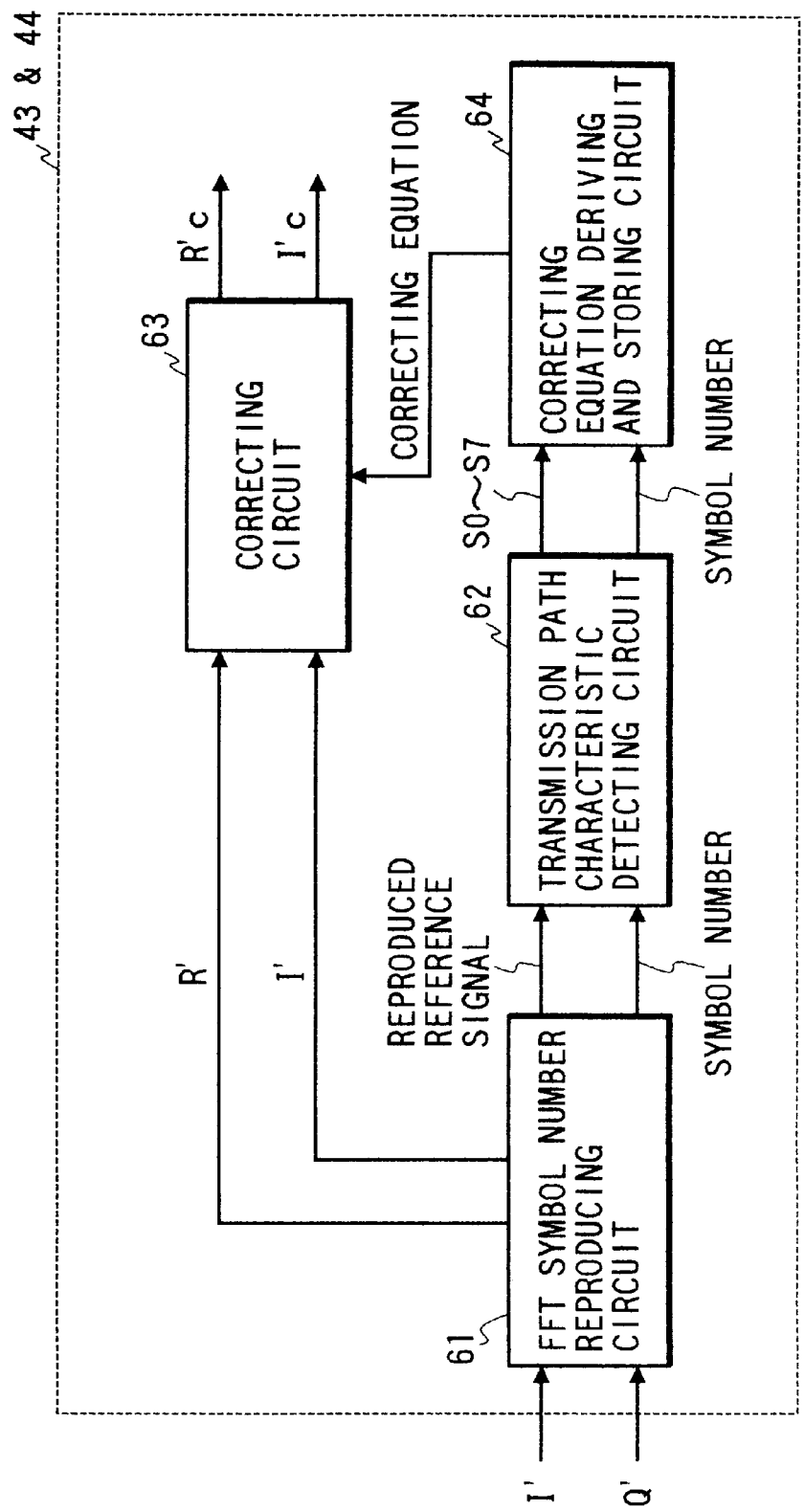
FIG. 5 is a block diagram of an FFT circuit and a QAM reproducing circuit shown in FIG. 3.

In the orthogonal frequency division multiplex signal receiving apparatus 31, the FFT circuit 43 and the QAM reproducing circuit 44 has a configuration shown in FIG. 5, and corrected transmission information signals (or corrected transmission information) Rc' and Ic' are obtained from the demodulated I and Q signals $S_{DI}(Wn), S_{DQ}(Wn), S_{DI}(-Wn)$ and $S_{DQ}(-Wn)$. In detail, as shown in FIG. 5, the demodulated I and Q signals $S_{DI}(Wn), S_{DQ}(Wn), S_{DI}(-Wn)$ and $S_{DQ}(-Wn)$ output from the signal processing units 59 and 60 are fed to a fast Fourier transformation (FFT) symbol number reproducing circuit 61. In the circuit 61, a fast Fourier transformation is performed for the demodulated I and Q signals $S_{DI}(Wn), S_{DQ}(Wn), S_{DI}(-Wn)$ and $S_{DQ}(-Wn)$, one symbol number inserted into one carrier wave (for example, the central carrier wave) is reproduced, and a type of reproduced reference signal corresponding to one type of reference signal which is inserted into one pair of particular positive and negative carrier waves specified by the symbol number is calculated for each symbol.

One type of reproduced reference signal corresponding to the even symbol number is indicated by four elements $p_{1S}'$, $q_{1S}'$, $r_{1S}'$ and $u_{1S}'$, and another type of reproduced reference signal corresponding to the odd symbol number is indicated by four elements $p_{2S}'$, $q_{2S}'$, $r_{2S}'$ and $u_{2S}'$. The symbol number and the reproduced reference signal obtained in the circuit 61 for each symbol are fed to a transmission path characteristic detecting circuit 62. Also, in the circuit 61, the fast Fourier transformation (FFT) is performed for the demodulated I and Q signals $S_{DI}(Wn), S_{DQ}(Wn), S_{DI}(-Wn)$ and $S_{DQ}(-Wn)$ obtained by performing the IDFT in the transmitting apparatus 11, and real parts R' and imaginary parts I' of pieces of reproduced digital information signals are obtained. The reproduced digital information signals R' and I' are fed to a correcting circuit 63.

In the transmission path characteristic detecting circuit 62, each type of reproduced reference signal is divided by a corresponding type of reference signal known by the receiving apparatus 31 according to equations (32) or (33), the coefficients S0, S1, S4 and S5 are calculated by dividing elements of one type of reproduced reference signal corresponding to the even symbol number by an element of the first type of reference signal corresponding to the even symbol number, and the coefficients S2, S3, S6 and S7 are calculated by dividing elements of another type of reproduced reference signal corresponding to the odd symbol number by an element of the second type of reference signal corresponding to the even symbol number.

$$\begin{pmatrix} S0 \\ S1 \\ S4 \\ S5 \end{pmatrix} = \begin{pmatrix} p_{1s}'/p_s \\ q_{1s}'/p_s \\ r_{1s}'/p_s \\ u_{1s}'/p_s \end{pmatrix} \quad (32)$$

$$\begin{pmatrix} S2 \\ S3 \\ S6 \\ S7 \end{pmatrix} = \begin{pmatrix} p_{2s}'/r_s \\ q_{2s}'/r_s \\ r_{2s}'/r_s \\ u_{2s}'/r_s \end{pmatrix} \quad (33)$$

The equations (32) and (33) are obtained by substituting the equations (30) and (31) into the equation (29) and rearranging the equation (29). Because the number of unknown numbers is 8, the coefficients S0 to S7 are calculated by the transmission and reception of the two types of reference signals. Therefore, characteristics in the transmission path can be detected from the coefficients S0 to S7. In this case, because the two types of reference signals are known in the transmitting apparatus 11 and the receiving apparatus 31, the two types of reference signals are not limited to the equations (30) and (31).

Also, when an inverse matrix of the matrix formulated in the equation (29) is calculated, the transmission data (the I and Q signals $S_I(Wn), S_Q(Wn), S_I(-Wn)$ and $S_Q(-Wn)$) can be estimated by correcting the received data (the demodulated I and Q signals $S_{DI}(Wn), S_{DQ}(Wn), S_{DI}(-Wn)$ and $S_{DQ}(-Wn)$). An inverse matrix of the matrix formulated in the equation (29) is expressed according to an equation (34)

$$\begin{pmatrix} p \\ q \\ r \\ u \end{pmatrix} = \frac{1}{\det A} \begin{pmatrix} H0 & H1 & H2 & H3 \\ -H1 & H0 & H3 & -H2 \\ H4 & H5 & H6 & H7 \\ H5 & -H4 & -H7 & H6 \end{pmatrix} \begin{pmatrix} p' \\ q' \\ r' \\ u' \end{pmatrix} \quad (34)$$

Here, coefficients H0 to H7 and detA are formulated as follows.

H0=+S0(S6S6+S7S7)−S2(S4S6+S5S7)+S3(S4S7−S5S6)
H1=+S1(S6S6+S7S7)−S3(S4S6+S5S7)−S2(S4S7−S5S6)
H2=+S4(S2S2+S3S3)−S6(S0S2+S1S3)+S7(S0S3−S1S2)
H3=+S5(S2S2+S3S3)−S7(S0S2+S1S3)−S6(S0S3−S1S2)
H4=+S2(S4S4+S5S5)−S0(S4S6+S5S7)−S1(S4S7−S5S6)
H5=+S3(S4S4+S5S5)−S1(S4S6+S5S7)+S0(S4S7−S5S6)
H6=+S6(S0S0+S1S1)−S4(S0S2+S1S3)−S5(S0S3−S1S2)
H7=+S7(S0S0+S1S1)−S5(S0S2+S1S3)+S4(S0S3−S1S2)
detA=S0*H0+S1*H1+S4*H2+S5*H3

In a correcting equation deriving and storing circuit 64, the coefficients H0 to H7 and the determinant detA are calculated from the input coefficients S0 to S7 detected in the transmission path characteristic detecting circuit 62 according to the equations (32) and (33), and a correcting equation formulated by an equation (35) is calculated from the coefficients H0 to H7 and the determinant detA and is stored.

$$\frac{1}{\det A} \begin{pmatrix} H0 & H1 & H2 & H3 \\ -H1 & H0 & H3 & -H2 \\ H4 & H5 & H6 & H7 \\ H5 & -H4 & -H7 & H6 \end{pmatrix} \quad (35)$$

Therefore, the correcting equation for a corresponding set of positive and negative carrier waves can be prepared every two symbols. The corresponding set of positive and negative carrier waves is specified by the symbol number. Because the correcting equation is prepared for each corresponding set of positive and negative carrier waves, in cases where the 257 carrier waves are used in this embodiment, about 128 correcting equations are calculated and stored one after another in the correcting equation deriving and storing circuit 64. Also, because the coefficients S0 to S7 change with time, the correcting equations are renewed as the time is elapsed.

In the correcting circuit 63, the reproduced digital information signals R' and I' fed from the FFT symbol number reproducing circuit 61 are corrected according to one correcting equation corresponding to the set of positive and negative carrier waves having the frequencies Wn and −Wn, and the corrected transmission information Rc' and Ic' are output as reproduced digital information signals. When the reproduced digital information signals R' and I' are indicated by a complex number R1+jI1 corresponding to the positive carrier wave of the frequency +Wn and another complex number R2+jI2 corresponding to the negative carrier wave of the frequency −Wn and the corrected transmission information Rc' and Ic' are indicated by a complex number Rc1+jIc1 corresponding to the positive carrier wave of the frequency +Wn and another complex number Rc2+jIc2 corresponding to the negative carrier wave of the frequency −Wn, the corrected transmission information Rc'(Rc1,Rc2) and Ic'(Ic1,Ic2) are obtained from the reproduced digital information signals R'(R1,R2) and I'(I1,I2) according to an equation (36).

$$\begin{pmatrix} Rc1 \\ Ic1 \\ Rc2 \\ Ic2 \end{pmatrix} = \frac{1}{\det A} \begin{pmatrix} H0 & H1 & H2 & H3 \\ -H1 & H0 & H3 & -H2 \\ H4 & H5 & H6 & H7 \\ H5 & -H4 & -H7 & H6 \end{pmatrix} \begin{pmatrix} R1 \\ I1 \\ R2 \\ I2 \end{pmatrix} \quad (36)$$

Figure 6:
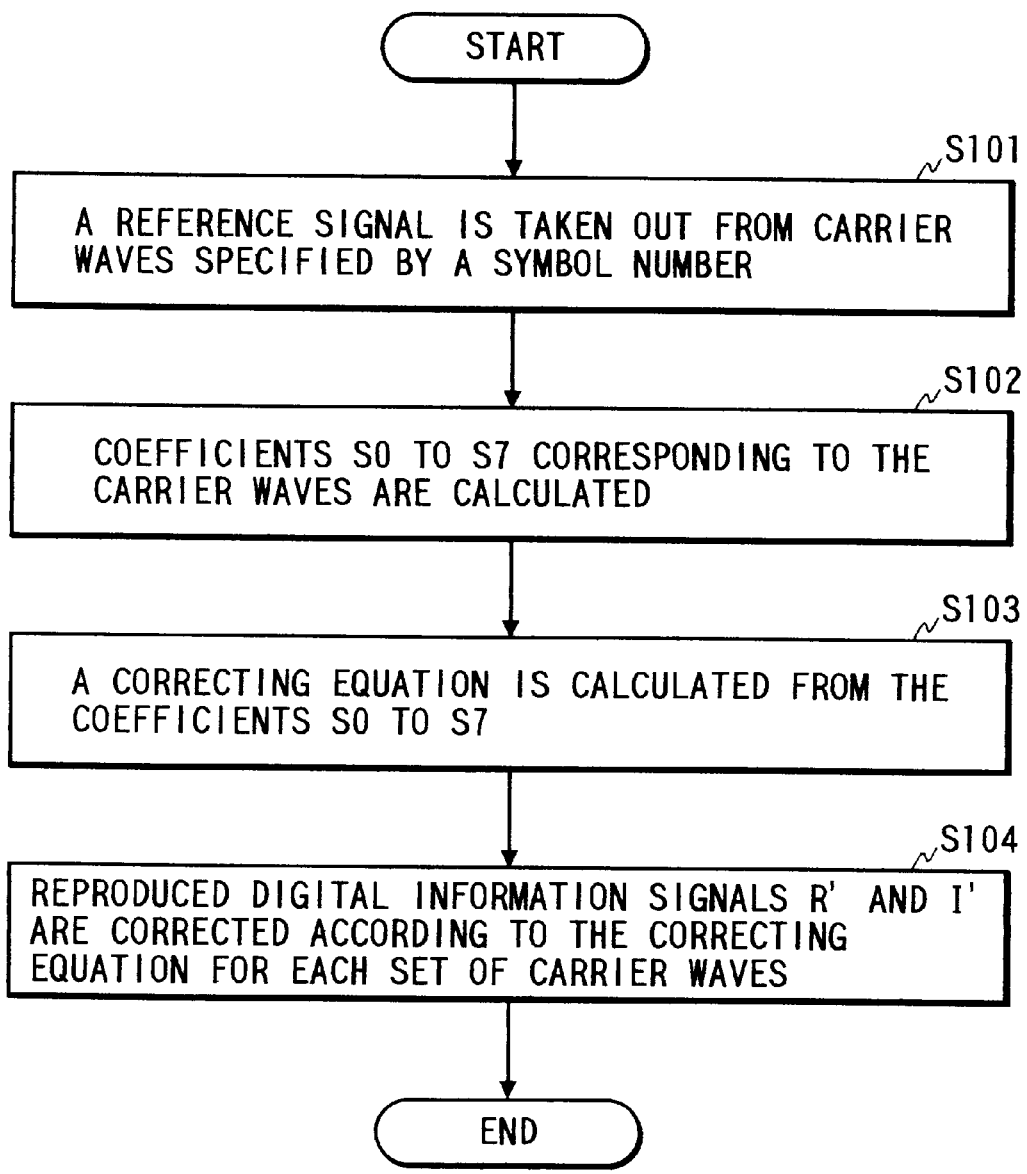
FIG. 6 is a flow chart showing a fast Fourier transformation performed in an FFT circuit shown in FIG. 3.

In cases where the FFT circuit 43 is a digital signal processor and the fast Fourier transformation is performed in the digital signal processor, the correction of the reproduced digital information signals R' and I' is performed according to a flow chart shown in FIG. 6. In detail, the reference signal is taken out from the positive and negative carrier waves specified by the symbol numbers in a step S101, the coefficients S0 to S7 corresponding to the positive and negative carrier waves are calculated according to the equations (32) and (33) in a step S102, the correcting equation corresponding to the positive and negative carrier waves is determined or renewed according to the equation (35) in a step S103, the reproduced digital information signals R' and I' are corrected according to the equation (36) in a step S104. Therefore, the reproduced digital information signals R' and I' corresponding to each set of positive and negative carrier waves having frequencies Wn and −Wn can be corrected.

In the first embodiment, the prescribed value $p_s$ is set as a first type of reference signal for a real number part of a complex number transmitted by the positive carrier wave of the frequency +Wn which is specified by the even symbol number (the equation (30)), and the prescribed value $r_s$ is set as a second type of reference signal for a real number part of a complex number transmitted by the negative carrier wave of the frequency −Wn which is specified by the odd symbol number (the equation (31)). However, the reference signal is not limited to the equations (30) and (31). For example, two types of reference signals according to equations (37) and (38) can be used.

$$\begin{pmatrix} p \\ q \\ r \\ u \end{pmatrix} = \begin{pmatrix} 0 \\ q_s \\ 0 \\ 0 \end{pmatrix} \quad (37)$$

$$\begin{pmatrix} p \\ q \\ r \\ u \end{pmatrix} = \begin{pmatrix} 0 \\ 0 \\ 0 \\ u_s \end{pmatrix} \quad (38)$$

In this case, a reproduced reference signal is divided by the known reference signal according to an equation (39) and (40) in the transmission path characteristic detecting circuit 62, and the coefficients S0 to S7 are calculated.

$$\begin{pmatrix} S1 \\ S0 \\ S5 \\ S4 \end{pmatrix} = \begin{pmatrix} -p'_{1s}/p_s \\ q'_{1s}/p_s \\ r'_{1s}/p_s \\ -u'_{1s}/p_s \end{pmatrix} \quad (39)$$

$$\begin{pmatrix} S3 \\ S2 \\ S7 \\ S4 \end{pmatrix} = \begin{pmatrix} p'_{2s}/r_s \\ -q'_{2s}/r_s \\ -r'_{2s}/r_s \\ u'_{2s}/r_s \end{pmatrix} \quad (40)$$

In this case, the reproduced reference signal corresponding to the even symbol number is indicated by four elements $-p_{1s}'$, $q_{1s}'$, $r_{1s}'$ and $-u_{1s}'$, and the reproduced reference signal corresponding to the odd symbol number is indicated by four elements $p_{2s}'$, $-q_{2s}'$, $-r_{2s}'$ and $u_{2s}'$.

Also, it is applicable that two prescribed values be set as a first type of reference signal for real and imaginary number parts of a complex number transmitted by the positive carrier wave of the frequency +Wn which is specified by the even symbol number (equation (41)) and other two prescribed values be set as a second type of reference signal for real and imaginary number parts of a complex number transmitted by the negative carrier wave of the frequency −Wn which is specified by the odd symbol number (equation (42)).

$$\begin{pmatrix} p \\ q \\ r \\ u \end{pmatrix} = \begin{pmatrix} p_s \\ q_s \\ 0 \\ 0 \end{pmatrix} \quad (41)$$

$$\begin{pmatrix} p \\ q \\ r \\ u \end{pmatrix} = \begin{pmatrix} 0 \\ 0 \\ r_s \\ u_s \end{pmatrix} \quad (42)$$

In this case, a reproduced reference signal is divided by the known reference signal according to an equation (43) and (44) in the transmission path characteristic detecting circuit 62, and the coefficients S0 to S7 are calculated.

$$\begin{pmatrix} S0 \\ S1 \\ S4 \\ S5 \end{pmatrix} = \begin{pmatrix} (p_s p'_{1s} + q_s q'_{1s})/(p_s^2 + q_s^2) \\ (p_s q'_{1s} - q_s p'_{1s})/(p_s^2 + q_s^2) \\ (p_s r'_{1s} - q_s u'_{1s})/(p_s^2 + q_s^2) \\ (p_s r'_{1s} + q_s u'_{1s})/(p_s^2 + q_s^2) \end{pmatrix} \quad (43)$$

$$\begin{pmatrix} S2 \\ S3 \\ S6 \\ S7 \end{pmatrix} = \begin{pmatrix} (r_s p'_{2s} - u_s q'_{2s})/(r_s^2 + u_s^2) \\ (u_s p'_{2s} + r_s q'_{2s})/(r_s^2 + u_s^2) \\ (r_s r'_{2s} - u_s u'_{2s})/(r_s^2 + u_s^2) \\ (r_s u'_{2s} - u_s r'_{2s})/(r_s^2 + u_s^2) \end{pmatrix} \quad (44)$$

In this case, the reproduced reference signal corresponding to the even symbol number is indicated by four elements $p_{1s}'$, $q_{1s}'$, $r_{1s}'$ and $u_{1s}'$, and the reproduced reference signal corresponding to the odd symbol number is indicated by four elements $p_{2s}'$, $q_{2s}'$, $r_{2s}'$ and $u_{2s}'$.

Also, as another example of reference signals, a set of elements (X,Y,X,Y) is inserted into the positive carrier wave of the frequency +Wn which is specified by the even symbol number as a first type of reference signal, and another set of elements (Y,X,Y,X) is inserted into the negative carrier wave of the frequency −Wn which is specified by the odd symbol number as a second type of reference signal. In this case, a first type of reproduced reference signal (p1', q1', r1', u1') is obtained in the reproducing circuit 61 for the even symbol number, and a second type of reproduced reference signal (p2', q2', r2', u2') is obtained in the reproducing circuit 61 for the odd symbol number. Here, p1'=S0*X−S1*Y+S2*X+S3*Y
p2'=S0*Y−S1*X+S2*Y+S3*X
q1'=S1*X+S0*Y+S3*X−S2*Y
q2'=S1*Y+S0*X+S3*Y−S2*X
r1'=S4*X+S5*Y+S6*X−S7*Y
r2'=S4*Y+S5*X+S6*Y−S7*X
u1'=S5*X−S4*Y+S7*X+S6*Y
u2'=S5*Y−S4*X+S7*Y+S6*X are satisfied. The correcting coefficients S0 to S7 are obtained in the detecting circuit 62 as follows.

$S0=(p1'*X-p2'*Y-q1'*Y+q2'*X)/(2X^2-2Y^2)$
$S1=(p1'*Y-p2'*X+q1'*X-q2'*Y)/(2X^2-2Y^2)$
$S2=(p1'*X-p2'*Y+q1'*Y-q2'*x)/(2X^2-2Y^2)$
$S3=-(p1'*Y-p2'*x-q1'*X+q2'*Y)/(2X^2-2Y^2)$
$S4=(r1'*X-r2'*Y+u1'*Y-u2'*X)/(2X^2-2Y^2)$
$S5=-(r1'*Y-r2'*X-u1'*X+u2'*Y)/(2X^2-2Y^2)$
$S6=(r1'*X-r2'*Y-u1'*Y+u2'*X)/(2X^2-2Y^2)$
$S7=(r1'*Y-r2'*X+u1'*X+u2'*Y)/(2X^2-2Y^2)$

In the first embodiment, one reference signal is periodically transmitted, a correcting equation is derived according to one reproduced reference signal obtained from the reference signal, and the reproduced digital information signals R' and I' are corrected according to the correcting equation. Therefore, until a new reproduced reference signal is received and a new correcting equation is calculated according to the new reproduced reference signal, the reproduced digital information signals R' and I' are corrected according to the correcting equation derived according to the reproduced reference signal previously received. Accordingly, in cases where the transmission characteristics slightly change, the transmitting apparatus 11 and the receiving apparatus 31 according to the first embodiment are appropriate to obtain the corrected transmission information Rc' and Ic' with high precision.

However, there is a case that the reproduced digital information signals R' and I' cannot be sufficiently corrected in case of a mobile communication or a multi-path circumstance in which the transmission characteristics are rapidly changed. Therefore, a transmitting apparatus and a receiving apparatus appropriate for the mobile communication or the multi-path circumstance in which the transmission characteristics are rapidly changed are described according to a second embodiment.

Figure 7:
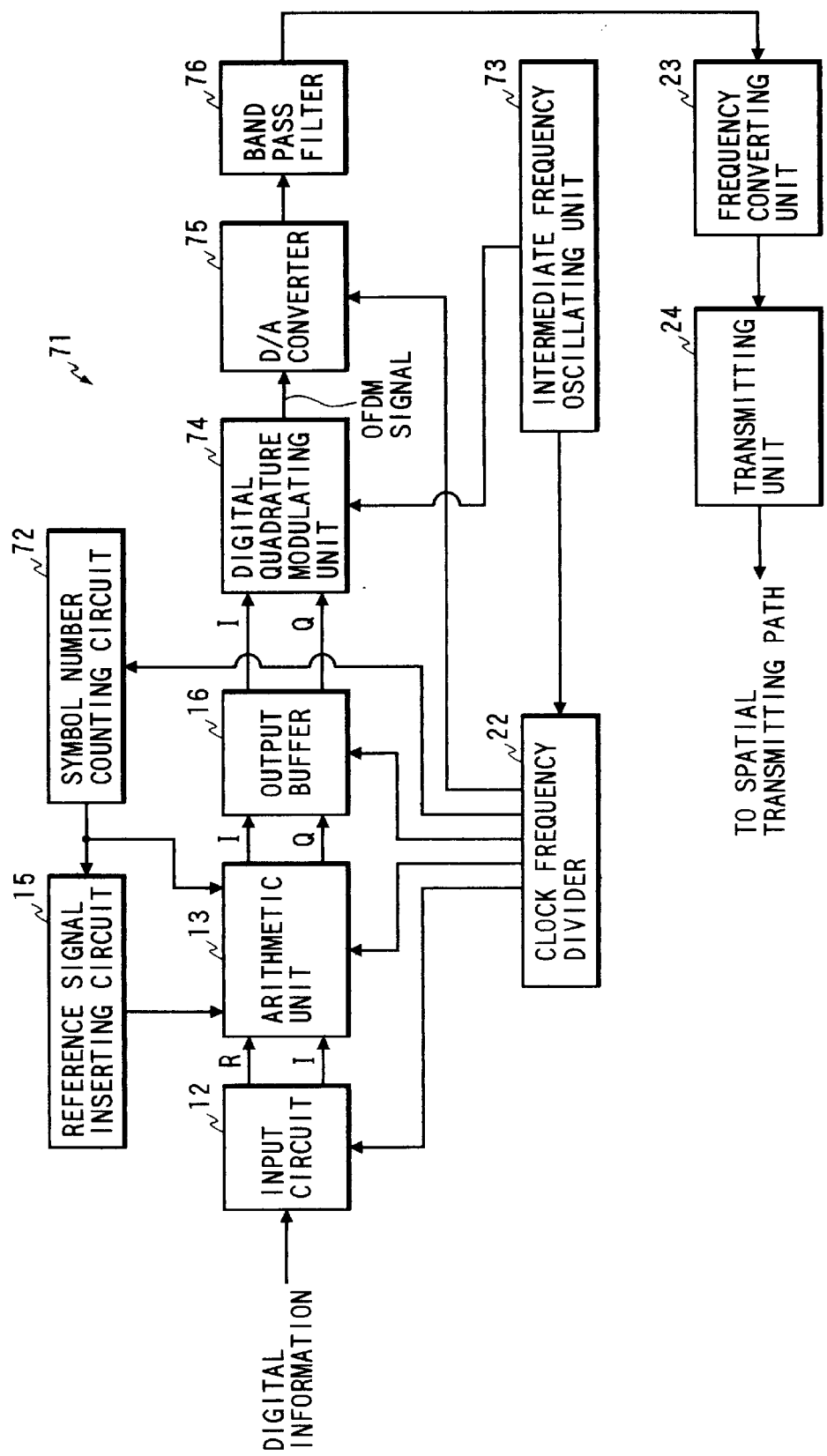
FIG. 7 is a block diagram of an orthogonal frequency division multiplex signal transmitting apparatus according to a second embodiment of the present invention.

FIG. 7 is a block diagram of an orthogonal frequency division multiplex signal transmitting apparatus according to a second embodiment of the present invention.

As shown in FIG. 7, an orthogonal frequency division multiplex signal transmitting apparatus 71 comprises the input circuit 12, the arithmetic unit 13, a symbol number counting circuit 72 for generating a symbol number for each of the digital information signals on condition that the symbol numbers are generated in the increasing order and the generation of the symbol numbers is circulated and inserting the symbol numbers into the carrier waves, the reference signal inserting circuit 15, the output buffer 16, an intermediate frequency oscillating unit 73 for oscillating an intermediate frequency wave of 42.8 MHz, a digital quadrature modulating unit 74 for modulating the digital sets of the in-phase signals and the quadrature signals stored in the output buffer 16 to an orthogonal frequency division multiplex (OFDM) signal by using the intermediate frequency wave oscillated in the intermediate frequency oscillating unit 73 as carrier waves, a digital-to-analog (D/A) converter 75 for performing a D/A conversion for the OFDM signal, a band pass filter 76 for passing the OFDM signal of a required frequency band, the clock frequency divider 22 for periodically generating a clock signal by dividing the intermediate frequency wave oscillated in the intermediate frequency oscillating unit 73 and transmitting each of the clock signals to the input circuit 12, the arithmetic unit 13, the output buffer 16 and the D/A converter 75, the frequency converting unit 23, and the transmitting unit 24.

In the above configuration, a plurality of sets of I signals and Q signals which are obtained by performing the IDFT for the digital information signals in the arithmetic unit 13 and are successively read out from the output buffer 16 are fed to the digital quadrature modulating unit 74. In the modulating unit 74, a digital quadrature amplitude modulation is performed for the sets of I signals and Q signals while using the intermediate frequency wave of 42.8 MHz generated in the intermediate frequency oscillating unit 73 as carrier waves, and a digital orthogonal frequency division multiplex (OFDM) signal composed of 257 information carrier waves is generated. Thereafter, the OFDM signal is converted to an analog OFDM signal by the D/A converting unit 75, the analog OFDM signal of a required frequency band passes through the band pass filter 76, and the analog OFDM signal is radiated from an antenna (not shown) to a spatial transmission path through the frequency converting unit 23 and the transmitting unit 24. In this case, a frequency spectrum of the analog OFDM signal radiated to the spatial transmission path is the same as that shown in FIG. 2. However, as is described later in detail, symbol numbers inserted into the carrier waves of the sets of I signals and Q signals produced in the arithmetic unit 13 are respectively indicated by 9 bits.

Figure 8:
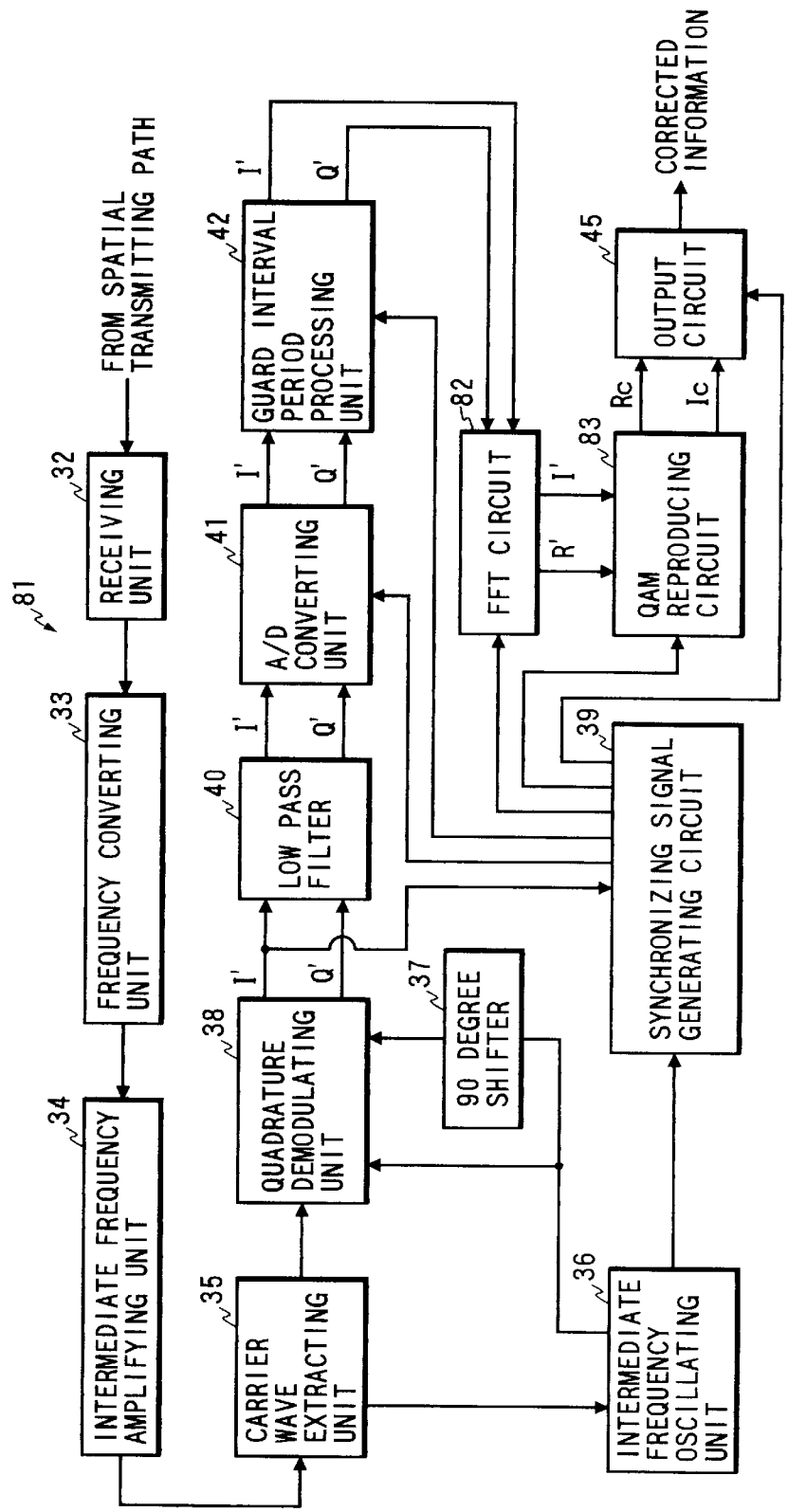
FIG. 8 is a block diagram of an orthogonal frequency division multiplex signal receiving apparatus according to the second embodiment of the present invention.

Thereafter, the analog OFDM signal radiated to the spatial transmission path is received by an orthogonal frequency division multiplex signal receiving apparatus 81 shown in FIG. 8 and is demodulated.

FIG. 8 is a block diagram of the orthogonal frequency division multiplex signal receiving apparatus 81 according to the second embodiment of the present invention.

As shown in FIG. 8, the orthogonal frequency division multiplex signal receiving apparatus 81 comprises the receiving unit 32, the frequency converting unit 33, the intermediate frequency amplifying unit 34, the carrier wave extracting unit 35, the intermediate frequency oscillating unit 36, the 90 degree shifter 37, the quadrature demodulating unit 38, the synchronizing signal generating circuit 39, the low pass filter 40, the A/D converting unit 41, the guard interval period processing circuit 42, a fast Fourier transformation (FFT) circuit 82 for performing a complex Fourier transformation for a signal output from the guard interval period processing circuit 42 in synchronization with the system clock signal and calculating a signal level of a real part and a signal level of an imaginary part for each of frequencies of a plurality of carrier waves of the signal output from the guard interval period processing circuit 42, a quadrature amplitude modulation (QAM) reproducing circuit 83 for comparing the signal levels of the real and imaginary parts for each of the frequencies of the carrier waves with a demodulated output of a reference carrier wave and calculating levels of quantized digital signals carried by digital information transmitting carrier waves to obtain a plurality of reproduced digital information signals, and the output circuit 45.

Figure 9:
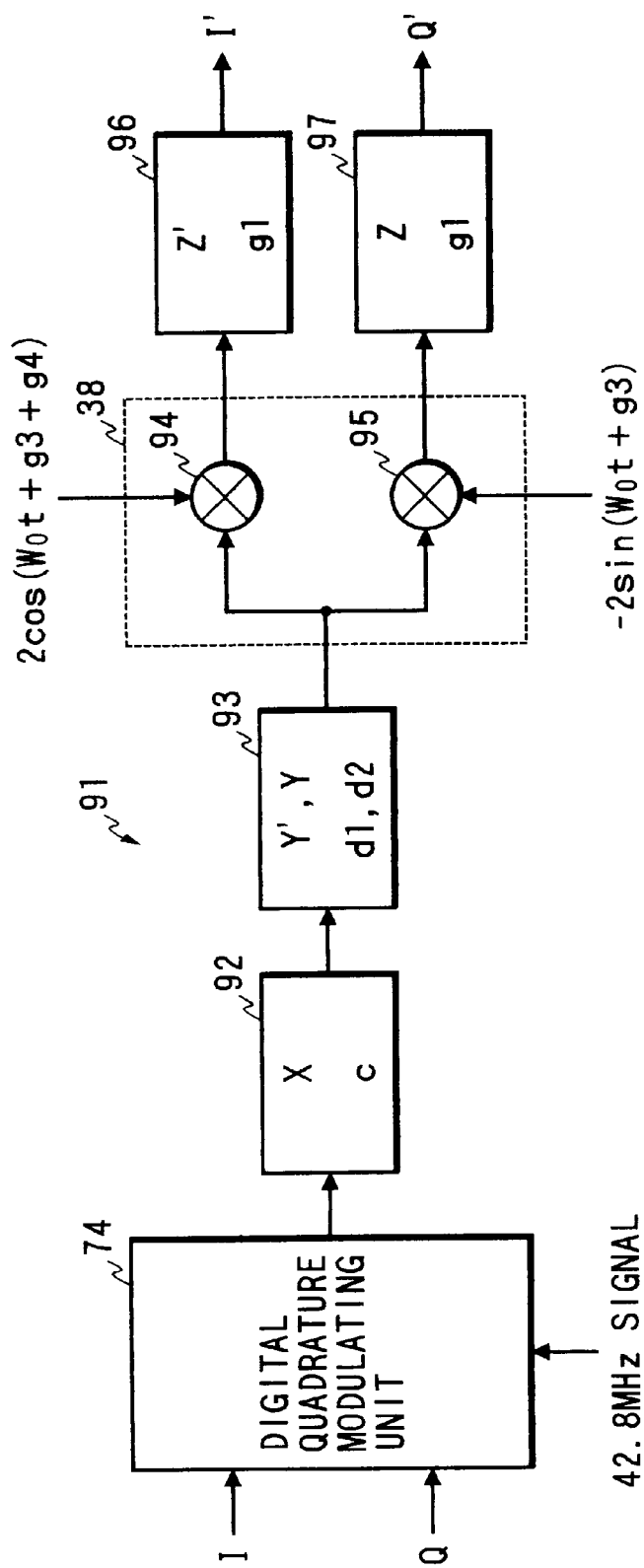
FIG. 9 is a block diagram of an orthogonal frequency division multiplex signal transmitting and receiving apparatus in which a group of I and Q signals are processed according to the second embodiment of the present invention.

In cases where only the transmission of the I and Q signals is considered, a set of the orthogonal frequency division multiplex signal transmitting apparatus 71 and the orthogonal frequency division multiplex signal receiving apparatus 81 used to perform a frequency division multiplex signal transmitting method according to the second embodiment is simply expressed by an orthogonal frequency division multiplex signal transmitting and receiving apparatus shown in FIG. 9.

FIG. 9 is a block diagram of an orthogonal frequency division multiplex signal transmitting and receiving apparatus in which the I and Q signals are processed.

As shown in FIG. 9, an orthogonal frequency division multiplex signal transmitting and receiving apparatus 91 comprises the digital quadrature modulating unit 74, a signal processing unit 92 corresponding to a group of the D/A converting unit 75, the band pass filter 76 and a multiplier (not shown), a transmission system circuit 93 corresponding to a group of the frequency converting unit 23, the transmitting unit 24, characteristics of the spatial transmission path, the receiving unit 32, a band pass filter (not shown), the frequency converting unit 33 and the intermediate frequency amplifying unit 34, a set of a first multiplier 94 and a second multiplier 95 corresponding to a group of the carrier extracting unit 35 and the quadrature demodulating unit 38, and a set of an in-phase signal processing unit 96 and a quadrature signal processing unit 97 corresponding to a group of the LPF 40 and the A/D converting unit 41.

In the above configuration of the orthogonal frequency division multiplex signal transmitting and receiving apparatus 91, a digital quadrature modulation is performed for two I signals expressed according to the equations (1) and (3) and two Q signals expressed according to the equations (2) and (4) in the digital quadrature modulating unit 74, and an OFDM signal is produced. Thereafter, the OFDM signal is input to the signal processing unit 92, an amplitude of the OFDM signal is changed by a factor X, and a phase of the OFDM signal is changed by a factor c. In addition, amplitude and phase of carrier waves of frequencies +Wn and -Wn carrying the OFDM signal are changed in the transmission system circuit 93. That is, an amplitude of the carrier wave of the frequency +Wn carrying the OFDM signal is changed by a factor Y', an amplitude of the carrier wave of the frequency -Wn carrying the OFDM signal is changed by a factor Y, a phase of the carrier wave of the frequency +Wn carrying the OFDM signal is changed by a factor d1, and a phase of the carrier wave of the frequency -Wn carrying the OFDM signal is changed by a factor d2. In this case, an error in the transmitting apparatus 71 is disregarded.

Thereafter, a quadrature demodulation is performed for the OFDM signal in each of the amplifiers 94 and 95. In this case, an error in orthogonality is set to a value g4, a demodulated carrier wave for the I signals is expressed by 2*cos(W0+g3+g4), and another demodulated carrier wave for the Q signals is expressed by -2*sin(W0+g3). Here, a value g3 denotes an error of a phase of each demodulated carrier wave, and a value g4 denotes an error in the quadrature demodulating unit 38. The I signals quadrature-demodulated in the first amplifier 94 (or the quadrature demodulating unit 38) are input to the in-phase signal processing unit 96. In the unit 96, an amplitude of each I signals is changed by a factor Z', a phase of each I signals is changed by a factor g1, and demodulated signals I' corresponding to the frequencies +Wn and -Wn of the carrier waves are output. Also, the Q signals quadrature-demodulated in the second amplifier 95 (or the quadrature demodulating unit 38) are input to the quadrature signal processing unit 97. In the unit 97, an amplitude of each Q signals is changed by a factor Z, a phase of each I signals is changed by a factor g2, and demodulated signals Q' corresponding to the frequencies +Wn and -Wn of the carrier waves are output.

Thereafter, a discrete Fourier transformation (DFT) is performed for the I' and Q' signals in the FFT circuit 82, and components of the frequencies +Wn and -Wn of the carrier waves are respectively obtained as a complex number. The +Wn component and the -Wn component are expressed as follows.

+Wn component:

$$A' \exp j(+Wn^*t+a')=(\tfrac{1}{2}) \exp j(+Wn^*t+c3-g3)^*[A \exp ja\{+XY'Z'$$
$$\exp j(+c+d1-g4+g1)+XY'Z \exp j$$
$$(+c+d1+g2)\}+B \exp{-jb}\{+XYZ' \exp j(-c-d2+g4-g1)-XYZ \exp$$
$$j(-c-d2-g2)\}] \quad (45)$$

-Wn component:

$$B' \exp j(-Wn^*t+b')=(\tfrac{1}{2})\exp j(-Wn^*t+c3-g3)^*[B \exp jb\{+XYZ' \exp$$
$$j(+c+d2-g4+g1)+XYZ \exp j(+c+d2+g2)\}+$$
$$A \exp{-ja}\{+XY'Z' \exp j(-c-d1+g4-g1)-XY'Z \exp j(-c-d1-g2)\}] \quad (46)$$

Here, $A'=\sqrt{(p'^2+q'^2)}$, $a'=\tan^{-1}(q'/p')$, $B'=\sqrt{(r'^2+u'^2)}$ and $b'=\tan^{-1}(u'/r')$ are satisfied. Also, a reference signal inserted into the positive carrier wave of the frequency +Wn is expressed by p +jq (p is a value of a real part, and q is a value of an imaginary part), and another reference signal inserted into the negative carrier wave of the frequency -Wn which is symmetric to the positive carrier wave of the frequency +Wn with respect to the central carrier wave is expressed by r+ju (r is a value of a real part, and u is a value of an imaginary part). In this case, a reproduced reference signal which is received in the receiving apparatus 81 and corresponds to the positive carrier wave of the frequency +Wn is expressed by p'+jq' (p' is a value of a real part, and q' is a value of an imaginary part), and another reproduced reference signal which is received in the receiving apparatus 81 and corresponds to the negative carrier wave of the frequency -Wn is expressed by r'+ju'(r' is a value of a real part, and u' is a value of an imaginary part). Also, a value c3 denotes an error of a phase of a modulated carrier wave used in the transmitting apparatus 71.

In cases where the equations (45) and (46) are rearranged by using the coefficients S0 to S7, the relationship of the equations (27) and (28) is obtained as a result of the discrete Fourier transformation. That is, the relationship of the equation (29) is obtained.

In this embodiment, a response speed for characteristics (multi-path circumstance characteristics) changing at high speed because of the relative movement between the transmitting apparatus 71 and the receiving apparatus 81 is heightened. The change of the characteristics is indicated as the change of the values Y', Y, d1 and d2. Therefore, in cases where the values Y', Y, d1 and d2 change to values M*Y', N*Y, d1+d3 and d2+d4, the equations (45) and (46) are altered to equations (47) and (48).

+Wn component:

$$A' \exp j(+Wn^*t+a')=(\tfrac{1}{2}) \exp j(+Wn^*t+c3-g3)^*[$$
$$A \exp ja\{+XMY'Z' \exp j(+c+d1+d3-g4+g1)+XMY'Z \exp$$
$$j(+c+d1+d3+g2)\}+B \exp{-jb}\{+XNYZ' \exp j(-c-d2-d4+$$
$$g4-g1)-XNYZ \exp j(-c-d2-d4-g2)\}] \quad (47)$$

-Wn component:

$$B' \exp j(-Wn^*t+b')=(\tfrac{1}{2}) \exp j (-Wn^*t+c3-g3)^*[B \exp jb\{+XNYZ' \exp j(+c+d2+d4-g4+g1)+XNYZ \exp j(+c+d2+d4+g2)\}$$
$$+A \exp{-ja}\{+XMY'Z' \exp j(-c-d1-d3+g4-g1)-XMY'Z \exp j(-c-d1-d3-g2)\}] \quad (48)$$

When Mexp(jd3)=V1+jV2, Mexp(-jd3)=V1-jV2, Nexp(jd4)=V3+jV4 and Nexp(-jd4)=V3-jV4 are set, the equation (29) is rewritten to an equation (49).

$$\begin{pmatrix} p' \\ q' \\ r' \\ u' \end{pmatrix} = \begin{pmatrix} S0, & -S1, & S2, & S3 \\ S1, & S0, & S3, & -S2 \\ S4, & S5, & S6, & -S7 \\ S5, & -S4, & S7, & S6 \end{pmatrix} \begin{pmatrix} V1, & -V2 & 0, & 0 \\ V2, & V1, & 0, & 0 \\ 0, & 0, & V3, & -V4 \\ 0, & 0, & V4, & V3 \end{pmatrix} \begin{pmatrix} p \\ q \\ r \\ u \end{pmatrix} \quad (49)$$

That is, a matrix of the reproduced reference signal which is received in the receiving apparatus 81 and corresponds to the carrier waves of the frequencies Wn and −Wn is obtained as a product of a matrix S of the static transmission characteristics corresponding to the first embodiment, a matrix V of high speed changing characteristics and a matrix of the reference signal inserted into the carrier waves of the frequencies Wn and −Wn in the transmitting apparatus 71.

-continued $$S = \begin{pmatrix} S0, & -S1, & S2, & S3 \\ S1, & S0, & S3, & -S2 \\ S4, & S5, & S6, & -S7 \\ S5, & -S4, & S7, & S6 \end{pmatrix} \text{ are satisfied}$$

The matrix K is expressed as follows.

$$K = \begin{pmatrix} V1/(V1^2+V2^2), & V2/(V1^2+V2^2), & 0, & 0 \\ -V2/(V1^2+V2^2), & V1/(V1^2+V2^2), & 0, & 0 \\ 0, & 0, & V3/(V3^2+V4^2), & V4/(V3^2+V4^2) \\ 0, & 0, & -V4/(V3^2+V4^2), & V3/(V3^2+V4^2) \end{pmatrix} \quad (51)$$

Therefore, the correcting equation derived in the correcting equation deriving and storing circuit 64 can be utilized in the same manner as in the first embodiment, and it is required in the second embodiment to derive a second correcting equation which is independent of the correcting equation derived in the correcting equation deriving and storing circuit 64.

Also, in cases where an input digital information signal allocated to a positive carrier wave of the frequency +Wn is expressed by a complex number (a+jb), another digital information signal allocated to the negative carrier wave of the frequency −Wn is expressed by another complex number (c+jd), a reproduced digital information signal carried by the positive carrier wave of the frequency +Wn is expressed by a complex number (a'+jb') and a reproduced digital information signal carried by the negative carrier wave of the frequency −Wn is expressed by a complex number (c'+jd'), the matrix S of the static transmission characteristics and the matrix V of the high speed changing characteristics in the equation (49) can be applied for the digital information signals. That is, a relationship between a transmitted signal (a,b,c,d) indicating the input digital information and a received signal (a',b',c',d') indicating the reproduced digital information signal is formulated according to an equation (50).

$$\begin{pmatrix} a \\ b \\ c \\ d \end{pmatrix} = V^{-1}S^{-1}\begin{pmatrix} a' \\ b' \\ c' \\ d' \end{pmatrix} = KH\begin{pmatrix} a' \\ b' \\ c' \\ d' \end{pmatrix} \quad (50)$$

Here, $K=V^{-1}$, $H=S^{-1}$, $$V = \begin{pmatrix} V1, & -V2 & 0, & 0 \\ V2, & V1, & 0, & 0 \\ 0, & 0, & V3, & -V4 \\ 0, & 0, & V4, & V3 \end{pmatrix} \text{ and}$$

Because there are many elements of 0 value in the matrix K, the calculation for the matrix K is easier than that for the matrix H. Because the matrix K is renewed for each carrier wave and for each symbol, assuming that a volume of calculation for the matrix K is too large, the estimation of the high speed changing characteristics according to the second correcting equation cannot be performed. However, because the matrix K is simple, the estimation of the high speed changing characteristics according to the second correcting equation can be performed. Also, it is realized that the matrix K is not a set of positive and negative carrier waves and is independent for each carrier wave.

A renewal processing for the matrices H and K is described in brief. The matrix H is renewed for each reception of the reference signal in the same manner as in the first embodiment. When the matrix H is renewed, the matrix K is treated as a unit matrix. Thereafter, a difference between a desired signal position and a position of a first corrected information signal denoting reproduced digital information signal corrected according to the matrix H is detected for each symbol. That is, a high speed change of both an amplitude and a phase in the first corrected information signal is detected for each symbol, and the matrix K is renewed for each frequency and for each symbol. The renewed matrix K is used for a next symbol.

Next, the renewal processing for the matrices H and K is described in detail along a flow of symbols. When the reference signal inserted into a prescribed carrier wave is received at a prescribed symbol N in the receiving apparatus 81, the matrix H is renewed, and the matrix K is set to a unit matrix. The renewal of the matrix H is performed in the same manner as in the first embodiment, and a first correcting equation is obtained as follows.

$$KH = \begin{pmatrix} 1, & 0, & 0, & 0 \\ 0, & 1, & 0, & 0 \\ 0, & 0, & 1, & 0 \\ 0, & 0, & 0, & 1 \end{pmatrix} H \quad (52)$$

Thereafter, a received signal (a',b',c',d') for a next symbol N+1 received in the receiving apparatus 81 is corrected to a first corrected signal (a",b",c",d") indicating the first corrected information signal according to an equation (53).

$$\begin{pmatrix} a'' \\ b'' \\ c'' \\ d'' \end{pmatrix} = H \begin{pmatrix} a' \\ b' \\ c' \\ d' \end{pmatrix} \quad (53)$$

Thereafter, a second corrected signal (<a>,<b>,<c>,<d>) indicating a second corrected information signal is produced from the first corrected signal (a",b",c",d").

$$\begin{pmatrix} \langle a \rangle \\ \langle b \rangle \\ \langle c \rangle \\ \langle d \rangle \end{pmatrix} = K \begin{pmatrix} a'' \\ b'' \\ c'' \\ d'' \end{pmatrix} \quad (54)$$

The second corrected information signal is equivalent to a piece of reproduced digital information. In cases where any high speed characteristic change in the transmission of the digital information signals from the transmitting apparatus 71 to the receiving apparatus 81 does not occur (or in cases where transmission characteristics in the transmitting apparatus 71 are the same as that in the receiving apparatus 81), the matrix K is a unit matrix, and an equation (55) is satisfied.

$$\begin{pmatrix} \langle a \rangle \\ \langle b \rangle \\ \langle c \rangle \\ \langle d \rangle \end{pmatrix} = \begin{pmatrix} a'' \\ b'' \\ c'' \\ d'' \end{pmatrix} = \begin{pmatrix} a \\ b \\ c \\ d \end{pmatrix} \quad (55)$$

Therefore, the second corrected signal agreeing with the transmitted signal is obtained. However, in cases where the mobile communication is supposed, a characteristic change occurs. The characteristic change can be expressed according to an equation (56)

$$\begin{pmatrix} a + \delta_p \\ b + \delta_q \\ c + \delta_r \\ d + \delta_u \end{pmatrix} = \begin{pmatrix} a'' \\ b'' \\ c'' \\ d'' \end{pmatrix} \quad (56)$$

Here, $\delta_p$, $\delta_q$, $\delta_r$ and $\delta_u$ denote errors denoting high speed components added to the transmitted signal (a,b,c,d), and the high speed components remain in the first corrected signal (a",b",c",d"). Also, $$\begin{pmatrix} a \\ b \\ c \\ d \end{pmatrix} = K \begin{pmatrix} a'' \\ b'' \\ c'' \\ d'' \end{pmatrix} \quad (57)$$

is set, and the matrix K is expressed as follows.

$$K = \begin{pmatrix} K0 & K1 & 0 & 0 \\ -K1 & K0 & 0 & 0 \\ 0 & 0 & K6 & K7 \\ 0 & 0 & -K7 & K6 \end{pmatrix} \quad (58)$$

Elements K0, K1, K6 and K7 are expressed according to equations (59a) to (59d).

$$K0 = (a^*a'' + b^*b'')/(a''^2 + b''^2) \quad (59a)$$

$$K1 = (a^*b'' - a''^*b)/(a''^2 + b''^2) \quad (59b)$$

$$K6 = (c^*c'' + d^*d'')/(c''^2 + d''^2) \quad (59c)$$

$$K7 = (c^*d'' - c''^*d)/(c''^2 + d''^2) \quad (59d)$$

The matrix K is used for a next symbol N+2. In the symbol N+2, the second corrected signal (<a>,<b>,<c>,<d>) is obtained as follows, and the reproduced digital information signal is generated.

$$\begin{pmatrix} \langle a \rangle \\ \langle b \rangle \\ \langle c \rangle \\ \langle d \rangle \end{pmatrix} = KH \begin{pmatrix} a' \\ b' \\ c' \\ d' \end{pmatrix} = K \begin{pmatrix} a'' \\ b'' \\ c'' \\ d'' \end{pmatrix} \quad (60)$$

The matrix H is expressed according to the equation (52), and the matrix K is expressed according to the equation (58). Thereafter, a new matrix K is determined according to the equations (57) and (58) while using the first corrected signal (a",b",c",d") of the equation (60). The new matrix K is used for a next symbol N+3.

That is, the correction of the received signal (a',b',c',d') for the symbol N+3 is performed according to the equation (60), the second corrected signal (<a>,<b>,<c>,<d>) is obtained, and the reproduced digital information signal is generated. In this case, the matrix K determined for the symbol N+2 is used.

For following symbols, the second corrected signal (<a>, <b>,<c>,<d>) is obtained according to the equation (60) by using the matrix K determined for a previous symbol, the reproduced digital information signal is generated from the second corrected signal, a new matrix K is calculated according to the equations (57) and (58) to use the new matrix K for a next symbol.

Values a,b,c and d of the transmitted signal, values a',b',c' and d' of the received signal, values a",b",c" and d" of the first corrected signal and values <a>,<b>,<c>and <d> of the second corrected signal used in the equations (50) to (60) differ from each other.

In the above embodiment, the matrix K is renewed for each symbol according to the first corrected signal (a",b",c",d") obtained from the received signal (a',b',c',d') without renewing the matrix H until a next reference signal is transmitted to the receiving apparatus 81. However, as another method for transmitting and receiving an orthogonal frequency division multiplex signal, it is applicable that the matrix K and the matrix H be combined to produce a new matrix H and the combination of the matrix K and the matrix H be repeated. In detail, the matrix K and the matrix H be combined to produce a new matrix H according to an equation (61).

$$H = KH \quad (61)$$

Thereafter, a second corrected signal (<a>,<b>,<c>,<d>) for a symbol N is obtained according to the new matrix H as follows.

$$\begin{pmatrix} \langle a \rangle \\ \langle b \rangle \\ \langle c \rangle \\ \langle d \rangle \end{pmatrix} = H \begin{pmatrix} a' \\ b' \\ c' \\ d' \end{pmatrix} \quad (62)$$

Therefore, a transmitted signal (a,b,c,d) for the symbol N is reproduced. Thereafter, a new matrix K is determined according to an equation (63) by using the first corrected signal (a",b",c",d") and the transmitted signal (a,b,c,d) for the symbol N.

$$\begin{pmatrix} a \\ b \\ c \\ d \end{pmatrix} = K \begin{pmatrix} a'' \\ b'' \\ c'' \\ d'' \end{pmatrix} \quad (63)$$

Thereafter, the new matrix H is regarded as an old matrix H, and a new matrix H is obtained according to the equation (61) by using the old matrix H and the matrix K recently determined according to the equation (63). The new matrix H is used to obtain a second corrected signal (<a>,<b>,<c>,<d>) for a next symbol N+1 according to the equation (62).

Next, a concrete processing example according to the above method for transmitting and receiving an orthogonal frequency division multiplex signal is described.

As shown in FIG. 7, a symbol number is inserted into a particular carrier wave, and a reference signal (or reference data) which is known in the receiving apparatus 81 is inserted into each of a pair of sets of other positive and negative carrier waves corresponding to the symbol number. In detail, a plurality of symbol numbers 0,1,2, - - - ,511,0, 1,2, - - - are generated in that order at symbols in the symbol number counting circuit 72 on condition that the symbol numbers are generated in the increasing order and the generation of the symbol numbers is circulated, and the symbol numbers are fed one by one to the arithmetic unit 13 and the reference signal inserting circuit 15. Each symbol number is expressed by 9 bits.

In this case, because an accurate reproduction of the symbol number in the receiving apparatus 81 is important, private reference data is prepared for the reference signal, and a multivalued modulation in which the number of multivalues is lower than that in a multivalued QAM (256 QAM) used for the other carrier waves is performed. That is, 4 bits composed of the ninth bit, the eighth bit, the third bit and the second bit in the 9 bits expressing one symbol number are transmitted and received at 16 QAM. In the receiving apparatus 81, the symbol number expressed by the 4 bits is changed to 9 bits to reproduce the symbol number. Because the symbol number is incremented in the symbol number counting circuit 72, the reproduction of the symbol number can be easily performed.

Therefore, 4 bits composed of the ninth bit, the eighth bit, the third bit and the second bit in the 9 bits expressing one symbol number are input to the arithmetic unit 13 each time one symbol number expressed by 9 bits is output from the symbol number counting circuit 72, and the IDFT is performed for the 4 bits of symbol number in the arithmetic unit 13 to transmit the 4 bits of symbol number with a particular carrier wave (for example, a first carrier wave). Also, when one symbol number expressed by the 9 bits is received in the reference signal inserting circuit 15, one reference signal is generated and input to the arithmetic unit 13, and the IDFT is performed for the reference signal in the arithmetic unit 13 to insert the reference signal in the quadrature modulating unit 21 into a set of particular positive and negative carrier waves, of which frequencies are symmetric to each other with respect to the frequency F0 (F0=42.8 MHz) of the central carrier wave, specified by upper 7 bits of the symbol number among the 9 bits. In this case, because lower 2 bits among the 9 bits of the symbol number are disregarded in the arithmetic unit 13, the selection of the set of particular positive and negative carrier waves in which the reference signal is inserted is changed every four symbols.

Also, a first type of reference signal or a second type of reference signal is generated in the reference signal inserting circuit 15 according to the lowest bit among the 9 bits of the symbol number and is inserted into one set of positive and negative carrier waves. The first type of reference signal corresponds to an odd symbol number and is expressed according to an equation (64), and the second type of reference signal corresponds to an even symbol number and is expressed according to an equation (65).

$$\begin{pmatrix} p \\ q \\ r \\ u \end{pmatrix} = \begin{pmatrix} 0 \\ X \\ 0 \\ X \end{pmatrix} \quad (64)$$

$$\begin{pmatrix} p \\ q \\ r \\ u \end{pmatrix} = \begin{pmatrix} X \\ 0 \\ X \\ 0 \end{pmatrix} \quad (65)$$

The value X is known in the receiving apparatus 81. Therefore, in the second embodiment, the first type of reference signal is inserted into one pair of positive and negative carrier waves of the frequencies +Wi and −Wi (i=1 to 128) in the 2(i−1)-th symbol specified by one even symbol number 2(i−1), the second type of reference signal is inserted into one pair of positive and negative carrier waves of the frequencies +Wi and −Wi in the (2i−1)-th symbol specified by one odd symbol number (2i−1), and the first or second type of reference signal is inserted into all sets of positive and negative carrier waves every 512 symbols (4*128=512) because the selection of the set of particular positive and negative carrier waves is changed every four symbols.

Figure 10:
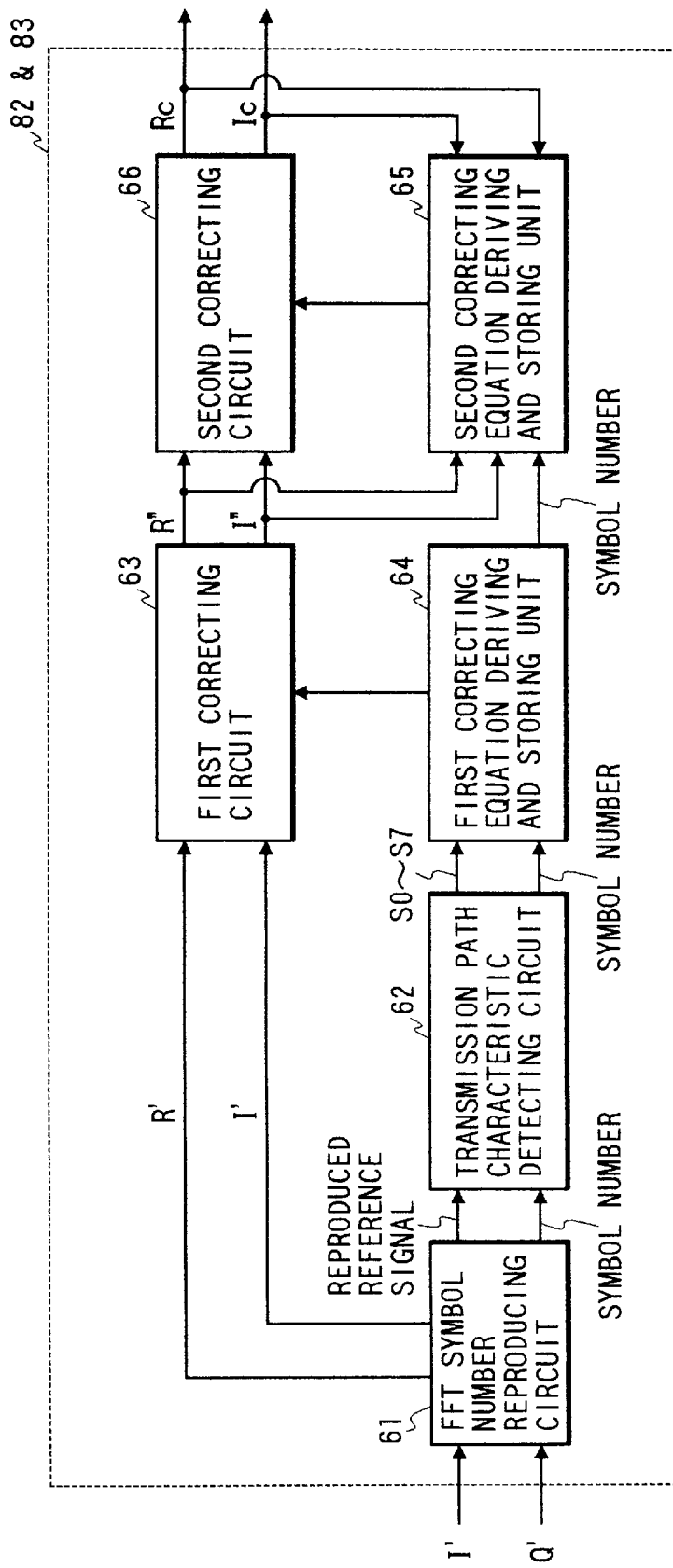
FIG. 10 is a block diagram of an FFT circuit and a QAM reproducing circuit shown in FIG. 8.

Thereafter, in the FFT circuit 82 and the QAM reproducing circuit 83 of the receiving unit 81, second corrected information signals Rc and Ic equivalent to reproduced digital information signals are obtained. That is, as shown in FIG. 10, the demodulated I and Q signals I' and Q' output from the signal processing units 96 and 97 are fed to the FFT symbol number reproducing circuit 61. In the reproducing circuit 61, one symbol number is reproduced, and one reference signal inserted into one set of positive and negative carrier waves is reproduced to produce a reproduced reference signal.

In this embodiment, because 16 QAM is performed for the 4 bits of the symbol number, the symbol number can be reproduced at a preferable error rate as compared with that in other transmission information, the symbol number ranging from 1 to 511 expressed by 9 bits can be reliably reproduced, and a set of carrier waves in which one reference signal is inserted can be reliably specified for each symbol.

The reproduced reference signal obtained in the reproducing circuit 61 is, for example, expressed by a set of $p_{0,S}'$, $q_{0s}'$, $r_{0s}'$ and $u_{0s}'$ for a 0-th symbol (an even symbol number), a set of $p_{1s}'$, $q_{1s}'$, $r_{1s}'$ and $u_{1s}'$ for a first symbol (an odd symbol number), a set of $p_{2s}'$, $q_{2s}'$, $r_{2s}'$ and $u_{2s}'$ for a second symbol (an even symbol number) and a set of $P_{3s}'$, $q_{3s}'$, $r_{3s}'$ and $U_{3s}'$ for a third symbol (an odd symbol number).

Thereafter, a plurality of coefficients S0 to S7 indicating transmission path characteristics are calculated according to the equations (29), (64) and (65) in the transmission path characteristic detecting circuit 62 by using the reproduced reference signals expressed by the set of $P_{0s}'$, $a_{0s}'$, $r_{0s}'$ and $u_{0s}'$ for the 0-th symbol and the set of $P_{1s}'$, $q_{1s}'$, $r_{1s}'$ and $u_{1s}'$ for the first symbol.

$$\begin{aligned} S0 &= (p'_{0s} + q'_{1s})/(2X), & S4 &= (r'_{0s} + u'_{1s})/(2X) \\ S1 &= (q'_{0s} - p'_{1s})/(2X), & S5 &= (u'_{0s} - r'_{1s})/(2X) \\ S2 &= (p'_{0s} - q'_{1s})/(2X), & S6 &= (r'_{0s} - u'_{1s})/(2X) \\ S3 &= (q'_{0s} + p'_{1s})/(2X), & S7 &= (u'_{0s} + r'_{1s})/(2X) \end{aligned} \quad (66a)$$

Also, a plurality of coefficients S0 to S7 are calculated in the same manner in the transmission path characteristic detecting circuit 62 by using the reproduced reference signals expressed by the set of $p_{2s}'$, $q_{2s}'$, $r_{2s}'$ and $u_{2s}'$ for the second symbol and the set of $p_{3s}'$, $q_{3s}'$, $r_{3s}'$ and $u_{3s}'$ for the third symbol.

$$\begin{aligned} S0 &= (p'_{2s} + q'_{3s})/(2X), & S4 &= (r'_{2s} + u'_{3s})/(2X) \\ S1 &= (q'_{2s} - p'_{3s})/(2X), & S5 &= (u'_{2s} - r'_{3s})/(2X) \\ S2 &= (p'_{2s} - q'_{3s})/(2X), & S6 &= (r'_{2s} - u'_{3s})/(2X) \\ S3 &= (q'_{2s} + p'_{3s})/(2X), & S7 &= (u'_{2s} + r'_{3s})/(2X) \end{aligned} \quad (66b)$$

Thereafter, average values of the coefficients S0 to S7 are obtained from first values of the coefficients S0 to S7 in the equation (66a) and second values of the coefficients S0 to S7 in the equation (66b), and the average coefficients S0 to S7 are output from the transmission path characteristic detecting circuit 62 to the first correcting equation deriving and storing unit 64 as a transmission path characteristic for one set of particular positive and negative carrier waves in each of four symbols. Also, the symbol number is fed from the circuit 62 to the circuit 64.

Because there are eight coefficients S0 to S7, the coefficients S0 to S7 can be obtained when two types of reference signals are transmitted and received. In this case, because the two types of reference signals are known in the receiving apparatus 81, any type of reference signals can be used on condition that the coefficients S0 to S7 are obtained.

The derivation of a first correcting equation is performed in the circuit 64 in the same manner as in the first embodiment. That is, the determinant detA and the coefficients H0 to H7 are calculated, a first correcting equation expressed according to the equation (35) is calculated according to the determinant detA and the coefficients H0 to H7, and the first correcting equation is stored. In this embodiment, because 257 carrier waves are used, about 128 first correcting equations are calculated one after another and are renewed as time is elapsed. Because one first correcting equation is calculated from the average coefficients S0 to S7 obtained by averaging each of the coefficients S0 to S7 corresponding to four sets of positive and negative carrier waves having the same frequencies in four symbols, the renewal of each first correcting equation corresponding to one set of positive and negative carrier waves is performed every 512 symbols (4 symbols*128 sets=512 symbols).

It is preferred that the first correcting equation expressed according to the equation (35) be directly calculated from the equation (29) after the detection of the transmission path characteristics without calculating any inverse matrix.

Thereafter, the reproduced digital information signals R' and I' obtained in the reproducing circuit 61 are fed to the first correcting circuit 63, and a correcting calculation is performed for the reproduced digital information signals R' and I' according to an equation (67) by using the first correcting equation stored in the storing circuit 64 in the same manner as in the first embodiment, and first corrected transmission information R" and I" are output.

$$\begin{pmatrix} a'' \\ b'' \\ c'' \\ d'' \end{pmatrix} = \frac{1}{\det A} \begin{pmatrix} H0 & H1 & H2 & H3 \\ -H1 & H0 & H3 & -H2 \\ H4 & H5 & H6 & H7 \\ H5 & -H4 & -H7 & H6 \end{pmatrix} \begin{pmatrix} a' \\ b' \\ c' \\ d' \end{pmatrix} \quad (67)$$

Here, a' denotes a real part of the reproduced digital information signal carried by the positive carrier wave, b' denotes an imaginary part of the reproduced digital information signal carried by the positive carrier wave, c' denotes a real part of the reproduced digital information signal carried by the negative carrier wave, d' denotes an imaginary part of the reproduced digital information signal carried by the negative carrier wave, a" denotes a real part of the first corrected transmission information carried by the positive carrier wave, b" denotes an imaginary part of the first corrected transmission information carried by the positive carrier wave, c" denotes a real part of the first corrected transmission information carried by the negative carrier wave, and d" denotes an imaginary part of the first corrected transmission information carried by the negative carrier wave.

Therefore, the reproduced digital information signals R'(a',c') and I'(b',d') are corrected to the first corrected transmission information R"(a",c") and I"(b",d") in the first correcting circuit 63. Thereafter, the first corrected transmission information R"(a",c") and I"(b",d") are fed to a second correcting equation deriving and storing circuit 65 and to a second correcting circuit 66, and the symbol number is fed from the first correcting equation deriving and storing circuit 64 to the second correcting equation deriving and storing circuit 65.

In the second correcting circuit 66, the first corrected transmission information R"(a",c") and I"(b",d") are corrected to second corrected transmission information Rc(<a>, <c>) and Ic(<b>,<d>) according to an equation (68)

$$\begin{pmatrix} \langle a \rangle \\ \langle b \rangle \\ \langle c \rangle \\ \langle d \rangle \end{pmatrix} = K \begin{pmatrix} a'' \\ b'' \\ c'' \\ d'' \end{pmatrix} \quad (68)$$

Here, the matrix K is a unit matrix for a next symbol after the reception of the reference signal. Also, the matrix K determined in a previous symbol is used for each of other symbols. Thereafter, the second corrected transmission signal Rc(<a>,<c>) and Ic(<b>,<d>) are output frog the outputting circuit 45 as the reproduced digital information signals (a,b,c,d).

Also, in the second correcting equation deriving and storing circuit 65, a matrix K is newly generated according to the equations (58) and (59a) to (59d) by using the symbol number input from the storing circuit 64, the first corrected transmission information R"(a",c") and I"(b",d") input from the first correcting circuit 63 and the second corrected transmission signal Rc(<a>,<c>) and Ic(<b>,<d>) which are treated as the reproduced digital information signals (a,b, c,d) and are input from the second correcting circuit 66, and the matrix K is stored as a second correcting equation. The matrix K is generated for each reproduced carrier wave and is used for a next symbol.

Therefore, the reproduced digital information signals are corrected according to the first correcting equation in the first correcting circuit 63 to remove errors and characteristics which gradually change with time and temperature from the reproduced digital information signals, and the correction of the reproduced digital information signals is correctly performed because the known reference signal is used. Also, the second corrected transmission information are corrected according to the second correcting equation in the second correcting circuit 66 to remove transmission characteristics changing with a high speed such as a multi-path circumstances occurring in the mobile communication or the like from the second corrected transmission information. Accordingly, the reproduced digital information signals R(a, c) and I(c,d) optimized for each symbol can be output from the receiving apparatus 81.

Next, the correcting method using the second correcting equation is described by using specified values. The description relating to the matrix H is simplified, and the operation relating to the matrix K is described in detail. Also, because the matrix H corresponding to one set of positive and negative carrier waves is corrected, the matrix K is expressed in correspondence to one set of positive and negative carrier waves in the above description. However, because the matrix K is independent on the positive and negative carrier waves, the operation relating to the matrix K corresponding to the positive or negative carrier wave is described.

A value set (real part, imaginary part)=(7.5, 7.5) of a prescribed reference signal for a symbol N is initially transmitted, and a reproduced reference signal (6.25, 6.25) is received in the receiving apparatus 81. In this case, the matrix H is expressed in brief according to an equation (69).

$$H = \begin{pmatrix} 7.5/6.25, & 0 \\ 0, & 7.5/6.25 \end{pmatrix} = \begin{pmatrix} 1.2, & 0 \\ 0, & 1.2 \end{pmatrix} \quad (69)$$

That is, any error is not included in a transmitting system, any phase characteristic does not change, and an amplitude characteristic indicates a condition of 6.25/7.5 times.

In a first correcting step according to the first correcting equation, the reproduced digital information signal is corrected by using the above matrix H, and the matrix H is not renewed until another reproduced reference signal is fed to the detecting circuit 62. The matrix H formulated in the equation (69) is the first correcting equation stored in the storing circuit 64. In this case, the matrix K is set to a unit matrix and is stored as the second correcting equation in the storing circuit 65.

$$K = \begin{pmatrix} 1, & 0 \\ 0, & 1 \end{pmatrix} \quad (70)$$

Thereafter, when a received signal (a',b')=(6.10,5.30) of the reproduced digital information signals R'(a') and I'(b') for a next symbol N+1 is generated in the reproducing circuit 61, a first corrected signal (a",b") is generated in the first correcting circuit 63 according to an equation (71a).

$$\begin{pmatrix} a'' \\ b'' \end{pmatrix} = H \begin{pmatrix} a' \\ b' \end{pmatrix} = \begin{pmatrix} 1.2, & 0 \\ 0, & 1.2 \end{pmatrix} \begin{pmatrix} 6.10 \\ 5.30 \end{pmatrix} = \begin{pmatrix} 7.32 \\ 6.36 \end{pmatrix} \quad (71a)$$

Thereafter, the first corrected signal (a",b") is corrected in the second correcting circuit 66 by using the matrix K stored in the storing circuit 65 as the second correcting equation, and a second corrected transmission signal Rc(<a>,<b>) is obtained according to an equation (71b).

$$\begin{pmatrix} \langle a \rangle \\ \langle b \rangle \end{pmatrix} = K \begin{pmatrix} a'' \\ b'' \end{pmatrix} = \begin{pmatrix} 1, & 0 \\ 0, & 1 \end{pmatrix} \begin{pmatrix} 7.32 \\ 6.36 \end{pmatrix} = \begin{pmatrix} 7.32 \\ 6.36 \end{pmatrix} \quad (71b)$$

Figure 15:
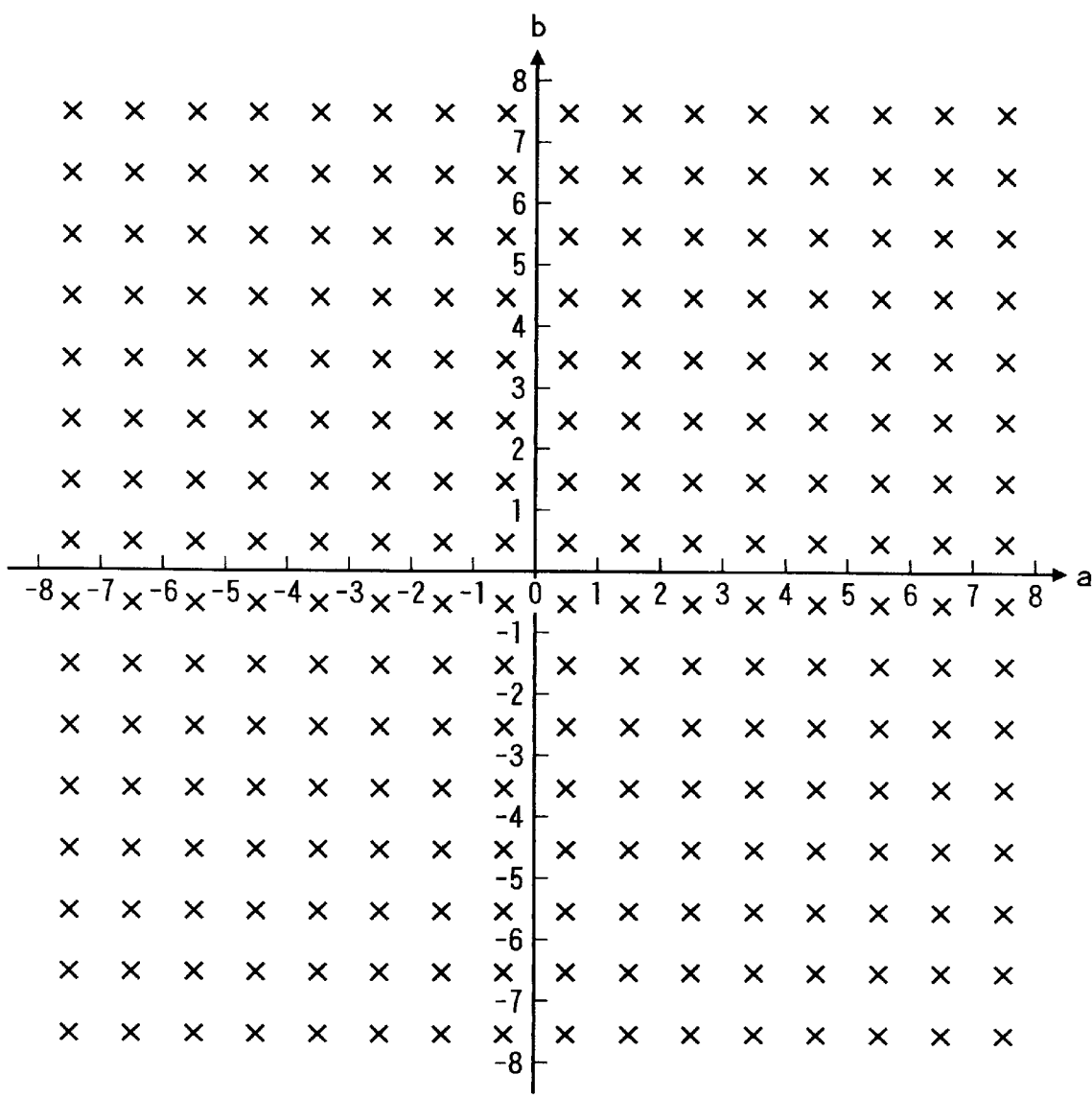
FIG. 15 shows the arrangement of a plurality of signal positions allowed for a plurality of information signals.

Thereafter, a signal arrangement shown in FIG. 15 in which a plurality of signal positions allowed for the plurality of information signals are arranged is searched, and a particular signal position (7.5, 6.5) nearest to the received signal (<a>,<b>)=(7.32, 6.36) is obtained. Therefore, it is judged that the received signal (<a>,<b>) is obtained from a transmitted signal (a,b)=(7.5, 6.5) indicated by the particular signal position, and reproduced digital information signals (Rc,Ic)=(7,6) are output from the output circuit 45. Here, a value 0.5 is a bias value added to the transmitted signal to simplify the QAM reproduction performed in the QAM reproducing circuit 83, and this adding technique is well-known.

Finally, a matrix K is newly generated according to the equations (58), (59a) and (59b) in the second correcting equation deriving and storing circuit 65, and the matrix K is stored in the storing unit 65 as a second correcting equation for a next symbol N+2. This newly generated matrix K is expressed as follows by using (a,b)=(7.5, 6.5) and (a",b")= (7.32, 6.36).

$$K = \begin{pmatrix} 1.02348, & 0.00128 \\ -0.00128, & 1.02348 \end{pmatrix} \quad (72)$$

This matrix K indicates a change of amplitude and phase characteristics occurring in the transmission path from a transmission time for the symbol N to another transmission time for the symbol N+1.

Thereafter, when a received signal (a',b')=(5.80, 2.10) of the reproduced digital information signals R'(a') and I'(b') for a next symbol N+2 is generated in the reproducing circuit 61, a first corrected signal (a",b") is generated in the first correcting circuit 63 according to an equation (73).

$$\begin{pmatrix} a'' \\ b'' \end{pmatrix} = H \begin{pmatrix} a' \\ b' \end{pmatrix} = \begin{pmatrix} 1.2, & 0 \\ 0, & 1.2 \end{pmatrix} \begin{pmatrix} 5.80 \\ 2.10 \end{pmatrix} = \begin{pmatrix} 6.96 \\ 2.52 \end{pmatrix} \quad (73)$$

Thereafter, the first corrected signal (a",b") is corrected in the second correcting circuit 66 by using the matrix K stored in the storing circuit 65 as the second correcting equation, and a second corrected transmission signal Rc(<a>,<b>) is obtained according to an equation (74).

$$\begin{pmatrix} \langle a \rangle \\ \langle b \rangle \end{pmatrix} = K \begin{pmatrix} a'' \\ b'' \end{pmatrix}$$

$$= \begin{pmatrix} 1.02348, & 0.00128 \\ -0.00128, & 1.02348 \end{pmatrix} \begin{pmatrix} 6.96 \\ 2.52 \end{pmatrix} \quad (74)$$

-continued $$= \begin{pmatrix} 7.1266 \\ 2.5702 \end{pmatrix}$$

Thereafter, the signal arrangement shown in FIG. 15 is searched, and a particular signal position (7.5, 2.5) is obtained from the received signal (<a>,<b>)=(7.1266, 2.5702). Therefore, it is judged that the received signal (<a>,<b>) is obtained from a transmitted signal (a,b)=(7.5, 2.5) indicated by the particular signal position, and reproduced digital information signals (Rc,Ic)=(7,2) are output from the output circuit 45. Assuming that any second correcting step according to the second correcting equation is not performed, it is judged that the received signal (a',b') is obtained from a transmitted signal (a,b)=(6.5, 2.5), and reproduced digital information signals (Rc,Ic)=(6,2) are output from the output circuit 45. Accordingly, the reproduced digital information signals can be reliably obtained in the second embodiment.

Finally, a matrix K is newly generated according to the equations (58) and (59a) to (59d) in the second correcting equation deriving and storing circuit 65, and the matrix K is stored in the storing unit 65 as a second correcting equation for a next symbol N+3. This newly generated matrix K is expressed as follows by using (a,b)=(7.5, 2.5) and (a",b")= (6.96, 2.52).

$$K = \begin{pmatrix} 1.06767, & 0.02738 \\ -0.02738, & 1.06767 \end{pmatrix} \quad (75)$$

This matrix K indicates a change of amplitude and phase characteristics occurring in the transmission path from a transmission time for the symbol N to another transmission time for the symbol N+2.

Next, modifications of the second embodiment are described.

(First Modification)

It is not required to limit the number of sets of positive and negative carrier waves into which one reference signal is inserted to one, and it is applicable that one reference signal be inserted into several sets of positive and negative carrier waves. In the second embodiment, one reference signal is allocated to a plurality of carrier waves having the same frequency among a plurality of symbols, values of each of the coefficients S0 to S7 are averaged to detect a transmission system in which a Gause noise is removed, and the first correcting equation is used.

Also, the Gause noise can be removed by averaging a plurality of second correcting equations. In the first modification, a method for averaging matrices K for 5 symbols is described. This method is performed in the second correcting equation deriving and storing circuit 65.

A reference signal is transmitted, and a reproduced reference signal is received. In this case, a matrix K for an m-th (m=1,2, - - - ,5) symbol among 5 symbols is expressed by a matrix $K_m$, and the matrix $K_m$ is formulated as follows.

$$K_m = \begin{pmatrix} K0_m, & K1_m \\ -K1_m, & K0_m \end{pmatrix} \quad (76)$$

Initial values $K0_1=1$, $K0_2=1$, $K0_3=1$, $K0_4=1$, $K0_5=1$, $K1_1=0$, $K1_2=0$, $K1_3=0$, $K1_4=0$ and $K1_5=0$ are set. Also, $$K0 = (K0_1 + K0_2 + K0_3 + K0_4 + K0_5)/5 \quad (77)$$

$$K1 = (K1_1 + K1_2 + K1_3 + K1_4 + K1_5)/5$$

are set. In this case, a matrix K averaged for 5 symbols is expressed as follows.

$$K = (K_1 + K_2 + K_3 + K_4 + K_5)/5 \quad (78)$$

$$= \begin{pmatrix} K0, & K1 \\ -K1, & K0 \end{pmatrix}$$

When a received signal for a symbol N−1 is generated in the reproducing circuit 61, a second corrected transmission signal for the symbol N−1 is calculated, and a matrix $K_1$ for a symbol N is calculated according to the equations (58) and (59a) to (59d). In this case, a matrix $K_2$ for a symbol N−1, a matrix $K_3$ for a symbol N−2, a matrix $K_4$ for a symbol N−3 and a matrix $K_5$ for a symbol N−4 have been already calculated. Thereafter, an averaged matrix K for the symbol N is calculated according to the equations (77) and (78) as a second correcting equation. Therefore, the averaged matrix K can be repeatedly obtained while increasing the number N.

(Second Modification)

In cases where a degree of a high speed change of amplitude and phase characteristics occurring in the transmission path exceeds an upper limit of a change that the first corrected signal can be corrected according to the second correcting equation, or in cases where a signal-to-noise (S/N) ratio is extremely degraded, there is a case that the first corrected signal is inversely corrected for the worse. In cases where the first corrected signal is corrected by the averaged matrix K according to the first modification, a degree of the inverse correction of the first corrected signal is lessen. However, in cases where the high speed change exceeding the upper limit continuously occurs, the inverse correction of the first corrected signal is inevitably performed.

To avoid the inverse correction of the first corrected signal, when the matrix K is calculated according to the equations (58), (59a) to (59d) and (68), a difference between each of elements a, b, c and d of the transmitted signal and each of elements a", b", c" and d" of the first corrected signal is detected as an error signal, in cases where one of the error signals exceeds an upper limit or a lower limit, elements of the matrix K are set to prescribed values. For example, in cases where one error signal is higher than 0.4 or is lower than −0.4, the error signal is set to 0.4 or −0.4, and the matrix K is calculated. This operation is performed in the second correcting equation deriving and storing circuit 65.

(Third Modification)

In cases where the S/N ratio is extremely degraded, there is a case that the first corrected signal is inversely corrected for the worse. In cases where the first corrected signal is corrected by the averaged matrix K according to the first modification, a degree of the inverse correction of the first corrected signal is lessen. However, in cases where the high speed change exceeding the upper limit continuously occurs, the inverse correction of the first corrected signal is inevitably performed.

To avoid the inverse correction of the first corrected signal, when the matrix K is calculated according to the equations (58), (59a) to (59d) and (68), a difference between each of elements a, b, c and d of the transmitted signal and each of elements a", b", c" and d" of the first corrected signal is detected as an error signal, and each of the error signals is weighted by a prescribed value. That is, in cases where an error signal corresponding to one element of the transmitted signal and one element of the first corrected signal is detected for each of the calculation of the matrix K, the error signals are distributed according to a normal distribution because of the influence of the Gause noise. Therefore, in cases where one error signal is placed near to a central value in the normal distribution, the error signal is multiplied by a weighting factor having a high value. In contrast, in cases where one error signal is placed far from the central value, the error signal is multiplied by a weighting factor having a low value.

As a simple example, in cases where a matrix K averaged for 2 symbols is calculated according to the first modification, a table of weighting factors is prepared. In the table, a weighting factor is set to 5 for an absolute value of the error signal which is equal to or lower than 0.1, a weighting factor is set to 4 for an absolute value of the error signal which is higher than 0.1 and is equal to or lower than 0.2, a weighting factor is set to 3 for an absolute value of the error signal which is higher than 0.2 and is equal to or lower than 0.3, a weighting factor is set to 2 for an absolute value of the error signal which is higher than 0.3 and is equal to or lower than 0.4, and a weighting factor is set to 1 for an absolute value of the error signal which is higher than 0.4 and is equal to or lower than 0.5. Thereafter, each of two error signals for 2 symbols is weighted by a weighting factor, a signal sum of two weighted error signals is calculated, an averaged error signal is calculated by dividing the signal sum by a sum of the two weighting factors.

For example, in cases where a first error signal is 0.15 and a second error signal is 0.4, an averaged error signal of 0.21 (=(0.15*4+0.45*1)/(4+1)) is obtained. Assuming that any weighting operation is not performed, an averaged error signal of 0.3 (=(0.15+0.45)/2) is obtained. This weighting operation is performed in the second correcting equation deriving and storing circuit 65.

(Fourth Modification)

In cases where a degree of a high speed change of amplitude and phase characteristics occurring in the transmission path exceeds an upper limit of a change that the first corrected signal can be corrected according to the second correcting equation, or in cases where a signal-to-noise (S/N) ratio is extremely degraded, there is a case that the first corrected signal is inversely corrected for the worse. In cases where the first corrected signal is corrected by the averaged matrix K according to the first modification, a degree of the inverse correction of the first corrected signal is lessen. However, in cases where the high speed change exceeding the upper limit continuously occurs, the inverse correction of the first corrected signal is inevitably performed.

To avoid the inverse correction of the first corrected signal, the high speed change exceeding the upper limit is detected as an error in an error correcting circuit (not shown), and the second correcting equation is not renewed in cases where the error is detected, and a unit matrix is used as a renewed matrix K. In this case, a plurality of matrices K including the unit matrix are averaged according to the first modification to lessen an adverse influence of the high speed change exceeding the upper limit.

(Fifth Modification)

When the matrix K is calculated according to the equations (58), (59a) to (59d) and (68), an upper limit and a lower limit are set for each error signal arranged at <p> to <u> (real part). In cases where the arranging point of the error signal exceeds the upper limit or the lower limit, the matrix K is set to a unit matrix.

Figure 11:
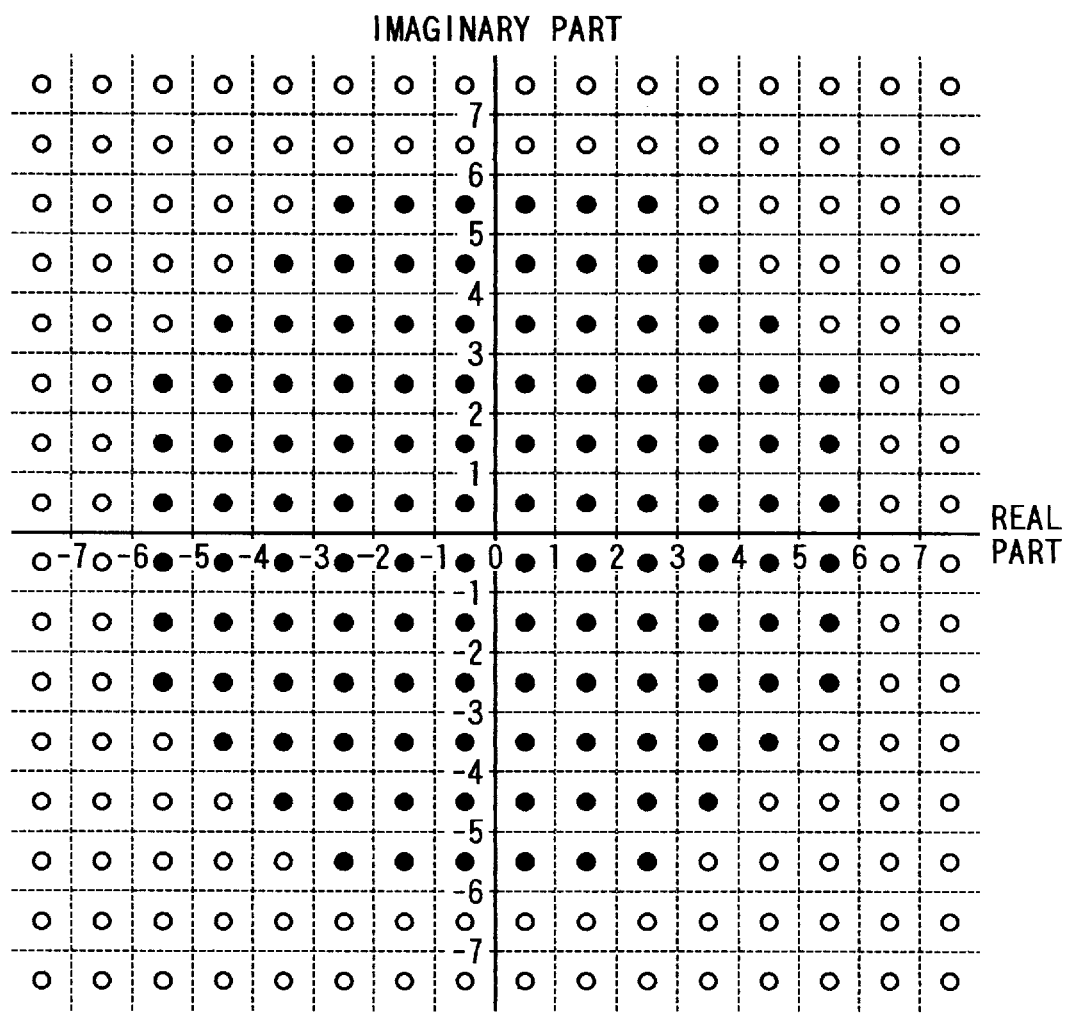
FIG. 11 shows the arrangement of error signals used for the generation of a matrix K.

In a simple example, in cases where a value of a real part or an imaginary part of the error signal or a sum of values of the real and imaginary parts is higher than the upper limit or is lower than the lower limit, the matrix K is set to a unit matrix. For example, in cases where one error signal is arranged on condition that an absolute value of the real part or the imaginary part is equal to or more than 8 or an absolute value of a sum of the real and imaginary parts is equal to or more than 6, the error signal is not used, and a unit matrix is used as a renewed matrix K. As shown in FIG. 11, in cases where the error signal is placed at one of black circles, the error signal is used to renew the matrix K. In contrast, in cases where the error signal is placed at one of white circles, the error signal is not used to renew the matrix K.

In particular, in cases where a degree of a high speed change of amplitude and phase characteristics occurring in the transmission path exceeds an upper limit of a change that the first corrected signal can be corrected according to the second correcting equation, there is a case that the first corrected signal is inversely corrected for the worse. In cases where the first corrected signal is corrected by the averaged matrix K according to the first modification, a degree of the inverse correction of the first corrected signal is lessen. However, in cases where the high speed change exceeding the upper limit continuously occurs, the inverse correction of the first corrected signal is inevitably performed. Because the high speed change influences on the error signal arranged on an outer side far from a central point, an error caused by the high speed change occurs at a high probability when the error signal is arranged on the outer side. Therefore, the error signal arranged on an inner side is only used to renew the matrix K.

(Sixth Modification)

In the above modifications, an averaging operation is performed along a time-axis for the matrix H, the matrix K or a combined matrix of the matrix H and the matrix K. However, in this modification, an averaging operation performed along a frequency-axis is described.

The carrier waves of the OFDM signal are set adjacent to each other, and a pair of carrier waves adjacent to each other have similar characteristics. That is, in cases where coefficients of each matrix are arranged in frequency order, the coefficients are arranged in a several-order curve shape. Also, the curve changes with another curve, and any high frequency component more than a prescribed value does not exist in the coefficients. In cases where a large changing point exists in the curve, the large changing point indicates that inappropriate correcting coefficients are calculated because the S/N ratio is degraded or the averaging operation along the time-axis is not sufficiently performed.

Therefore, in this modification, coefficients of a combined matrix of the matrix H and the matrix K are calculated, and a series of the coefficients arranged in a frequency order passes through a low pass filter to remove a high frequency component from the coefficients. This digital filtering processing can be easily performed in the first or second correcting equation deriving and storing circuit 64 or 65. This filtering is not limited to an one-dimensional filtering performed along the frequency-axis, and it is applicable that the filtering be performed in a two-dimensional filter to filter the coefficients along the frequency-axis and the time-axis.

The two-dimensional filter for filtering the coefficients along the frequency-axis and the time-axis is described in brief.

A plurality of matrices H are averaged by transmitting and receiving reference signals for a plurality of symbols. Also, a plurality of matrices K are averaged for a plurality of symbols. Therefore, the matrices H and the matrices K are respectively averaged along the time-axis. Also, a matrix E is generated according to an equation (79).

$$E = KH \quad (79)$$

In the coefficients of the matrix E, a coefficient of a particular carrier wave and a plurality of coefficients of other carrier waves (for example, ±10 carrier waves) neighboring the particular carrier are averaged. Each of all carrier waves is set as the particular carrier wave, and the averaging operation is performed for all carrier waves. Therefore, the matrices E are averaged along the frequency-axis, and a correcting calculation is performed as follows.

$$\begin{pmatrix} \langle a \rangle \\ \langle b \rangle \\ \langle c \rangle \\ \langle d \rangle \end{pmatrix} = E \begin{pmatrix} a' \\ b' \\ c' \\ d' \end{pmatrix} \quad (80)$$

In the second embodiment, the first correcting step using the matrix H and the second correcting step using the matrix K are separately performed. However, in this modification, the matrix H and the matrix K are calculated in the same manner, and a correcting operation is performed according to the equation (80) by using the matrix E.

(Another Modification)

A set of a central carrier wave and two carrier waves adjacent to the central carrier wave is repeatedly formed by selecting three carrier waves from all carrier waves, one reference signal is inserted into the central carrier wave of each set, a correcting equation for the central carrier wave is derived, and each of two received signals corresponding to the carrier waves adjacent to the central carrier wave is corrected by using the correcting equation for the central carrier wave. Therefore, a volume of calculation is reduced, a coming period of the reference signal is shortened, the transmitting apparatus 71 and the receiving apparatus 81 can be manufactured at a low cost, and the digital information signals can be processed at a high speed.

Next, a third embodiment of the present invention is described. In the first and second embodiments and the modifications, one known reference signal is inserted into one set of positive and negative carrier waves symmetric to each other with respect to the central carrier wave of the OFDM signal. However, in the third embodiment, the reference signal is transmitted and received without limiting the reference signal to one set of positive and negative carrier waves, and the second correcting equation according to the second embodiment is used. Therefore, an OFDM signal correction can be performed even though the OFDM signal is transmitted in the mobile communication or in the multi-path circumstance. Also, in the first to third embodiments, the symbol number is used. In this case, a signal condition of the symbol number in transmission is not limited on condition that the symbol number is recognized in the receiving apparatus 31 or 81. For example, it is applicable that the symbol number be transmitted by using a synchronizing symbol or a transmission parameter.

In the third embodiment, the OFDM signal is transmitted from a transmitting apparatus having the same configuration as the orthogonal frequency division multiplex signal transmitting apparatus 11. In this case, a reference signal is transmitted with one carrier wave of the OFDM signal. Also, in a receiving apparatus, a particular carrier wave modulated by a known reference signal is designated according to a symbol number, particular parameter information or synchronizing symbol information transmitted with a prescribed carrier wave, the particular carrier wave is cyclically altered for each prescribed period, and the particular carrier waves are transmitted one after another.

In this case, a digital information signal expressed by a complex number (p+jq) allocated to one carrier wave of a frequency +Wn is transformed into an I signal and a Q signal expressed according to the equations (1) and (2) in the arithmetic unit 13, the I and Q signals are transformed into an OFDM signal in the quadrature modulating unit 21, and the I and Q signals indicating the digital information signals is transmitted by the carrier wave of the frequency +Wn in the OFDM signal.

Figure 12:
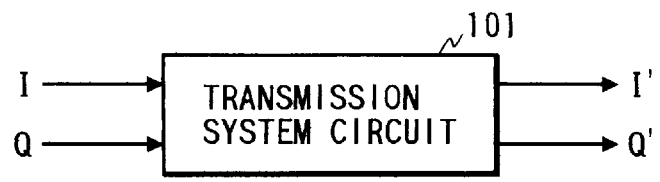
FIG. 12 is a block diagram of a transmission system circuit for changing I and Q signals to I' and Q' signals according to a third embodiment of the present invention.
Figure 13:
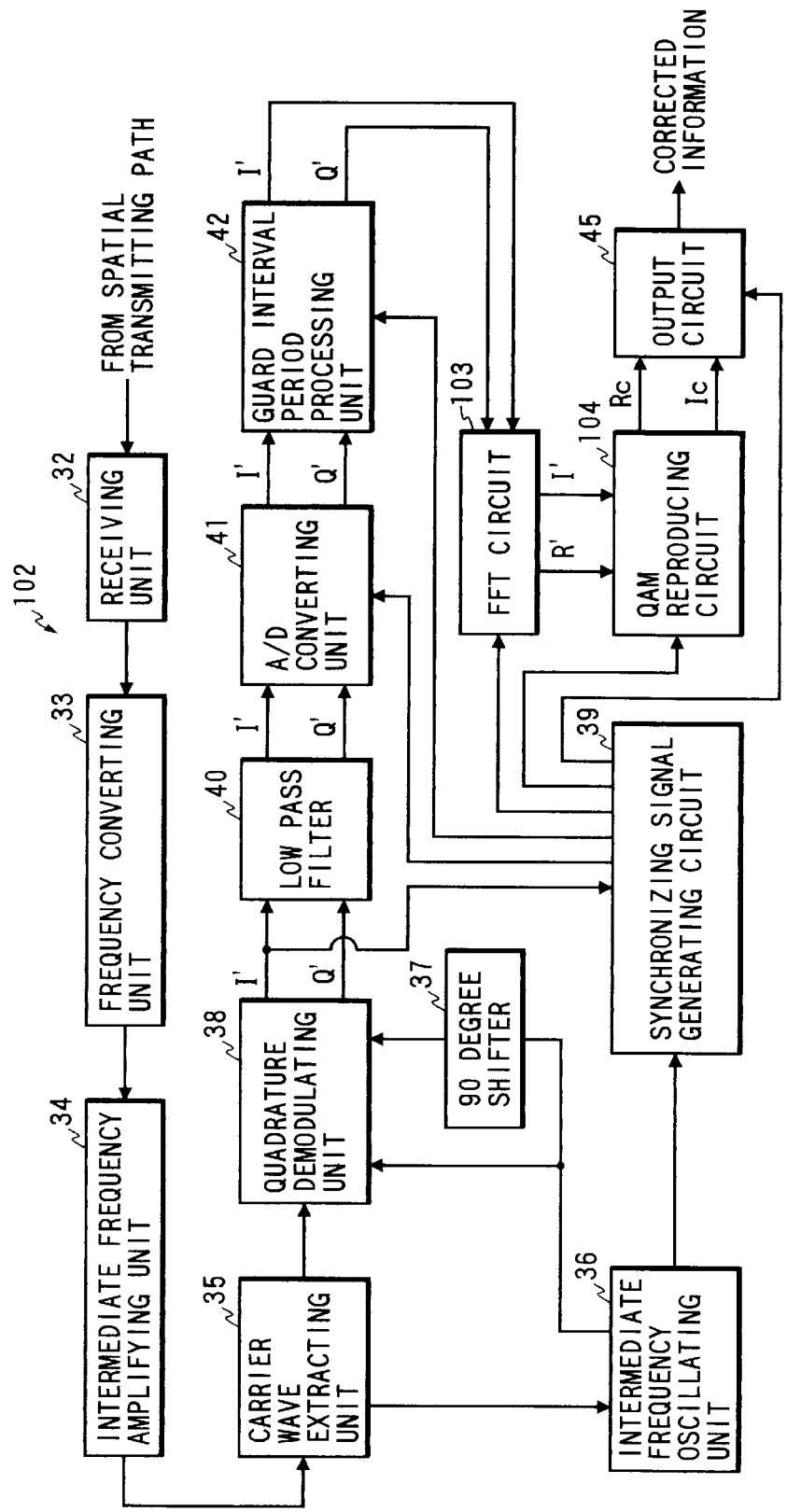
FIG. 13 is a block diagram of an orthogonal frequency division multiplex signal receiving apparatus according to the third embodiment of the present invention.

Thereafter, as shown in FIG. 12, the I and Q signals transmit through a transmission system circuit 101 corresponding to a group of the frequency converting unit 23, the transmitting unit 24 and characteristics of the spatial transmission path. In the transmission system circuit 101, an amplitude of the I and Q signals is changed by Y, and a phase of the I and Q signals is changed by d to generate an I' signal and a Q' signal. The I' and Q' signals are received by an orthogonal frequency division multiplex signal receiving apparatus 102 shown in FIG. 13. In the receiving apparatus 102, a fast Fourier transformation (FFT) circuit 103 and a quadrature amplitude modulation (QAM) reproducing circuit 104 are provided.

Thereafter, a discrete Fourier transformation (DFT) is performed for the I' and Q' signals in the FFT circuit 103 of the receiving apparatus 102, and the I' and Q' signals are expressed as a complex number.

$$A' \exp j(+Wn^*t+a') = A \exp j(+Wn^*t+a)^*(Y \exp jd) \quad (81)$$

Here, $A' = \sqrt{(p'^2 + q'^2)}$ and $a' = \tan^{-1}(q'/p')$ are satisfied. Also, a complex number p'+jq' indicates a received signal. When coefficients S0 and S1 indicating transmission characteristics in the transmission path are used, the equation (81) can be rewritten to an equation (82).

$$\begin{pmatrix} p' \\ q' \end{pmatrix} = \begin{pmatrix} S0, & -S1 \\ S1, & S0 \end{pmatrix} \begin{pmatrix} p \\ q \end{pmatrix} \quad (82)$$

Here, a complex number p+jq indicates a transmitted signal.

In this embodiment, to heighten a response speed for characteristics (multi-path circumstance characteristics) changing at high speed, the amplitude change Y and the phase change d occurring in the transmission system circuit 101 is rewritten to M*Y and d+d1. Therefore, the equation (81) can be rewritten to an equation (83).

$$A' \exp j(+Wn^*t+a') = A \exp j(+Wn^*t+a)^*(Y \exp jd)^*(M \exp jd1) \quad (83)$$

When Mexpjd1=V1+jV2 is used, an equation $$p'+jp' = (p+jq)S0+jS1)(V1+jV2)$$

is satisfied, and the received signal (p', q') is expressed as follows.

$$\begin{pmatrix} p' \\ q' \end{pmatrix} = \begin{pmatrix} S0, & -S1 \\ S1, & S0 \end{pmatrix} \begin{pmatrix} V1, & -V2 \\ V2, & V1 \end{pmatrix} \begin{pmatrix} p \\ q \end{pmatrix} \quad (84)$$

$$= SV\begin{pmatrix} p \\ q \end{pmatrix}$$

Here, the matrix S indicates the transmission characteristics, and the matrix V indicates high speed changing characteristics.

Therefore, as is realized by comparing the equation (82) and the equation (84), a first correcting equation indicated by the matrix S for the reference signal is not changed, and a second correcting equation independent of the first correcting equation can be extracted as the matrix V. Also, though the equation (84) is applied to the reference signal, the equation (84) can be also applied to a normal information signal transmitted from the transmitting apparatus to the receiving apparatus 102. That is, the equation (84) can be rewritten to an equation (85).

$$\begin{pmatrix} a \\ b \end{pmatrix} = V^{-1} S^{-1} \begin{pmatrix} a' \\ b' \end{pmatrix} \qquad (85)$$

$$= KH \begin{pmatrix} a' \\ b' \end{pmatrix}$$

The matrix S and the inverse matrix $S^{-1}=H$ can be obtained according to a conventional method. Also, the matrix $K=V^{-1}$ is expressed as follows.

$$K = \begin{pmatrix} V1/(V1^2+V2^2), & V2/(V1^2+V2^2) \\ -V2/(V1^2+V2^2), & V1/(V1^2+V2^2) \end{pmatrix} \qquad (86)$$

Because the matrix K is renewed for each symbol and for each frequency, assuming that the matrix K is complicated, the matrix K cannot be used because of a large volume of calculation. However, because the matrix K is a matrix of 2 rows and 2 columns, a volume of calculation is not increased so much, so that the matrix K can be used.

The matrix H is renewed for each reference signal coming to the receiving apparatus 102. When the matrix H is renewed, the matrix K is treated as a unit matrix. Thereafter, a first corrected information signal is obtained by correcting the received signal (that is, a modulated digital information signal received in the receiving apparatus 102) by using the matrix H, high speed changing components in the amplitude and phase of the received signal are detected for each symbol by calculating a difference between a position of the first corrected information signal and a position of a desired signal for each symbol, and the matrix K is renewed for each frequency and for each symbol according to the high speed changing components in the amplitude and phase of the received signal. Each matrix K renewed is used for a next symbol.

Therefore, because the high speed changing characteristics (or multi-path circumstance characteristics) are corrected according to the same method as in the second embodiment in which the second correcting equation is used, the description of the correction for the high speed changing characteristics performed for each symbol is omitted. However, the difference from the second embodiment is that the matrix H and the matrix K are respectively a matrix of 2 rows and 2 columns. Also, elements of the matrix K are expressed by using the coefficients K0 and K1 defined according to the equations (59a) and (59b).

In the third embodiment, a symbol number is inserted into a first carrier wave by the symbol number counting circuit 14, and reference data used only to correct the symbol number inserted into the first carrier wave is inserted into an m1-th carrier wave as a reference signal by the reference signal inserting circuit 15. The symbol number is inserted for each symbol period while cyclically increasing the symbol number. That is, the symbol numbers 0,1,2,3, - - - ,511,0,1,2, - - - are counted and output. Each symbol number is expressed by 9 bits, 4 bits composed of the ninth bit, the eighth bit, the third bit and the second bit among the 9 bits are modulated in the QAM, and the 4 bits of each symbol number are transmitted with a prescribed carrier wave.

In the reference signal inserting circuit 15, a reference signal is generated according to upper 8 bits among the 9 bits of the symbol number. Because the lowest bit of the symbol number is disregarded, a frequency of one carrier wave of a particular symbol into which the reference signal is inserted is the same as that of another carrier wave of another symbol placed just before the particular symbol. That is, the reference signal is inserted into two carrier waves having the same frequency in two symbols adjacent to each other.

The reference signal (p,q) is expressed according to an equation (87).

$$\begin{pmatrix} p \\ q \end{pmatrix} = \begin{pmatrix} X \\ Y \end{pmatrix} \qquad (87)$$

Here, values X and Y of the reference signal are known in the receiving apparatus 102.

Figure 14:
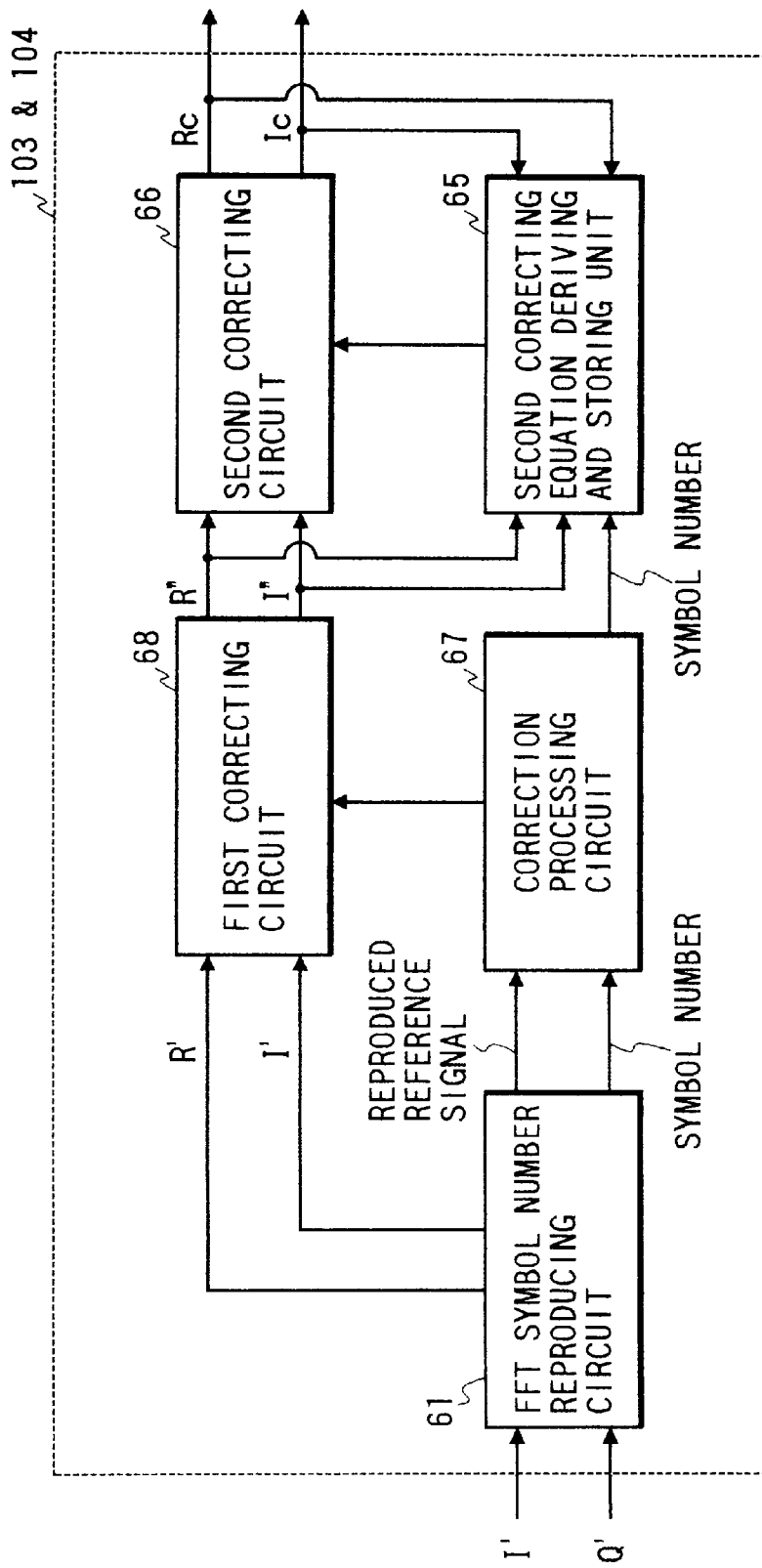
FIG. 14 is a block diagram of an FFT circuit and a QAM reproducing circuit shown in FIG. 13.

The I' and Q' signals output from the transmission system circuit 101 are received in the FFT circuit 103 and the QAM reproducing circuit 104 of the receiving apparatus 102. FIG. 14 is a block diagram of the FFT circuit 103 and the QAM reproducing circuit 104.

As shown in FIG. 14, the I' and Q' signals are fed to the FFT symbol number reproducing circuit 61, the symbol number is reproduced, and values of a reproduced reference signal inserted into a set of positive and negative carrier waves corresponding to the symbol number are obtained.

In this embodiment, because 16 QAM is performed for the 4 bits of the symbol number, the symbol number can be reproduced at a preferable error rate as compared with that in other transmission information, the symbol number ranging from 1 to 511 expressed by 9 bits can be reliably reproduced, and a set of carrier waves in which one reference signal is inserted can be reliably specified for each symbol. The values of the reproduced reference signal obtained in the reproducing circuit 61 is expressed by $P_{0S}{}'$ and $q_{0S}{}'$ for a 0-th symbol (an even symbol number) and $p_{1S}{}'$ and $q1S'$ for a first symbol (an odd symbol number).

Thereafter, in a correction processing circuit 67, the coefficients S0 and S1 indicating the transmission characteristics for the 0-th symbol are calculated from the equation (82) as follows.

S0=$(X*p_{0S}{}'+Y*q_{0S}{}')/(X^2+Y^2)$

S1=$(X*q_{0S}{}'-Y*p_{0S}{}')/(X^2-Y^2)$

Also, the coefficients S0 and S1 for the first symbol are calculated from the equation (82) as follows.

S0=$(X*p_{1S}{}'+Y*q_{1S}{}')/(X^2+Y^2)$

S1=$(X*q_{1S}{}'-y*p_{1S}{}')/(X^2-y^2)$

Thereafter, each of the coefficients S0 and S1 is averaged, and a white noise is removed. In this embodiment, an average between 2 symbols is obtained.

Because two coefficients S0 and S1 are used, the coefficients S0 and S1 can be obtained by transmitting and receiving one type of reference signal. In this case, because the reference signal is known in the receiving apparatus 102, any type of reference signal is applicable on condition that the coefficients are obtained.

After the coefficients S0 and S1 indicating the transmission characteristics are detected in the correction processing circuit 67, an average correcting equation (or a first correcting equation) for the corresponding carrier wave is derived according to an equation (88) by using the coefficients S0 and S1 and the symbol number, and the first correcting equation is stored in the circuit 67.

$$\frac{1}{\det A}\begin{pmatrix} H0, & H1 \\ -H1, & H0 \end{pmatrix} \qquad (88)$$

Here, H0=S0, H1=S1, detA=S0$^2$+S1$^2$ are satisfied.

The first correcting equation is derived for each carrier wave. Because 257 carrier waves are used, about 256 first correcting equations are generated one after another, and the first correcting equations are renewed as time is elapsed. That is, because one first correcting equation is derived by averaging the coefficients S0 and S1 for 2 symbols and for the same carrier wave, a renewing interval of one first correcting equation for the same carrier wave is 512 symbols (2 symbols*256=512).

In this embodiment, the coefficients S0 and S1 indicating the transmission characteristics are calculated to derive the first correcting equation. However, it is applicable that the first correcting equation be directly derived from an equation (89a) without calculating the coefficients S0 and S1.

$$\begin{pmatrix} a \\ b \end{pmatrix} = \frac{1}{\det A}\begin{pmatrix} H0, & H1 \\ -H1, & H0 \end{pmatrix}\begin{pmatrix} a' \\ b' \end{pmatrix} \qquad (89\ a)$$

Thereafter, reproduced digital information signals R' and I' equivalent to the received signal (a',b') generated in the FFT symbol number reproducing circuit 61 are corrected in a first correcting circuit 68 according to an equation (89b) by using the first correcting equation stored in the correction processing circuit 67, and a first corrected signal (a",b") is output.

$$\begin{pmatrix} a'' \\ b'' \end{pmatrix} = \frac{1}{\det A}\begin{pmatrix} H0, & H1 \\ -H1, & H0 \end{pmatrix}\begin{pmatrix} a' \\ b' \end{pmatrix} \qquad (89\ b)$$

In this case, because the coefficients S0 and S1 are changed every 512 symbols, the first correcting equation is also changed every 512 symbols. The correction using the first correcting equation is conventionally known, and the transmission characteristics gradually changing with time and temperature in the transmission path can be corrected.

Thereafter, in the second correcting circuit 66, a second corrected signal (<a>,<b>) is generated according to an equation (90) by using the matrix K. The matrix K is a unit matrix for a next symbol succeeding to a current symbol, in which the reference signal is transmitted and received, in the same manner as in the second embodiment. Also, the matrix K determined in a symbol just before a current symbol is used for each of other symbols.

$$\begin{pmatrix} \langle a \rangle \\ \langle b \rangle \end{pmatrix} = K\begin{pmatrix} a'' \\ b'' \end{pmatrix} \qquad (90)$$

Thereafter, the second corrected signal (<a>,<b>) is output to the outputting circuit 45 as a plurality of reproduced digital information signals Rc and Ic.

Also, the first corrected signal (a', b') generated in the first correcting circuit 68 according to the equation (89b), the symbol number output from the correction processing circuit 67 and the reproduced digital information signals Rc=a and Ic=b obtained in the second correcting circuit 66 are fed to the second correcting equation deriving and storing circuit 65, and a new matrix K is generated according to an equation (91) and is stored in the circuit 65.

$$K = \begin{pmatrix} K0, & K1 \\ -K1, & K0 \end{pmatrix} \qquad (91)$$

Here, the coefficient K0 is expressed by the equation (59a), and the coefficient K1 is expressed by the equation (59b).

The matrix K of the equation (91) corresponds to a high speed changing component of the transmission characteristics based on a difference between a position of the reproduced data p and q and a position of a desired signal.

Accordingly, because the first corrected signal which is corrected according to the first correcting equation is again corrected according to the second correcting equation corresponding to the high speed changing characteristics in the same manner as in the second embodiment, the high speed changing characteristics such as a multi-path circumstance occurring in the mobile communication are corrected, and appropriate reproduced digital information signals can be obtained for each symbol.

Next, the correcting method using the second correcting equation is described by using specified values. The description relating to the matrix H is simplified, and the operation relating to the matrix K is described in detail.

A value set (real part, imaginary part)=(7.5, 7.5) of a prescribed reference signal for a symbol N is initially transmitted in the same manner as in the second embodiment, and a reproduced reference signal (6.25, 6.25) is received in the receiving apparatus 102. In this case, the matrix H does not include any error in a transmitting system, any phase characteristic does not change, and an amplitude characteristic in the matrix H indicates a condition of 6.25/7.5 times as shown in the equation (69).

In a first correcting step according to the first correcting equation, the reproduced digital information signal is corrected by using the above matrix H, and the matrix H is not renewed until another reproduced reference signal is fed to the correction processing circuit 67. The matrix H formulated in the equation (69) is the first correcting equation stored in the correction processing circuit 67. In this case, the matrix K is set to a unit matrix formulated in the equation (70) and is stored as the second correcting equation in the storing circuit 65.

Thereafter, when a received signal (a',b')=(6.10,5.30) of the reproduced digital information signals R'(a') and I'(b') for a next symbol N+1 is generated in the reproducing circuit 61, a second corrected transmission signal Rc(<a>,<b>)=(7.32, 6.36) is obtained as is described in the second embodiment.

Therefore, the second correcting circuit 66 judges that the received signal (a',b') is obtained from a transmitted signal (a,b)=(7.5, 6.5), and reproduced digital information signals (Rc,Ic)=(7,6) are output from the output circuit 45. Here, a value 0.5 is a bias value added to the transmitted signal to simplify the QAM reproduction performed in the QAM reproducing circuit 104, and this adding technique is well-known.

Finally, a matrix K is newly generated according to the equations (58) and (59a) to (59d) in the second correcting equation deriving and storing circuit 65, and the matrix K expressed according to the equation (72) is stored in the storing unit 65 as a second correcting equation for a next symbol N+2. This matrix K indicates a change of amplitude and phase characteristics occurring in the transmission path from a transmission time for the symbol N to another transmission time for the symbol N+1.

Thereafter, the same correcting operation is repeated, and the same result as that in the second embodiment is obtained.

Next, modifications of the third embodiment are described.

(First Modification)

In the third embodiment, the reference signal is inserted into two carrier waves having the same frequency in two symbols adjacent to each other to average the coefficients S0 and S1 in the two symbols, so that an information transmission system from which Gauss noises are removed is detected, and the first correcting equation averaged for the two symbols is obtained and used. However, the number of symbols in which the reference signal is inserted into a plurality of carrier waves having the same frequency is not limited to two.

Also, the removal of the Gauss noises can be performed by averaging a plurality of second correcting equations obtained for a plurality of symbols. In the first modification of the third embodiment, an averaging method for averaging five matrixes K obtained for five symbols is described.

A reference signal is transmitted, and a reproduced reference signal is received. In this case, a matrix K for an m-th (m=1,2, - - - ,5) symbol among 5 symbols is expressed by a matrix $K_m$, and the matrix $K_m$ is formulated as follows.

$$K_m = \begin{pmatrix} K0_m, & K1_m \\ -K1_m, & K0_m \end{pmatrix} \quad (92)$$

Initial values $K0_1=1$, $K0_2=1$, $K0_3=1$, $K0_4=1$, $K0_5=1$, $K1_1=0$, $K1_2=0$, $K1_3=0$, $K1_4=0$ and $K1_5=0$ are set. Also, $$K0 = (K0_1 + K0_2 + K0_3 + K0_4 + K0_5)/5 \quad (93)$$

$$K1 = (K1_1 + K1_2 + K1_3 + K1_4 + K1_5)/5$$

are set. In this case, a matrix K averaged for 5 symbols is expressed as follows.

$$K = (K_1 + K_2 + K_3 + K_4 + K_5)/5 \quad (94)$$

$$= \begin{pmatrix} K0, & K1 \\ -K1, & K0 \end{pmatrix}$$

When a received signal for a symbol N−1 is generated in the reproducing circuit 61, a second corrected transmission signal for the symbol N−1 is calculated, and a matrix $K_1$ for a symbol N is calculated according to the equations (91), (59a) and (59b). In this case, a matrix $K_2$ for a symbol N−1, a matrix $K_3$ for a symbol N−2, a matrix $K_4$ for a symbol N−3 and a matrix $K_5$ for a symbol N−4 have been already calculated. Thereafter, an averaged matrix K for the symbol N is calculated according to the equations (93) and (94) as a second correcting equation. Therefore, the averaged matrix K can be repeatedly obtained while increasing the number N.

(Second Modification)

In cases where a degree of a high speed change of amplitude and phase characteristics occurring in the transmission path exceeds an upper limit of a change that the first corrected signal can be corrected according to the second correcting equation, or in cases where a signal-to-noise (S/N) ratio is extremely degraded, there is a case that the first corrected signal is inversely corrected for the worse. In cases where the first corrected signal is corrected by the averaged matrix K according to the first modification, a degree of the inverse correction of the first corrected signal is lessen. However, in cases where the high speed change exceeding the upper limit continuously occurs, the inverse correction of the first corrected signal is inevitably performed.

To avoid the inverse correction of the first corrected signal, when the matrix K is calculated according to the equations (90), (91), (59a) and (59b), a difference between elements a and b of the transmitted signal and elements a" and b" of the first corrected signal is detected as an error signal. In cases where one of the error signals exceeds an upper limit or a lower limit, elements of the matrix K are set to prescribed values. For example, in cases where one error signal is higher than 0.4 or is lower than −0.4, the error signal is set to 0.4 or −0.4, and the matrix K is calculated. This operation is performed in the second correcting equation deriving and storing circuit 65.

(Third Modification)

In cases where the S/N ratio is extremely degraded, there is a case that the first corrected signal is inversely corrected for the worse. In cases where the first corrected signal is corrected by the averaged matrix K according to the first modification, a degree of the inverse correction of the first corrected signal is lessen. However, in cases where the high speed change exceeding the upper limit continuously occurs, the inverse correction of the first corrected signal is inevitably performed.

To avoid the inverse correction of the first corrected signal, when the matrix K is calculated according to the equations (90), (91), (59a) and (59b), a difference between elements a and b of the transmitted signal and elements a" and b" of the first corrected signal is detected as an error signal, and each of the error signals is weighted by a prescribed value. That is, in cases where an error signal corresponding to one element of the transmitted signal and one element of the first corrected signal is detected for each calculation of the matrix K, the error signals are distributed according to a normal distribution because of the influence of the Gause noise. Therefore, in cases where one error signal is placed near to a central value in the normal distribution, the error signal is multiplied by a weighting factor having a high value. In contrast, in cases where one error signal is placed far from the central value, the error signal is multiplied by a weighting factor having a low value. This weighting operation is performed in the second correcting equation deriving and storing circuit 65.

(Fourth Modification)

In cases where a degree of a high speed change of amplitude and phase characteristics occurring in the transmission path exceeds an upper limit of a change that the first corrected signal can be corrected according to the second correcting equation, or in cases where a signal-to-noise (S/N) ratio is extremely degraded, there is a case that the first corrected signal is inversely corrected for the worse. In cases where the first corrected signal is corrected by the averaged matrix K according to the first modification, a degree of the inverse correction of the first corrected signal is lessen. However, in cases where the high speed change exceeding the upper limit continuously occurs, the inverse correction of the first corrected signal is inevitably performed.

To avoid the inverse correction of the first corrected signal, the high speed change exceeding the upper limit is detected as an error in an error correcting circuit (not shown), and the second correcting equation is not renewed in cases where the error is detected, and a unit matrix is used as a renewed matrix K. In this case, a plurality of matrices K including the unit matrix are averaged according to the first modification to lessen an adverse influence of the high speed change exceeding the upper limit.

(Fifth Modification)

When the matrix K is calculated according to the equations (90), (91), (59a) and (59b), an upper limit and a lower limit are set for each error signal arranged at <a> and <b> (real part). In cases where the arranging point of the error signal exceeds the upper limit or the lower limit, the matrix K is set to a unit matrix.

For example, as shown in FIG. 11, in cases where one error signal is arranged on condition that an absolute value of the real part or the imaginary part is equal to or more than 8 in 256 QAM or an absolute value of a sum of the real and imaginary parts is equal to or more than 6 in 256 QAM, the error signal is not used, and a unit matrix is used as a renewed matrix K.

Because the high speed change influences the error signal arranged on an outer side far from a central point, an error caused by the high speed change occurs at a high probability when the error signal is arranged on the outer side. Therefore, a group of the error signals which are indicated by black circles in FIG. 11 and are arranged on an inner side is only used to renew the matrix K.

(Sixth Modification)

In this modification, an averaging operation performed along a frequency-axis is described.

After coefficients of a combined matrix of the matrix H and the matrix K are calculated, a series of the coefficients arranged in a frequency order passes through a low pass filter to remove a high frequency component from the coefficients. This digital filtering processing can be easily performed in the correction processing circuit 67 or the second correcting equation deriving and storing circuit 65. This filtering is not limited to an one-dimensional filtering performed along the frequency-axis, and it is applicable that the filtering be performed in a two-dimensional filter to filter the coefficients along the frequency-axis and the time-axis.

The two-dimensional filter for filtering the coefficients along the frequency-axis and the time-axis is described in brief.

A plurality of matrices H are averaged by transmitting and receiving reference signals for a plurality of symbols. Also, a plurality of matrices K are averaged for a plurality of symbols. Therefore, the matrices H and the matrices K are respectively averaged along the time-axis. Thereafter, a matrix E is generated in the same manner as the generation of the equation (79), a coefficient of a particular carrier wave and a plurality of coefficients of other carrier waves (for example, ±10 carrier waves) neighboring the particular carrier are averaged. Each of all carrier waves is set as the particular carrier wave, and the averaging operation is performed for all carrier waves. Therefore, the matrices E are averaged along the frequency-axis, and a correcting calculation is performed as follows.

$$\begin{pmatrix} \langle a \rangle \\ \langle b \rangle \\ \langle c \rangle \\ \langle d \rangle \end{pmatrix} = E \begin{pmatrix} a' \\ b' \\ c' \\ d' \end{pmatrix} \quad (95)$$

In the second embodiment, the first correcting step using the matrix H and the second correcting step using the matrix K are separately performed. However, in this modification, the matrix H and the matrix K are calculated in the same manner, and a correcting operation is performed according to the equation (95) by using the matrix E.

(Another Modification)

A set of a central carrier wave and two carrier waves adjacent to the central carrier wave is repeatedly formed by selecting three carrier waves from all carrier waves, one reference signal is inserted into the central carrier wave of each set, a correcting equation for the central carrier wave is derived, and each of two received signals corresponding to the carrier waves adjacent to the central carrier wave is corrected by using the correcting equation for the central carrier wave. Therefore, a volume of calculation is reduced, a coming period of the reference signal is shortened, the transmitting apparatus 71 and the receiving apparatus 81 can be manufactured at a low cost, and the digital information signals can be processed at a high speed.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An orthogonal frequency division multiplex signal transmitting method, comprising the steps of:

preparing a plurality of carrier waves having frequencies different from each other;

classifying the plurality of carrier waves into a central carrier wave, a plurality of positive carrier waves having frequencies higher than that of the central carrier wave and a plurality of negative carrier waves having frequencies lower than that of the central carrier wave;

calculating a set of an in-phase signal and a quadrature signal from each of a plurality of information signals on a transmitting side for each of symbols;

modulating each of the plurality of positive carrier waves and each of the plurality of negative carrier waves with one of a plurality of sets of in-phase and quadrature signals calculated from the plurality of information signals for each of the symbols;

inserting an original reference signal known on a receiving side into a set of a particular positive carrier wave and a particular negative carrier wave, of which frequencies are symmetric to each other with respect to a central frequency of the central carrier wave, selected from the plurality of positive and negative carrier waves for each of the symbols on the selection of the set the transmitting side while changing of particular positive and negative carrier waves every prescribed time on condition that the original reference signal is inserted into all positive and negative carrier waves every prescribed symbols;

producing an orthogonal frequency division multiplex signal composed of the central carrier wave and a plurality of modulated carrier waves, by which the plurality of information signals and the original reference signal are carried, for each of the symbols;

transmitting the orthogonal frequency division multiplex signal from the transmitting side to a transmission path for each of the symbols;

receiving the orthogonal frequency division multiplex signal transmitted from the transmission path on the receiving side for each of the symbols;

demodulating the plurality of modulated carrier waves of the orthogonal frequency division multiplex signal received on the receiving side to obtain a plurality of demodulated information signals on the receiving side for each of the symbols;

obtaining a plurality of sets of reproduced in-phase and reproduced quadrature signals of a plurality of reproduced information signals from the plurality of demodulated information signals for each of the symbols;

obtaining a demodulated reference signal on the receiving side for each of the symbols;

obtaining a reproduced reference signal from the demodulated reference signal for each of the symbols;

detecting a characteristic of the transmission path for the set of particular positive and negative carrier waves according to a real part of the original reference signal carried by the particular positive carrier wave, an imaginary part of the original reference signal carried by the particular positive carrier wave, a real part of the original reference signal carried by the particular negative carrier wave, an imaginary part of the original reference signal carried by the particular negative carrier wave, a real part of the reproduced reference signal carried by the particular positive carrier wave, an imaginary part of the reproduced reference signal carried by the particular positive carrier wave, a real part of the reproduced reference signal carried by the particular negative carrier wave demodulated and an imaginary part of the reproduced reference signal carried by the particular negative carrier wave for each of the symbols;

obtaining a plurality of characteristics of the transmission path for all sets of positive and negative carrier waves by repeating the detection of the characteristic of the transmission path by the prescribed symbols;

calculating a plurality of correcting equations for all sets of positive and negative carrier waves from the characteristics of the transmission path; and correcting the plurality of sets of reproduced in-phase and reproduced quadrature signals to a plurality of sets of corrected in-phase signals and corrected quadrature signals according to the plurality of correcting equations for each of the symbols to obtain a plurality of corrected information signals from the plurality of sets of corrected in-phase signals and corrected quadrature signals for each of the symbols.

2. The orthogonal frequency division multiplex signal transmitting method according to claim 1 in which the step of calculating the set of the in-phase signal and the quadrature signal comprises the steps of:

expressing a real part of each of the plurality of information signals carried by the positive carrier waves by A;

expressing an imaginary part of each of the plurality of information signals carried by the positive carrier waves by B;

expressing a real part of each of the plurality of information signals carried by the negative carrier waves by C; and expressing an imaginary part of each of the plurality of information signals carried by the negative carrier waves by D, the step of inserting the original reference signal comprises the steps of:

preparing a first type of original reference signal and a second type of original reference signal as the original reference signal;

inserting a symbol number into one of the plurality of carrier waves for each of the symbols on the transmitting side while circularly changing a value of the symbol number for each of the symbol;

inserting the first type of original reference signal into one set of particular positive and negative carrier waves, of which first frequencies are symmetric to each other with respect to the central frequency of the central carrier wave, for each odd symbol in which an odd symbol number is inserted into one carrier wave as one symbol number to specify the one set of particular positive and negative carrier waves; and inserting the second type of original reference signal into one set of particular positive and negative carrier waves, of which second frequencies are symmetric to each other with respect to the central frequency of the central carrier wave, for each even symbol in which an even symbol number is inserted into one carrier wave as one symbol number to specify the one set of particular positive and negative carrier waves on condition that the second frequencies of the set of particular positive and negative carrier waves corresponding to one even symbol number Ns are the same as the first frequencies of the set of particular positive and negative carrier waves corresponding to one odd symbol number Ns−1 just preceding to the even symbol number Ns, the step of obtaining the plurality of sets of reproduced in-phase and reproduced quadrature signals comprises the steps of:

expressing a real part of each of the plurality of reproduced information signals, which are carried by the demodulated carrier waves obtained from the positive carrier waves, by A';

expressing an imaginary part of each of the plurality of reproduced information signals, which are carried by the demodulated carrier waves obtained from the positive carrier waves, by B';

expressing a real part of each of the plurality of reproduced information signals, which are carried by the demodulated carrier waves obtained from the negative carrier waves, by C'; and expressing an imaginary part of each of the plurality of reproduced information signals, which are carried by the demodulated carrier waves obtained from the negative carrier waves, by D', the step of obtaining the reproduced reference signal comprises the steps of:

demodulating the first type of original reference signal inserted into the set of particular positive and negative carrier waves to obtain a first type of reproduced reference signal for each odd symbol; and demodulating the second type of original reference signal inserted into the set of particular positive and negative carrier waves to obtain a second type of reproduced reference signal for each even symbol, the step of detecting the characteristic of the transmission path includes the step of:

calculating eight coefficients S0 to S7 which denote the transmitting and leaking degrees and satisfy a relationship $$\begin{pmatrix} A' \\ B' \\ C' \\ D' \end{pmatrix} = \begin{pmatrix} S0, & -S1, & S2, & S3 \\ S1, & S0, & S3, & -S2 \\ S4, & S5, & S6, & -S2 \\ S4, & S5, & S6, & -S7 \\ S5, & -S4, & S7IS6 & \end{pmatrix} \begin{pmatrix} A \\ B \\ C \\ D \end{pmatrix}$$

according to the first type of original reference signal, the second type of original reference signal, the first type of reproduced reference signal and the second type of reproduced reference signal for each of the symbols, the step of calculating the plurality of correcting equations includes the step of:

calculating a value $$\frac{1}{\det A} \begin{pmatrix} H0, & H1, & H2, & H3 \\ -H1, & H0, & H3, & -H2 \\ H4, & H5, & H6, & H7 \\ H5, & -H4, & -H7, & H6 \end{pmatrix}$$

in which H0=+S0(S6S6+S7S7)−S2(S4S6+S5S7)+S3 (S4S7−S5S6),
H1=+S1(S6S6+S7S7)−S3(S4S6+S5S7)−S2(S4S7−S5S6),
H2=+S4(S2S2+S3S3)−S6(S0S2+S1S3)+S7(S0S3−S1S2),
H3=+S5(S2S2+S3S3)−S7(S0S2+S1S3)−S6(S0S3−S1S2),
H4=+S2(S4S4+S5S5)−S0(S4S6+S5S7)−S1(S4S7−S5S6),
H5=+S3(S4S4+S5S5)−S1(S4S6+S5S7)+S0(S4S7−S5S6),
H6=+S6(S0S0+S1S1)−S4(S0S2+S1S3)−S5(S0S3−S1S2),
H7=+S7(S0S0+S1S1)−S5(S0S2+S1S3)+S4(S0S3−S1S2) and
detA=S0*H0+S1*H1+S4*H2+S5*H3 are satisfied, as one correcting equation for each of the symbols, and the step of correcting the plurality of sets of reproduced inphase and reproduced quadrature signals includes the step of:

calculating the real part A' of each of the plurality of reproduced information signals corresponding to the positive carrier waves, the imaginary part B' of each of the plurality of reproduced information signals corresponding to the positive carrier waves, the real part C' of each of the plurality of reproduced information signals corresponding to the negative carrier waves and the imaginary part D' of each of the plurality of reproduced information signals corresponding to the negative carrier waves according to a relationship $$\begin{pmatrix} \langle A \rangle \\ \langle B \rangle \\ \langle C \rangle \\ \langle D \rangle \end{pmatrix} = \frac{1}{\det A} \begin{pmatrix} H0, & H1, & H2, & H3 \\ -H1, & H0, & H3, & -H2 \\ H4, & H5, & H6, & H7 \\ H5, & -H4, & -H7, & H6 \end{pmatrix} \begin{pmatrix} A' \\ B' \\ C' \\ D' \end{pmatrix}$$

in which a real part of each of the plurality of corrected information signals corresponding to the positive carrier waves is expressed by <A>, an imaginary part of each of the plurality of corrected information signals corresponding to the positive carrier waves is expressed by <B>, a real part of each of the plurality of corrected information signals corresponding to the negative carrier waves is expressed by <C>, an imaginary part of each of the plurality of corrected information signals corresponding to the negative carrier waves is expressed by <D>.

3. The orthogonal frequency division multiplex signal transmitting method according to claim 1 in which the step of inserting the reference signal comprises the steps of:

preparing a first type of original reference signal and a second type of original reference signal as the original reference signal; inserting a symbol number into one of the plurality of carrier waves for each of the symbols on the transmitting side while circularly changing a value of the symbol number for each of the symbol;

inserting the first type of original reference signal into one set of particular positive and negative carrier waves, of which first frequencies are symmetric to each other with respect to the central frequency of the central carrier wave, for each odd symbol in which an odd symbol number is inserted into one carrier wave as one symbol number to specify the one set of particular positive and negative carrier waves;

inserting the second type of original reference signal into one set of particular positive and negative carrier waves, of which second frequencies are symmetric to each other with respect to the central frequency of the central carrier wave, for each even symbol in which an even symbol number is inserted into one carrier wave as one symbol number to specify the one set of particular positive and negative carrier waves on condition that the second frequencies of the set of particular positive and negative carrier waves corresponding to one even symbol number Ns are the same as the first frequencies of the set of particular positive and negative carrier waves corresponding to one odd symbol number Ns−1 just preceding to the even symbol number Ns;

expressing real parts of the first type of original reference signal and the second type of original reference signal inserted into the particular positive carrier wave by Ps;

expressing imaginary parts of the first type of original reference signal and the second type of original reference signal inserted into the particular positive carrier wave by Qs;

expressing real parts of the first type of original reference signal and the second type of original reference signal inserted into the particular negative carrier wave by Rs;

expressing imaginary parts of the first type of original reference signal and the second type of original reference signal inserted into the particular negative carrier wave by Us;

setting one of the real part Ps of the first type of original reference signal and the imaginary part Qs of the first type of original reference signal to a first prescribed value not equal to zero;

setting the other one of the real part Ps of the first type of original reference signal and the imaginary part Qs of the first type of original reference signal, the real part Rs of the first type of original reference signal and the imaginary part Us of the first type of original reference signal to zero;

setting one of the real part Rs of the second type of original reference signal and the imaginary part Us of the second type of original reference signal to a second prescribed value not equal to zero; and setting the other one of the real part Rs of the second type of original reference signal and the imaginary part Us of the second type of original reference signal, the real part Ps of the second type of original reference signal and the imaginary part Qs of the second type of original reference signal to zero.

4. The orthogonal frequency division multiplex signal transmitting method according to claim 1 in which the step of:

inserting the original reference signal comprises the steps of:
preparing a first type of original reference signal and a second type of original reference signal as the reference signal;
inserting a symbol number into one of the plurality of carrier waves for each of the symbols on the transmitting side while circularly changing a value of the symbol number for each of the symbol;
inserting the first type of original reference signal into one set of particular positive and negative carrier waves, of which first frequencies are symmetric to each other with respect to a central frequency of the central carrier wave, for each odd symbol in which an odd symbol number is inserted into one carrier wave as one symbol number to specify the one set of particular positive and negative carrier waves;
inserting the second type of original reference signal into one set of particular positive and negative carrier waves, of which second frequencies are symmetric to each other with respect to the central frequency of the central carrier wave, for each even symbol in which an even symbol number is inserted into one carrier wave as one symbol number to specify the one set of particular positive and negative carrier waves on condition that the second frequencies of the set of particular positive and negative carrier waves corresponding to one even symbol number Ns are the same as the first frequencies of the set of particular positive and negative carrier waves corresponding to one odd symbol number Ns−1 just preceding to the even symbol number Ns;
expressing real parts of the first type of original reference signal and the second type of original reference signal inserted into the particular positive carrier wave by Ps;
expressing imaginary parts of the first type of original reference signal and the second type of original reference signal inserted into the particular positive carrier wave by Qs;
expressing real parts of the first type of original reference signal and the second type of original reference signal inserted into the particular negative carrier wave by Rs;
expressing imaginary parts of the first type of original reference signal and the second type of original reference signal inserted into the particular negative carrier wave by Us;
setting the real part Ps of the first type of original reference signal to a first prescribed value not equal to zero;
setting the imaginary part Qs of the first type of original reference signal to a second prescribed value not equal to zero;
setting the real part Rs of the first type of original reference signal and the imaginary part Us of the first type of original reference signal to zero;
setting the real part Rs of the second type of original reference signal to a third prescribed value not equal to zero;
setting the imaginary part Us of the second type of original reference signal to a fourth prescribed value not equal to zero; and
setting the real part Ps of the second type of original reference signal and the imaginary part Qs of the second type of original reference signal to zero.

5. The orthogonal frequency division multiplex signal transmitting method according to claim 2 in which the step of inserting the original reference signal further comprises the steps of:

expressing real parts of the first type of original reference signal and the second type of original reference signal inserted into the particular positive carrier wave by Ps;
expressing imaginary parts of the first type of original reference signal and the second type of original reference signal inserted into the particular positive carrier wave by Qs;
expressing real parts of the first type of original reference signal and the second type of original reference signal inserted into the particular negative carrier wave by Rs;
expressing imaginary parts of the first type of original reference signal and the second type of original reference signal inserted into the particular negative carrier wave by Us;
setting the real part Ps of the first type of original reference signal to a first prescribed value not equal to zero;
setting the imaginary part Qs of the first type of original reference signal, the real part Rs of the first type of original reference signal and the imaginary part Us of the first type of original reference signal to zero;
setting the real part Rs of the second type of original reference signal to a second prescribed value not equal to zero; and
setting the imaginary part Us of the second type of original reference signal, the real part Ps of the second type of reference signal and the imaginary part Qs of the second type of original reference signal to zero,
the step of obtaining the reproduced reference signal further comprises the steps of:
expressing a real part of the first type of reproduced reference signal, which is demodulated from the first type of original reference signal inserted into the particular positive carrier wave, by P1s';
expressing an imaginary part of the first type of reproduced reference signal, which is demodulated from the first type of original reference signal inserted into the particular positive carrier wave, by Q1s';
expressing a real part of the first type of reproduced reference signal, which is demodulated from the first type of original reference signal inserted into the particular negative carrier wave, by R1s';
expressing an imaginary part of the first type of reproduced reference signal, which is demodulated from the first type of original reference signal inserted into the particular negative carrier wave, by U1s';
expressing a real part of the second type of reproduced reference signal, which is demodulated from the second type of original reference signal inserted into the particular positive carrier wave, by P2s';
expressing an imaginary part of the second type of reproduced reference signal, which is demodulated from the second type of original reference signal inserted into the particular positive carrier wave, by Q2s';
expressing a real part of the second type of reproduced reference signal, which is demodulated from the second type of original reference signal inserted into the particular negative carrier wave, by R2s'; and
expressing an imaginary part of the second type of reproduced reference signal, which is demodulated from the second type of original reference signal inserted into the particular negative carrier wave, by U2s', the step of calculating the eight coefficients S0 to S7 includes the steps of:
  determining the coefficients S0, S1, S4 and S5 according to a relationship $$\begin{pmatrix} S0 \\ S1 \\ S4 \\ S5 \end{pmatrix} = \begin{pmatrix} P'_{1S}/P_S \\ Q'_{1S}/P_S \\ R'_{1S}/P_S \\ U'_{1S}/P_S \end{pmatrix}$$

and
  determining the coefficients S2, S3, S6 and S7 according to a relationship $$\begin{pmatrix} S2 \\ S3 \\ S6 \\ S7 \end{pmatrix} = \begin{pmatrix} P'_{2S}/R_S \\ Q'_{2S}/R_S \\ R'_{2S}/R_S \\ U'_{2S}/R_S \end{pmatrix}.$$

6. The orthogonal frequency division multiplex signal transmitting method according to claim 2 in which the step of inserting the original reference signal further comprises the steps of:
  expressing real parts of the first type of original reference signal and the second type of original reference signal inserted into the particular positive carrier wave by Ps;
  expressing imaginary parts of the first type of original reference signal and the second type of original reference signal inserted into the particular positive carrier wave by Qs;
  expressing real parts of the first type of original reference signal and the second type of original reference signal inserted into the particular negative carrier wave by Rs;
  expressing imaginary parts of the first type of original reference signal and the second type of original reference signal inserted into the particular negative carrier wave by Us;
  setting the imaginary part Qs of the first type of original reference signal to a first prescribed value not equal to zero;
  setting the real part Ps of the first type of original reference signal, the real part Rs of the first type of original reference signal and the imaginary part Us of the first type of original reference signal to zero;
  setting the imaginary part Us of the second type of original reference signal to a second prescribed value not equal to zero; and
  setting the real part Rs of the second type of original reference signal, the real part Ps of the second type of original reference signal and the imaginary part Qs of the second type of original reference signal to zero,
the step of obtaining the reproduced reference signal further comprises the steps of:
  expressing a real part of the first type of reproduced reference signal, which is demodulated from the first type of original reference signal inserted into the particular positive carrier wave, by P1s';
  expressing an imaginary part of the first type of reproduced reference signal, which is demodulated from the first type of original reference signal inserted into the particular positive carrier wave, by Q1s';
  expressing a real part of the first type of reproduced reference signal, which is demodulated from the first type of original reference signal inserted into the particular negative carrier wave, by R1s';
  expressing an imaginary part of the first type of original reproduced reference signal, which is demodulated from the first type of reference signal inserted into the particular negative carrier wave, by U1s';
  expressing a real part of the second type of reproduced reference signal, which is demodulated from the second type of original reference signal inserted into the particular positive carrier wave, by P2s';
  expressing an imaginary part of the second type of reproduced reference signal, which is demodulated from the second type of original reference signal inserted into the particular positive carrier wave, by Q2s';
  expressing a real part of the second type of reproduced reference signal, which is demodulated from the second type of original reference signal inserted into the particular negative carrier wave, by R2s'; and
  expressing an imaginary part of the second type of reproduced reference signal, which is demodulated from the second type of original reference signal inserted into the particular negative carrier wave, by U2s',
the step of calculating the eight coefficients S0 to S7 includes the steps of: determining the coefficients S0, S1, S4 and S5 according to a relationship $$\begin{pmatrix} S0 \\ S1 \\ S4 \\ S5 \end{pmatrix} = \begin{pmatrix} P'_{1S}/Q_S \\ Q'_{1S}/Q_S \\ R'_{1S}/Q_S \\ -U'_{1S}/Q_S \end{pmatrix}$$

and
  determining the coefficients S2, S3, S6 and S7 according to a relationship $$\begin{pmatrix} S2 \\ S3 \\ S6 \\ S7 \end{pmatrix} = \begin{pmatrix} P'_{2S}/U_S \\ -Q'_{2S}/U_S \\ -R'_{2S}/U_S \\ U'_{2S}/U_S \end{pmatrix}.$$

7. The orthogonal frequency division multiplex signal transmitting method according to claim 2 in which the step of inserting the original reference signal further comprises the steps of:
  expressing real parts of the first type of original reference signal and the second type of original reference signal inserted into the particular positive carrier wave by Ps;
  expressing imaginary parts of the first type of original reference signal and the second type of original reference signal inserted into the particular positive carrier wave by Qs;
  expressing real parts of the first type of original reference signal and the second type of original reference signal inserted into the particular negative carrier wave by Rs;
  expressing imaginary parts of the first type of original reference signal and the second type of original reference signal inserted into the particular negative carrier wave by Us;
  setting the real part Ps of the first type of original reference signal to a first prescribed value not equal to zero;

setting the imaginary part Qs of the first type of original reference signal to a second prescribed value not equal to zero;

setting the real part Rs of the first type of original reference signal and the imaginary part Us of the first type of reference signal to zero;

setting the real part Rs of the second type of original reference signal to a third prescribed value not equal to zero;

setting the imaginary part Us of the second type of original reference signal to a fourth prescribed value not equal to zero; and setting the real part Ps of the second type of original reference signal and the imaginary part Qs of the second type of original reference signal to zero, the step of obtaining the reproduced reference signal further comprises the steps of:

expressing a real part of the first type of reproduced reference signal, which is demodulated from the first type of original reference signal inserted into the particular positive carrier wave, by P1s';

expressing an imaginary part of the first type of reproduced reference signal, which is demodulated from the first type of original reference signal inserted into the particular positive carrier wave, by Q1s';

expressing a real part of the first type of reproduced reference signal, which is demodulated from the first type of original reference signal inserted into the particular negative carrier wave, by R1s';

expressing an imaginary part of the first type of reproduced reference signal, which is demodulated from the first type of original reference signal inserted into the particular negative carrier wave, by U1s';

expressing a real part of the second type of reproduced reference signal, which is demodulated from the second type of original reference signal inserted into the particular positive carrier wave, by P2s';

expressing an imaginary part of the second type of reproduced reference signal, which is demodulated from the second type of original reference signal inserted into the particular positive carrier wave, by Q2s';

expressing a real part of the second type of reproduced reference signal, which is demodulated from the second type of original reference signal inserted into the particular negative carrier wave, by R2s'; and expressing an imaginary part of the second type of reproduced reference signal, which is demodulated from the second type of original reference signal inserted into the particular negative carrier wave, by U2s', the step of calculating the eight coefficients S0 to S7 includes the steps of:

determining the coefficients S0, S1, S4 and S5 according to a relationship $$\begin{pmatrix} S0 \\ S1 \\ S4 \\ S5 \end{pmatrix} = \begin{pmatrix} (P'_{1S} + Q_S Q'_{1S})/(P_S^2 + Q_S^2) \\ (P_S Q'_{1S} - Q_S P'_{1S})/(P_S^2 + Q'_S) \\ P_S R'_{1S} - Q_S U'_{1S})/P_S^2 + Q_S^2) \\ (Q_S R'_{1S} + P_S U'_{1S}/P_S^2 + Q_S^2) \end{pmatrix}$$

and determining the coefficients S2, S3, S6 and S7 according to a relationship $$\begin{pmatrix} S2 \\ S3 \\ S6 \\ S7 \end{pmatrix} = \begin{pmatrix} (R_S P'_{2S} - U_S Q'_{2S}/(R_S^2 + U_S^2) \\ (U_S P'_{2S} + R_S Q'_{2S})/(R_S^2 + U_S^2) \\ (R_S R'_{2S} + U_S U'_{2S})/(R_S^2 + U_S^2) \\ (R_S U'_{2S} - U_S R'_{2S})/R_S^2 + U_S^2) \end{pmatrix}$$

8. The orthogonal frequency division multiplex signal transmitting method according to claim 2 in which the step of inserting the original reference signal further comprises the steps of:

setting a real part of the first type of original reference signal inserted into the particular positive carrier wave, a real part of the first type of original reference signal inserted into the particular negative carrier wave, an imaginary part of the second type of original reference signal inserted into the particular positive carrier wave and an imaginary part of the second type of original reference signal inserted into the particular negative carrier wave to a first value X not equal to zero;

setting an imaginary part of the first type of original reference signal inserted into the particular positive carrier wave, an imaginary part of the first type of original reference signal inserted into the particular negative carrier wave, a real part of the second type of original reference signal inserted into the particular positive carrier wave and a real part of the second type of original reference signal inserted into the particular negative carrier wave to a second value Y not equal to zero;

the step of obtaining the reproduced reference signal further comprises the steps of:

expressing a real part of the first type of reproduced reference signal, which is demodulated from the first type of original reference signal inserted into the particular positive carrier wave, by P1';

expressing an imaginary part of the first type of reproduced reference signal, which is demodulated from the first type of original reference signal inserted into the particular positive carrier wave, by Q1';

expressing a real part of the first type of reproduced reference signal, which is demodulated from the first type of original reference signal inserted into the particular negative carrier wave, by R1';

expressing an imaginary part of the first type of reproduced reference signal, which is demodulated from the first type of original reference signal inserted into the particular negative carrier wave, by U1';

expressing a real part of the second type of reproduced reference signal, which is demodulated from the second type of original reference signal inserted into the particular positive carrier wave, by P2';

expressing an imaginary part of the second type of reproduced reference signal, which is demodulated from the second type of original reference signal inserted into the particular positive carrier wave, by Q2';

expressing a real part of the second type of reproduced reference signal, which is demodulated from the second type of original reference signal inserted into the particular negative carrier wave, by R2'; and expressing an imaginary part of the second type of reproduced reference signal, which is demodulated from the second type of original reference signal inserted into the particular negative carrier wave, by U2', the step of calculating the eight coefficients S0 to S7 includes the steps of:

determining the coefficients S0 to S7 according to a relationship $S0=(P1'*X-P2'*Y-Q1'*Y+Q2'*X)/(2X^2-2Y^2)$
$S1=(P1'*Y-P2'*X+Q1'*X-Q2'*Y)/(2X^2-2Y^2)$
$S2=(P1'*X-P2'*Y+Q1'*Y-Q2'*X)/(2X^2-2Y^2)$
$S3=-(P1'*Y-P2'*X-Q1'*X+Q2'*Y)/(2X^2-2Y^2)$
$S4=(R1'*X-R2'*Y+U1'*Y-U2'*X)/(2X^2-2Y^2)$
$S5=-(R1'*Y-R2'*X-U1'*X+U2'*Y)/(2X^2-2Y^2)$
$S6=(R1'*X-R2'*Y-U1'*Y+U2'*X)/(2X^2-2Y^2)$
$S7=(R1'*Y-R2'*X+U1'*X-U2'*Y)/(2X^2-2Y^2)$.

9. The orthogonal frequency division multiplex signal transmitting method according to claim 1, further comprising the steps of:

inserting a symbol number into one of the plurality of carrier waves for each of the symbols on the transmitting side while circularly changing a value of the symbol number for each of the symbols;

demodulating one modulated carrier wave, in which the symbol number is inserted, on the receiving side for each of the symbols to obtain a demodulated symbol number; and specifying one set of particular positive and negative modulated carrier waves, in which the original reference signal is inserted, according to the demodulated symbol number for each of the symbols.

10. An orthogonal frequency division multiplex signal transmitting apparatus, comprising:

arithmetical calculation performing means for performing an inverse discrete Fourier transformation for real and imaginary parts of a plurality of digital information signals for each of symbols to produce a plurality of sets of in-phase digital signals and quadrature digital signals;

digital-to-analog converting means for converting the sets of in-phase digital signals and quadrature digital signals produced by the arithmetical calculation performing means to a plurality of sets of in-phase analog signals and quadrature analog signals;

quadrature amplitude modulation performing means for performing a quadrature amplitude modulation for the plurality of sets of in-phase analog signals and quadrature analog signals obtained in the digital-to-analog converting means to modulate a plurality of carrier waves having frequencies different from each other with the plurality of sets of in-phase analog signals and quadrature analog signals and produce an orthogonal frequency division multiplex signal composed of a plurality of modulated carrier waves having different frequencies for each of the symbols, the plurality of modulated carrier waves being classified into a central carrier wave, a plurality of positive carrier waves of which frequencies are higher than a central frequency of the central carrier wave and a plurality of negative carrier waves of which frequencies are lower than the central frequency of the central carrier wave;

symbol number generating and inserting means for generating a symbol number for each of the symbols while circularly changing a value of the symbol number and inserting each of the symbol numbers into one of the plurality of modulated carrier waves obtained in the quadrature amplitude modulation performing means for each of the symbols;

reference signal generating and inserting means for generating a reference signal known on a receiving side and inserting the reference signal into a set of a particular positive carrier wave and a particular negative carrier wave, of which frequencies are symmetric to each other with respect to the central frequency of the central carrier wave, selected from the plurality of positive and negative carrier waves for each of the symbols while changing the selection of the set of particular positive and negative carrier waves every prescribed time on condition that the reference signal is inserted into all positive and negative carrier waves every prescribed symbols and the set of particular positive and negative carrier waves in each symbol are specified by the symbol number; and transmitting means for transmitting the orthogonal frequency division multiplex signal, in which the symbol number generated by the symbol number generating and inserting means is inserted into one of the plurality of modulated carrier waves and the reference signal generated by the reference signal generating and inserting means is inserted into one set of particular positive and negative carrier waves, to a transmission path for each of the symbols.

11. The orthogonal frequency division multiplex signal transmitting apparatus according to claim 10 in which the reference signal generated by the reference signal generating and inserting means is a first type of reference signal and a second type of reference signal, the first type of reference signal is inserted into one first set of particular positive and negative carrier waves for each odd symbol in which an odd symbol number is inserted into one carrier wave, the second type of reference signal is inserted into one second set of particular positive and negative carrier waves for each even symbol in which an even symbol number is inserted into one carrier wave on condition that the frequencies of the second set of particular positive and negative carrier waves corresponding to one even symbol number Ns are the same as those of the first set of particular positive and negative carrier waves corresponding to one odd symbol number Ns-1 just preceding to the even symbol number Ns, a real part or an imaginary part of the first type of reference signal inserted into the particular positive carrier wave is set to a first prescribed value not equal to zero, the other real or imaginary part of the first type of reference signal inserted into the particular positive carrier wave and real and imaginary parts of the first type of reference signal inserted into the particular negative carrier wave are set to zero, a real part or an imaginary part of the second type of reference signal inserted into the particular negative carrier wave is set to a second prescribed value not equal to zero, and the other real or imaginary part of the second type of reference signal inserted into the particular negative carrier wave and real and imaginary parts of the second type of reference signal inserted into the particular positive carrier wave are set to zero.

12. The orthogonal frequency division multiplex signal transmitting apparatus according to claim 10 in which the reference signal generated by the reference signal generating and inserting means is a first type of reference signal and a second type of reference signal, the first type of reference signal is inserted into one first set of particular positive and negative carrier waves for each odd symbol in which an odd symbol number is inserted into one carrier wave, the second type of reference signal is inserted into one second set of particular positive and negative carrier waves for each even symbol in which an even symbol number is inserted into one carrier wave on condition that the frequencies of the second set of particular positive and negative carrier waves corresponding to one even symbol number Ns are the same as those of the first set of particular positive and negative carrier waves corresponding to one odd symbol number Ns−1 just preceding to the even symbol number Ns, real and imaginary parts of the first type of reference signal inserted into the particular positive carrier wave are set to first prescribed values not equal to zero, real and imaginary parts of the first type of reference signal inserted into the particular negative carrier wave are set to zero, real and imaginary parts of the second type of reference signal inserted into the particular negative carrier wave are set to second prescribed values not equal to zero, and real and imaginary parts of the second type of reference signal inserted into the particular positive carrier wave are set to zero.

13. The orthogonal frequency division multiplex signal transmitting apparatus according to claim 10 in which the reference signal generated by the reference signal generating and inserting means is a first type of reference signal and a second type of reference signal, the first type of reference signal is inserted into one first set of particular positive and negative carrier waves for each odd symbol in which an odd symbol number is inserted into one carrier wave, the second type of reference signal is inserted into one second set of particular positive and negative carrier waves for each even symbol in which an even symbol number is inserted into one carrier wave on condition that the frequencies of the second set of particular positive and negative carrier waves corresponding to one even symbol number Ns are the same as those of the first set of particular positive and negative carrier waves corresponding to one odd symbol number Ns−1 just preceding to the even symbol number Ns, a real part of the first type of reference signal inserted into the particular positive carrier wave, a real part of the first type of reference signal inserted into the particular negative carrier wave, an imaginary part of the second type of reference signal inserted into the particular positive carrier wave and an imaginary part of the second type of reference signal inserted into the particular negative carrier wave are set to a first prescribed value not equal to zero, and an imaginary part of the first type of reference signal inserted into the particular positive carrier wave, an imaginary part of the first type of reference signal inserted I into the particular negative carrier wave, a real part of the second type of reference signal inserted into the particular positive carrier wave and a real part of the second type of reference signal inserted into the particular negative carrier wave are set to a second prescribed value not equal to zero.

14. An orthogonal frequency division multiplex signal receiving apparatus, comprising:

receiving means for receiving an orthogonal frequency division multiplex signal composed of a plurality of modulated carrier waves having frequencies different from each other from a transmission path for each of symbols, the plurality of modulated carrier waves being modulated by a plurality of sets of in-phase and quadrature signals indicating a plurality of digital information signals, the plurality of modulated carrier waves being classified into a central carrier wave, a plurality of positive carrier waves of which frequencies are higher than a central frequency of the central carrier wave and a plurality of negative carrier waves of which frequencies are lower than the central frequency of the central carrier wave, an original reference signal being inserted into a set of a particular positive carrier wave and a particular negative carrier wave, of which frequencies are symmetric to each other with respect to the central frequency of the central carrier wave, selected from the plurality of positive and negative carrier waves for each of the symbols while changing the selection of the set of particular positive and negative carrier waves every prescribed time, and the set of particular positive and negative carrier waves in each symbol being specified by a symbol number of which a value is circularly changed for each of the symbols and is inserted into one of the plurality of modulated carrier waves for each of the symbols;

quadrature demodulating means for performing a quadrature demodulation for the orthogonal frequency division multiplex signal received by the receiving means for each of the symbols to obtain a plurality of sets of demodulated in-phase and quadrature signals, a demodulated reference signal and a demodulated symbol number;

reproducing means for performing a discrete Fourier transformation for the plurality of sets of demodulated inphase and quadrature signals, the demodulated reference signal and the demodulated symbol number for each of the symbols and obtaining real parts and imaginary parts of a plurality of reproduced digital information signals deformed in the transmission path, a reproduced reference signal deformed in the transmission path and the symbol number for each of the symbols;

detecting means for specifying one set of particular positive and negative carrier waves according to the symbol number obtained in the reproducing means for each of the symbols and detecting a characteristic of the transmission path corresponding to the set of particular positive and negative carrier waves from the reproduced reference signal obtained in the reproducing means for each of the symbols;

correcting equation deriving means for deriving a correcting equation corresponding to one set of particular positive and negative carrier waves from the characteristic of the transmission path detected by the detecting means for each of the symbols; and correcting means for correcting the real and imaginary parts of the reproduced digital information signals obtained in the reproducing means according to the correcting equation for each of the symbols and obtaining real and imaginary parts of a plurality of corrected digital information signals in which the deformation of the plurality of reproduced digital information signals received in the transmission path is corrected.

15. The orthogonal frequency division multiplex signal receiving apparatus according to claim 14 in which the demodulated reference signal obtained in the quadrature demodulating means is classified into a first type of demodulated reference signal obtained by demodulating a first type of original reference signal inserted as the original reference signal into one first set of particular positive and negative carrier waves for each odd symbol in which an odd symbol number is inserted into one carrier wave and a second type of original reference signal inserted as the original reference signal into one second set of particular positive and negative carrier waves for each even symbol in which an even symbol number is inserted into one carrier wave on condition that the frequencies of the second set of particular positive and negative carrier waves corresponding to one even symbol number Ns are the same as those of the first set of particular positive and negative carrier waves corresponding to one odd symbol number Ns−1 just preceding to the even symbol number Ns, the reproduced reference signal obtained in the reproducing means is classified into a first type of reproduced reference signal obtained by reproducing the first type of demodulated reference signal and a second type of reproduced reference signal obtained by reproducing the second type of demodulated reference signal, the characteristic of the transmission path detected by the detecting means is indicated by eight coefficients S0 to S7 satisfying a relationship $$\begin{pmatrix} A' \\ B' \\ C' \\ D' \end{pmatrix} = \begin{pmatrix} S0, & -S1, & S2, & S3 \\ S1, & S0, & S3, & -S2 \\ S4, & S5, & S6, & -S2 \\ S4, & S5, & S6, & -S7 \\ S5, & -S4, & S7 1 S6 \end{pmatrix} \begin{pmatrix} A \\ B \\ C \\ D \end{pmatrix}$$

in which a real part of each of the plurality of digital information signals carried by the positive carrier waves is expressed by A, an imaginary part of each of the plurality of digital information signals carried by the positive carrier waves is expressed by B, a real part of each of the plurality of digital information signals carried by the negative carrier waves is expressed by C, an imaginary part of each of the plurality of digital information signals carried by the negative carrier waves is expressed by D, a real part of each of the plurality of reproduced digital information signals which are obtained in the reproducing means from the plurality of digital information signals carried by the positive carrier waves is expressed by A', an imaginary part of each of the plurality of reproduced digital information signals which are obtained in the reproducing means from the plurality of digital information signals carried by the positive carrier waves is expressed by B', a real part of each of the plurality of reproduced digital information signals which are obtained in the reproducing means from the plurality of digital information signals carried by the negative carrier waves is expressed by C' and an imaginary part of each of the plurality of reproduced digital information signals which are obtained in the reproducing means from the plurality of digital information signals carried by the negative carrier waves is expressed by D', according to the first type of reference signal, the second type of reference signal, the first type of reproduced reference signal and the second type of reproduced reference signal for each of the symbols, the correcting equation derived by the correcting equation deriving means is expressed by a value $$\frac{1}{\det A} \begin{pmatrix} H0, & H1, & H2, & H3 \\ -H1, & H0, & H3, & -H2 \\ H4, & H5, & H6, & H7 \\ H5, & -H4, & -H7, & H6 \end{pmatrix}$$

in which
H0=+S0(S6S6+S7S7)−S2(S4S6+S5S7)+S3(S4S7−S5S6),
H1=+S1(S6S6+S7S7)−S3(S4S6+S5S7)−S2(S4S7−S5S6),
H2=+S4(S2S2+S3S3)−S6(S0S2+S1S3)+S7(S0S3−S1S2),
H3=+S5(S2S2+S3S3)−S7(S0S2+S1S3)−S6(S0S3−S1S2),
H4=+S2(S4S4+S5S5)−S0(S4S6+S5S7)−S1(S4S7−S5S6),
H5=+S3(S4S4+S5S5)−S1(S4S6+S5S7)+S0(S4S7−S5S6),
H6=+S6(S0S0+S1S1)−S4(S0S2+S1S3)−S5(S0S3−S1S2),
H7=+S7(S0S0+S1S1)−S5(S0S2+S1S3)+S4(S0S3−S1S2)
and detA=S0*H0+S1*H1+S4*H2+S5*H3 are satisfied, as one correcting equation for each of the symbols, and the plurality of corrected digital information signals obtained by the correcting means is calculated according to a relationship $$\begin{pmatrix} \langle A \rangle \\ \langle B \rangle \\ \langle C \rangle \\ \langle D \rangle \end{pmatrix} = \frac{1}{\det A} \begin{pmatrix} H0, & H1, & H2, & H3 \\ -H1, & H0, & H3, & -H2 \\ H4, & H5, & H6, & H7 \\ H5, & -H4, & -H7, & H6 \end{pmatrix} \begin{pmatrix} A' \\ B' \\ C' \\ D' \end{pmatrix}$$

in which a real part of each of the plurality of corrected information signals corresponding to the positive carrier waves is expressed by <A>, an imaginary part of each of the plurality of corrected information signals corresponding to the positive carrier waves is expressed by <B>, a real part of each of the plurality of corrected information signals corresponding to the negative carrier waves is expressed by <C> and an imaginary part of each of the plurality of corrected information signals corresponding to the negative carrier waves is expressed by <D>.

16. The orthogonal frequency division multiplex signal receiving apparatus according to claim 15 in which the eight coefficients S0 to S7 are determined according to a relationship $$\begin{pmatrix} S0 \\ S1 \\ S4 \\ S5 \end{pmatrix} = \begin{pmatrix} P'_{1S}/P_S \\ Q'_{1S}/P_S \\ R'_{1S}/P_S \\ U'_{1S}/P_S \end{pmatrix}$$

and another relationship $$\begin{pmatrix} S2 \\ S3 \\ S6 \\ S7 \end{pmatrix} = \begin{pmatrix} P'_{2S}/R_S \\ Q'_{2S}/R_S \\ R'_{2S}/R_S \\ U'_{2S}/R_S \end{pmatrix}$$

in which a real part of the first type of reproduced reference signal corresponding to the first type of original reference signal inserted into the particular positive carrier wave is expressed by P1s', an imaginary part of the first type of reproduced reference signal corresponding to the first type of original reference signal inserted into the particular positive carrier wave is expressed by Q1s', a real part of the first type of reproduced reference signal corresponding to the first type of original reference signal inserted into the particular negative carrier wave is expressed by R1s', an imaginary part of the first type of reproduced reference signal corresponding to the first type of original reference signal inserted into the particular negative carrier wave is expressed by U1s', a real part of the second type of reproduced reference signal corresponding to the second type of original reference signal inserted into the particular positive carrier wave is expressed by P2s', an imaginary part of the second type of reproduced reference signal corresponding to the second type of original reference signal inserted into the particular positive carrier wave is expressed by Q2s', a real part of the second type of reproduced reference signal corresponding to the second type of original reference signal inserted into the particular negative carrier wave is expressed by R2s' and an imaginary part of the second type of reproduced reference signal corresponding to the second type of original reference signal inserted into the particular negative carrier wave is expressed by U2s', in cases where a real part of the first type of original reference signal inserted into the particular positive carrier wave is set to a first prescribed value Ps not equal to zero, an imaginary part of the first type of original reference signal inserted into the particular positive carrier wave, real and imaginary parts of the first type of original reference signal inserted into the particular negative carrier wave are set to zero, a real part of the second type of original reference signal inserted into the particular negative carrier wave is set to a second prescribed value Rs not equal to zero and an imaginary part of the second type of original reference signal inserted into the particular negative carrier wave, real and imaginary parts of the second type of original reference signal inserted into the particular positive carrier wave are set to zero.

17. The orthogonal frequency division multiplex signal receiving apparatus according to claim 15 in which the eight coefficients S0 to S7 are determined according to a relationship $$\begin{pmatrix} S0 \\ S1 \\ S4 \\ S5 \end{pmatrix} = \begin{pmatrix} -P'_{1S}/Q_S \\ Q'_{1S}/Q_S \\ R'_{1S}/Q_S \\ -U'_{1S}/Q_S \end{pmatrix}$$

and another relationship $$\begin{pmatrix} S2 \\ S3 \\ S6 \\ S7 \end{pmatrix} = \begin{pmatrix} P'_{2S}/U_S \\ -Q'_{2S}/U_S \\ -R'_{2S}/U_S \\ U'_{2S}/U_S \end{pmatrix}$$

in which a real part of the first type of reproduced reference signal corresponding to the first type of original reference signal inserted into the particular positive carrier wave is expressed by P1s', an imaginary part of the first type of reproduced reference signal corresponding to the first type of original reference signal inserted into the particular positive carrier wave is expressed by Q1s', a real part of the first type of reproduced reference signal corresponding to the first type of original reference signal inserted into the particular negative carrier wave is expressed by R1s', an imaginary part of the first type of reproduced reference signal corresponding to the first type of original reference signal inserted into the particular negative carrier wave is expressed by U1s', a real part of the second type of reproduced reference signal corresponding to the second type of original reference signal inserted into the particular positive carrier wave is expressed by P2s', an imaginary part of the second type of reproduced reference signal corresponding to the second type of original reference signal inserted into the particular positive carrier wave is expressed by Q2s', a real part of the second type of reproduced reference signal corresponding to the second type of original reference signal inserted into the particular negative carrier wave is expressed by R2s' and an imaginary part of the second type of reproduced reference signal corresponding to the second type of original reference signal inserted into the particular negative carrier wave is expressed by U2s', in cases where an imaginary part of the first type of original reference signal inserted into the particular positive carrier wave is set to a first prescribed value Qs not equal to zero, a real part of the first type of original reference signal inserted into the particular positive carrier wave, real and imaginary parts of the first type of original reference signal inserted into the particular negative carrier wave are set to zero, an imaginary part of the second type of original reference signal inserted into the particular negative carrier wave is set to a second prescribed value Us not equal to zero and a real part of the second type of original reference signal inserted into the particular negative carrier wave, real and imaginary parts of the second type of original reference signal inserted into the particular positive carrier wave are set to zero.

18. The orthogonal frequency division multiplex signal receiving apparatus according to claim 15 in which the eight coefficients S0 to S7 are determined according to a relationship $$\begin{pmatrix} S0 \\ S1 \\ S4 \\ S5 \end{pmatrix} = \begin{pmatrix} (P_S P'_{1S} + Q_S Q'_{1S})/(P_S^2 + Q_S^2) \\ (P_S Q'_{1S} - Q_S P'_{1S})/(P_S^2 + Q_S^2) \\ P_S R'_{1S} - Q_S U'_{1S}/P_S^2 + Q_S^2) \\ (Q_S R'_{1S} + P_S U'_{1S}/P_S^2 + Q_S^2) \end{pmatrix}$$

and another relationship $$\begin{pmatrix} S2 \\ S3 \\ S6 \\ S7 \end{pmatrix} = \begin{pmatrix} (R_S P'_{2S} - U_S Q'_{2S}/(R_S^2 + U_S^2) \\ (U_S P'_{2S} + R_S Q'_{2S})/(R_S^2 + U_S^2) \\ (R_S R'_{2S} + U_S U'_{2S})/(R_S^2 + U_S^2) \\ (R_S U'_{2S} - U_S R'_{2S})/(R_S^2 + U_S^2) \end{pmatrix}$$

in which a real part of the first type of reproduced reference signal corresponding to the first type of original reference signal inserted into the particular positive carrier wave is expressed by P1s', an imaginary part of the first type of reproduced reference signal corresponding to the first type of original reference signal inserted into the particular positive carrier wave is expressed by Q1s', a real part of the first type of reproduced reference signal corresponding to the first type of original reference signal inserted into the particular negative carrier wave is expressed by R1s', an imaginary part of the first type of reproduced reference signal corresponding to the first type of original reference signal inserted into the particular negative carrier wave is expressed by U1s', a real part of the second type of reproduced reference signal corresponding to the second type of original reference signal inserted into the particular positive carrier wave is expressed by P2s', an imaginary part of the second type of reproduced reference signal corresponding to the second type of original reference signal inserted into the particular positive carrier wave is expressed by Q2s', a real part of the second type of reproduced reference signal corresponding to the second type of original reference signal inserted into the particular negative carrier wave is expressed by R2s' and an imaginary part of the second type of reproduced reference signal corresponding to the second type of original reference signal inserted into the particular negative carrier wave is expressed by U2s', in cases where a real part of the first type of original reference signal inserted into the particular positive carrier wave is set to a first prescribed value Ps not equal to zero, an imaginary part of the first type of original reference signal inserted into the particular positive carrier wave is set to a second prescribed value Qs not equal to zero, real and imaginary parts of the first type of original reference signal inserted into the particular negative carrier wave are set to zero, a real part of the second type of original reference signal inserted into the particular negative carrier wave is set to a third prescribed value Rs not equal to zero, an imaginary part of the second type of original reference signal inserted into the particular negative carrier wave is set to a fourth prescribed value Us not equal to zero and real and imaginary parts of the second type of original reference signal inserted into the particular positive carrier wave are set to zero.

19. The orthogonal frequency division multiplex signal receiving apparatus according to claim 15 in which the eight coefficients S0 to S7 are determined according to a relationship $S0=(P1'*X-P2'*Y-Q1'*Y+Q2'*X)/(2X^2-2Y^2)$
$S1=(P1'*Y-P2'*X+Q1'*X-Q2'*Y)/(2X^2-2Y^2)$
$S2=(P1'*X-P2'*Y+Q1'*Y-Q2'*X)/(2X^2-2Y^2)$
$S3=-(P1'*Y-P2'*X-Q1'*X+Q2'*Y)/(2X^2-2Y^2)$
$S4=(R1'*X-R2'*Y+U1'*Y-U2'*X)/(2X^2-2Y^2)$
$S5=-(R1'*Y-R2'*X-U1'*X+U2'*Y)/(2X^2-2Y^2)$
$S6=(R1'*X-R2'*Y-U1'*Y+U2'*X)/(2X^2-2Y^2)$
$S7=(R1'*Y-R2'*X+U1'*X-U2'*Y)/(2X^2-2Y^2)$ in which a real part of the first type of reproduced reference signal corresponding to the first type of original reference signal inserted into the particular positive carrier wave is expressed by P1s', an imaginary part of the first type of reproduced reference signal corresponding to the first type of original reference signal inserted into the particular positive carrier wave is expressed by Q1s', a real part of the first type of reproduced reference signal corresponding to the first type of original reference signal inserted into the particular negative carrier wave is expressed by R1s', an imaginary part of the first type of reproduced reference signal corresponding to the first type of original reference signal inserted into the particular negative carrier wave is expressed by U1s', a real part of the second type of reproduced reference signal corresponding to the second type of original reference signal inserted into the particular positive carrier wave is expressed by P2s', an imaginary part of the second type of reproduced reference signal corresponding to the second type of original reference signal inserted into the particular positive carrier wave is expressed by Q2s', a real part of the second type of reproduced reference signal corresponding to the second type of original reference signal inserted into the particular negative carrier wave is expressed by R2s' and an imaginary part of the second type of reproduced reference signal corresponding to the second type of original reference signal inserted into the particular negative carrier wave is expressed by U2s', in cases where a real part of the first type of reference signal inserted into the particular positive carrier wave, a real part of the first type of original reference signal inserted into the particular negative carrier wave, an imaginary part of the second type of original reference signal inserted into the particular positive carrier wave and an imaginary part of the second type of original reference signal inserted into the particular negative carrier wave are set to a first prescribed value X not equal to zero and an imaginary part of the first type of original reference signal inserted into the particular positive carrier wave and an imaginary part of the first type of original reference signal inserted into the particular negative carrier wave, a real part of the second type of original reference signal inserted into the particular positive carrier wave and a real part of the second type of original reference signal inserted into the particular negative carrier wave are set to a second prescribed value Y not equal to zero.

20. An orthogonal frequency division multiplex signal transmitting method, comprising the steps of:

preparing a plurality of carrier waves having frequencies different from each other;

classifying the plurality of carrier waves into a central carrier wave, a plurality of positive carrier waves having frequencies higher than that of the central carrier wave and a plurality of negative carrier waves having frequencies lower than that of the central carrier wave;

calculating a set of an in-phase signal and a quadrature signal from each of a plurality of information signals on a transmitting side for each of symbols;

modulating each of the plurality of positive carrier waves and each of the plurality of negative carrier waves with one of the plurality of information signals on a transmitting side for each of symbols;

inserting an original reference signal known on a receiving side into a set of a particular positive carrier wave and a particular negative carrier wave, of which frequencies are symmetric to each other with respect to a central frequency of the central carrier wave, selected from the plurality of positive and negative carrier waves for each of the symbols on the transmitting side while changing the selection of the set of particular positive and negative carrier waves every prescribed time on condition that the original reference signal is inserted into all positive and negative carrier waves every prescribed symbols;

producing an orthogonal frequency division multiplex signal composed of the central carrier wave and a plurality of modulated positive and negative carrier waves, by which the plurality of information signals and the original reference signal are carried, for each of the symbols;

transmitting the orthogonal frequency division multiplex signal from the transmitting side to a transmission path for each of the symbols;

receiving the orthogonal frequency division multiplex signal transmitted from the transmission path on the receiving side for each of the symbols;

demodulating the plurality of modulated positive and negative carrier waves of the orthogonal frequency division multiplex signal received on the receiving side to obtain a plurality of demodulated information signals and a demodulated reference signal on the receiving side for each of the symbols;

obtaining a plurality of reproduced information signals and a reproduced reference signal from the plurality of demodulated information signals and the demodulated reference signal for each of the symbols;

detecting a characteristic of the transmission path for a set of particular reproduced information signals carried by the set of particular positive and negative carrier waves on the receiving side for each of the symbols by comparing the reproduced reference signal with the original reference signal known on the receiving side;

calculating a first correcting equation for the set of particular reproduced information signals from the characteristic of the transmission path for each of the symbols;

correcting the set of particular reproduced information signals according to the first correcting equation to obtain a set of first corrected information signals for each of the symbols;

preparing a signal arrangement in which a plurality of signal positions allowed for the plurality of information signals are arranged;

initially setting a second correcting equation for a first symbol;

correcting the set of first corrected information signals corresponding to the first symbol according to the second correcting equation to obtain a set of second corrected information signals for the first symbol;

detecting a high speed changing characteristic of the transmission path for the set of second corrected information signals according to a difference between a particular signal position selected from the signal arrangement for the set of second corrected information signals and a signal position of the set of second corrected information signals;

calculating a second correcting equation for a second symbol succeeding to the first symbol from the high speed changing characteristic of the transmission path and the set of second corrected information signals for the first symbol to correct a set of first corrected information signals corresponding to the second symbol to a set of second corrected information signals according to the second correcting equation of the second symbol;

repeating the correction of the set of first correcting information signals according to the second correcting equation to obtain the second corrected information signals corresponding to all of the information signals; and outputting the second corrected information signals for each of the symbols.

21. The orthogonal frequency division multiplex signal transmitting method according to claim 20, further comprising the steps of:

inserting a symbol number, a piece of particular parameter information or a piece of synchronizing symbol information into one of the plurality of modulated carrier waves on the transmitting side for each of the symbols while circularly changing a value of the symbol number for each of the symbols;

demodulating one modulated carrier wave, in which the symbol number, the particular parameter information or the synchronizing symbol information is inserted, on the receiving side for each of the symbols to obtain the symbol number, the particular parameter information or the synchronizing symbol information; and specifying a set of particular positive and negative modulated carrier waves, in which the original reference signal is inserted, according to the symbol number, the particular parameter information or the synchronizing symbol information.

22. The orthogonal frequency division multiplex signal transmitting method according to claim 20, further comprising the steps of arranging coefficients of the first correcting equation and/or the second correcting equation in a frequency order; and filter-processing the coefficients in a low pass filter on a frequency-axis.

23. The orthogonal frequency division multiplex signal transmitting method according to claim 20 in which the step of correcting the set of first corrected information signals includes the step of repeating the correction of the set of first corrected information signals during a prescribed number of symbols to obtain a plurality of sets of second corrected information signals for the prescribed number of symbols, and the step of detecting a high speed changing characteristic of the transmission path comprises the steps of calculating a difference between a particular signal position selected from the signal arrangement table and a signal position for each of the plurality of sets of second corrected information signals;

calculating an average difference of the plurality of differences; and detecting a high speed changing characteristic of the transmission path for the set of second corrected information signals according to the average difference.

24. The orthogonal frequency division multiplex signal transmitting method according to claim 20 in which the step of correcting the set of first corrected information signals includes the step of repeating the correction of the set of first corrected information signals during a prescribed number of symbols to obtain a plurality of sets of second corrected information signals for the prescribed number of symbols, the step of detecting a high speed changing characteristic of the transmission path comprises the steps of calculating a difference between a particular signal position selected from the signal arrangement table and a signal position for each of the plurality of sets of second corrected information signals;

detecting a high speed changing characteristic of the transmission path for each of the sets of second corrected information signals according to one corresponding difference; and obtaining an average high speed changing characteristic of the transmission path from the plurality of high speed changing characteristics, and the step of calculating an updated second correcting equation includes the step of calculating an updated second correcting equation used for a plurality of next symbols from the average high speed changing characteristic of the transmission path.

25. The orthogonal frequency division multiplex signal transmitting method according to claim 20 in which the step of detecting a high speed changing characteristic of the transmission path includes determining a pair of particular information signals modulating the set of particular positive and negative carrier waves on the transmitting side according to the high speed changing characteristic of the transmission path and the pair of second corrected information signals, and the step of calculating an updated second correcting equation includes expressing the pair of first corrected information signals corrected according to the first correcting equation by a pair of complex numbers (a"+jb") and (c"+jd");

expressing the pair of particular information signals by a pair of complex numbers (a+jb) and (c+jd);

generating the updated second correcting equation expressed by a matrix $$K = \begin{pmatrix} K0, & K1, & 0, & 0 \\ -K1, & K0, & 0, & 0 \\ 0, & 0, & K6, & K7 \\ 0, & 0, & -KY, & K6 \end{pmatrix}$$

in which $K0=(a*a''+b*b'')/(a''^2+b''^2)$, $K1=(a*b''-a''*b)/(a''^2+b''^2)$, $K6=(c*c''+d*d'')/(c''^2+d''^2)$ and $K7=(c*d''-c''*d)/(c''^2+d''^2)$ are satisfied; and correcting one set of first corrected information signals corresponding to the next symbol to one set of second corrected information signals according to a relationship $$\begin{pmatrix} \langle a \rangle \\ \langle b \rangle \\ \langle c \rangle \\ \langle d \rangle \end{pmatrix} = \begin{pmatrix} K0, & K1, & 0, & 0 \\ -K1, & K0, & 0, & 0 \\ 0, & 0, & K6, & K7 \\ 0, & , & -K7, & K6 \end{pmatrix} \begin{pmatrix} a'' \\ b'' \\ c'' \\ d'' \end{pmatrix}$$

in which the pair of second corrected information signals corrected according to the first correcting equation are expressed by a pair of complex numbers ($\langle a \rangle + j\langle b \rangle$) and ($\langle c \rangle + j\langle d \rangle$).

26. The orthogonal frequency division multiplex signal transmitting method according to claim 20 in which the step of inserting the original reference signal comprises the steps of preparing a first type of original reference signal and a second type of original reference signal as the original reference signal;

alternately inserting the first type of original reference signal and the second type of original reference signal into a set of a particular positive carrier wave and a particular negative carrier wave, of which frequencies are symmetric to each other with respect to a central frequency of the central carrier wave, selected from the plurality of positive and negative carrier waves for each of the symbols on the transmitting side while changing the selection of the set of particular positive and negative carrier waves every prescribed time on condition that the first or second type of original reference signal is inserted into all positive and negative carrier waves every prescribed symbols, the step of obtaining a plurality of reproduced information signals includes the step of:

alternately obtaining a first type of reproduced reference signal and a second type of reproduced reference signal from a first type of demodulated reference signal and a second type of demodulated reference signal obtained by demodulating the set of particular positive and negative carrier waves, and the step of detecting a characteristic of the transmission path comprises the steps of:

comparing the first type of reproduced reference signal or the second type of reproduced reference signal with the first type of original reference signal or the second type of original reference signal known on the receiving side;

obtaining a transmission characteristic transmitting or leaking from each of a real part of the first type of original reference signal or the second type of original reference signal carried by the particular negative carrier wave, an imaginary part of the first type of original reference signal or the second type of original reference signal carried by the particular negative carrier wave, a real part of the first type of original reference signal or the second type of original reference signal carried by the particular negative carrier wave and an imaginary part of the first type of original reference signal or the second type of original reference signal carried by the particular negative carrier wave to each of a real part of the first type of reproduced reference signal or the second type of reproduced reference signal carried by the particular positive carrier wave demodulated, an imaginary part of the first type of reproduced reference signal or the second type of reproduced reference signal carried by the particular positive carrier wave demodulated, a real part of the first type of reproduced reference signal or the second type of reproduced reference signal carried by the particular negative carrier wave demodulated and an imaginary part of the first type of reproduced reference signal or the second type of reproduced reference signal carried by the particular negative carrier wave demodulated; and detecting the characteristic of the transmission path for the set of particular reproduced information signals according to the transmission characteristic for each of the symbols.

27. An orthogonal frequency division multiplex signal transmitting method, comprising the steps of:

preparing a plurality of carrier waves having frequencies different from each other;

calculating a set of an in-phase signal and a quadrature signal from each of a plurality of information signals on a transmitting side for each of symbols;

inserting an original reference signal known on a receiving side into a particular carrier wave selected from the plurality of carrier waves for each of the symbols on the transmitting side while changing the selection of the particular carrier wave every prescribed time on condition that the original reference signal is inserted into all carrier waves every prescribed symbols;

modulating each of the plurality of carrier waves with one of the plurality of sets of in-phase and quadrature signals calculated from the plurality of information signals for each of the symbols to produce a plurality of modulated carrier waves;

producing an orthogonal frequency division multiplex signal composed of the plurality of modulated carrier waves, by which the plurality of sets of in-phase and quadrature signals of the plurality of information signals and the original reference signal are carried, for each of the symbols;

transmitting the orthogonal frequency division multiplex signal from the transmitting side to a transmission path for each of the symbols;

receiving the orthogonal frequency division multiplex signal transmitted from the transmission path on the receiving side for each of the symbols;

demodulating the plurality of modulated carrier waves of the orthogonal frequency division multiplex signal received on the receiving side to obtain a plurality of sets of demodulated in-phase and quadrature signals of a plurality of demodulated information signals and a demodulated reference signal on the receiving side for each of the symbols;

obtaining a plurality of reproduced information signals from the plurality of demodulated information signals for each of the symbols;

obtaining a reproduced reference signal from the demodulated reference signal for each of the symbols;

detecting a characteristic of the transmission path for a particular reproduced information signal carried by the particular modulated carrier wave according to a real part of the original reference signal, an imaginary part of the original reference signal, a real part of the reproduced reference signal and an imaginary part of the reproduced reference signal for each of the symbols;

calculating a first correcting equation for the particular reproduced information signal from the characteristic of the transmission path for each of the symbols;

correcting the particular reproduced information signal according to the first correcting equation to obtain a first corrected information signal for each of the symbols;

preparing a signal arrangement in which a plurality of signal positions allowed for the plurality of information signals are arranged;

initially setting a second correcting equation for a first symbol;

correcting the first corrected information signal corresponding to the first symbol according to the second correcting equation to obtain a second corrected information signal for the first symbol;

detecting a high speed changing characteristic of the transmission path for the second corrected information signal of the first symbol according to a difference between a particular signal position selected from the signal arrangement for the second corrected information signal and a signal position of the second corrected information signal;

calculating a second correcting equation for a second symbol succeeding to the first symbol from the high speed changing characteristic of the transmission path and the second corrected information signal of the first symbol to correct a first corrected information signal corresponding to the second symbol to a second corrected information signal according to the second correcting equation of the second symbol;

repeating the correction of the first correcting information signal according to the second correcting equation to obtain the second corrected information signals corresponding to all of the information signals; and outputting the second corrected information signals for each of the symbols.

28. The orthogonal frequency division multiplex signal transmitting method according to claim 27, further comprising the steps of:

inserting a symbol number, a piece of particular parameter information or a piece of synchronizing symbol information into one of the plurality of modulated carrier waves on the transmitting side for each of the symbols while circularly changing a value of the symbol number for each of the symbols;

demodulating one modulated carrier wave, in which the symbol number, the particular parameter information or the synchronizing symbol information is inserted, on the receiving side for each of the symbols to reproduce the symbol number, the particular parameter information or the synchronizing symbol information; and specifying the particular carrier wave, in which the original reference signal is inserted, according to the symbol number, the particular parameter information or the synchronizing symbol information.

29. The orthogonal frequency division multiplex signal transmitting method according to claim 27, further comprising the steps of arranging coefficients of the first correcting equation and/or the second correcting equation in a frequency order; and filter-processing the coefficients in a low pass filter on a frequency-axis.

30. The orthogonal frequency division multiplex signal transmitting method according to claim 27 in which the step of correcting the first corrected information signal includes the step of repeating the correction of the first corrected information signal during a prescribed number of symbols to obtain a plurality of second corrected information signals for the prescribed number of symbols, and the step of detecting a high speed changing characteristic of the transmission path comprises the steps of calculating a difference between a particular signal position selected from the signal arrangement table and a signal position for each of the plurality of second corrected information signals;

calculating an average difference of the plurality of differences; and detecting a high speed changing characteristic of the transmission path for the plurality of second corrected information signals according to the average difference.

31. The orthogonal frequency division multiplex signal transmitting method according to claim 27 in which the step of correcting the first corrected information signal includes the step of repeating the correction of the first corrected information signal during a prescribed number of symbols to obtain a plurality of second corrected information signals for the prescribed number of symbols, the step of detecting a high speed changing characteristic of the transmission path comprises the steps of calculating a difference between a particular signal position selected from the signal arrangement table and a signal position for each of the plurality of second corrected information signals;

detecting a high speed changing characteristic of the transmission path for each of the second corrected information signals according to one corresponding difference; and obtaining an average high speed changing characteristic of the transmission path from the plurality of high speed changing characteristics, and the step of calculating an updated second correcting equation includes the step of calculating an updated second correcting equation used for a plurality of next symbols from the average high speed changing characteristic of the transmission path.

32. The orthogonal frequency division multiplex signal transmitting method according to claim 27 in which the step of inserting the original reference signal includes the steps of:

selecting the particular carrier wave, into which the original reference signal is inserted, while changing a frequency of the particular carrier wave every two symbols;

expressing a real part of the original reference signal by X;
expressing an imaginary part of the original reference signal by Y, the step of obtaining a plurality of reproduced information signals includes the steps of:
   expressing a real part of each of the plurality of reproduced information signals by A'; and
   expressing an imaginary part of each of the plurality of reproduced information signals by B',
the step of obtaining a reproduced reference signal includes the steps of:
   expressing a real part of the reproduced reference signal obtained from the original reference signal corresponding to a first symbol by P0s';
   expressing an imaginary part of the reproduced reference signal obtained from the original reference signal corresponding to the first symbol by Q0s';
   expressing a real part of the reproduced reference signal obtained from the original reference signal corresponding to a second symbol following the first symbol by P1s'; and
   expressing an imaginary part of the reproduced reference signal obtained from the original reference signal corresponding to the second symbol by Q1s',
the step of detecting a characteristic of the transmission path includes the steps of:
   calculating values of two coefficients S0 and S1,
   $S0=(X*P_{0s}'+Y*Q_{0s}')/(X^2+Y^2)$
   $S1=(X*Q_{0s}'-Y*P_{0s}')/(X^2-Y^2)$
   which denote the changing degrees, according to the original reference signal and the reproduced reference signal obtained from the original reference signal corresponding to the first symbol;
   calculating other values of the coefficients S0 and S1,
   $S0=(X*P_{1s}'+Y*Q_{1s}')/(X^2+Y^2)$
   $S1=(X*Q_{1s}'-Y*P_{1s}')/(X^2-Y^2)$
   according to the original reference signal and the reproduced reference signal obtained from the original reference signal corresponding to the second symbol; and
   averaging each of the coefficients S0 and S1,
the step of calculating a first correcting equation includes the step of:
   calculating a value $$\frac{1}{\det A}\begin{pmatrix} H0, & H1 \\ -H1, & H0 \end{pmatrix}$$

in which H0=+S0, H1=+S1, and detA=S0:+S12, as the first correcting equation,
the step of correcting the particular reproduced information signal includes the step of:
   calculating a real part of the first corrected information signal expressed by A" and an imaginary part of the first corrected information signal expressed by B" according to a relationship $$\begin{pmatrix} A'' \\ B'' \end{pmatrix} = \frac{1}{\det A}\begin{pmatrix} H0, & H1 \\ -H1, & H0 \end{pmatrix}\begin{pmatrix} A' \\ B' \end{pmatrix}$$

by using the real part A' of the particular reproduced information signal, the imaginary part B' of the particular reproduced information signal,
the step of detecting a high speed changing characteristic of the transmission path includes
   determining a particular information signal modulating the particular carrier wave on the transmitting side according to the high speed changing characteristic of the transmission path and the first corrected information signal, and
the step of calculating an updated second correcting equation includes
   expressing a real part of the particular information signal by A;
   expressing an imaginary part of the particular information signal by A;
   generating the updated second correcting equation expressed by a matrix $$K = \begin{pmatrix} K0, & K1, \\ -K1, & K0, \end{pmatrix}$$

in which $K0=(A*A''+B*B'')/(A''^2+A''^2)$ and $K1=(A*B''-A''*B)/(A''^2+B''^2)$ are satisfied; and
   correcting one first corrected information signal corresponding to the next symbol to one second corrected information signal according to a relationship $$\begin{pmatrix} \langle A \rangle \\ \langle B \rangle \end{pmatrix} = \begin{pmatrix} K0, & K1, \\ -K1, & K0, \end{pmatrix}\begin{pmatrix} A'' \\ B'' \end{pmatrix}$$

in which a real part of the second corrected signal is expressed by <A> and an imaginary part of the second corrected signal is expressed by <B>.

33. The orthogonal frequency division multiplex signal transmitting method according to claim 27 in which the step of calculating an updated second correcting equation includes
   calculating a weighting factor having a value which increases as the difference between the particular signal position selected from the signal arrangement table for the second corrected information signal and the signal position of the second corrected information signal is lowered; and
   calculating the updated second correcting equation multiplied by the weighting factor.

* * * * *